United States Patent
Maru

(10) Patent No.: US 9,608,705 B2
(45) Date of Patent: Mar. 28, 2017

(54) MIMO COMMUNICATION SYSTEM FOR PROPAGATION ENVIRONMENT INCLUDING DETERMINISTIC COMMUNICATION CHANNEL, AND ANTENNAS FOR MIMO COMMUNICATION SYSTEM

(71) Applicant: NEC Corporation, Minato-ku, Tokyo (JP)

(72) Inventor: Tsuguo Maru, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/894,013

(22) PCT Filed: May 29, 2014

(86) PCT No.: PCT/JP2014/064213
§ 371 (c)(1),
(2) Date: Nov. 25, 2015

(87) PCT Pub. No.: WO2014/192845
PCT Pub. Date: Dec. 4, 2014

(65) Prior Publication Data
US 2016/0134345 A1 May 12, 2016

(30) Foreign Application Priority Data

May 30, 2013 (JP) .................................. 2013-114036

(51) Int. Cl.
*H03H 7/40* (2006.01)
*H04B 7/0456* (2017.01)
*H04L 5/00* (2006.01)

(52) U.S. Cl.
CPC ......... *H04B 7/0456* (2013.01); *H04L 5/0048* (2013.01)

(58) Field of Classification Search
CPC ........................... H04B 7/0456; H04L 5/0048
See application file for complete search history.

(56) References Cited

U.S. PATENT DOCUMENTS

2010/0097270 A1* 4/2010 Fukada ..................... G01S 3/48
342/442
2011/0098010 A1* 4/2011 Mihota ................ H04B 7/0413
455/101
(Continued)

FOREIGN PATENT DOCUMENTS

EP         2180623 A1    4/2010
JP      2005-354595 A   12/2005
(Continued)

OTHER PUBLICATIONS

P.F. Driessen, G.J.Foschini, "On the Capacity of Formula for Multiple Input-Multiple Output Wireless Channels: a Geometric Interpretation", pp. 173-176, IEEE Transactions on Communications, published on Feb. 1999.

(Continued)

*Primary Examiner* — Dac Ha

(57) ABSTRACT

In a MIMO communication system that includes a transmitter and a receiver and forms line-of-sight orthogonal channels between the transmitter-side transmitting antenna and the receiver-side receiving antenna, the MIMO communication system is provided between the transmitting antenna and the receiving antenna with an optimum antenna-to-antenna spacing shortening unit to shorten an optimum antenna-to-antenna spacing by changing the phase rotation of a carrier wave used for directly opposed waves between opposed antennas, and the phase rotation of a carrier wave used for intersecting waves between oblique antennas in such a manner that the amount by which one of the phase rotations changes is different from that by which the other phase rotation changes.

20 Claims, 32 Drawing Sheets

(56) References Cited

U.S. PATENT DOCUMENTS

| | | | |
|---|---|---|---|
| 2014/0023158 A1* | 1/2014 | Maru | H04B 7/04 375/267 |
| 2015/0229034 A1* | 8/2015 | Kim | H01Q 3/00 342/373 |

FOREIGN PATENT DOCUMENTS

| | | |
|---|---|---|
| JP | 2014-027347 A | 2/2014 |
| WO | 2012/002162 A1 | 1/2012 |

OTHER PUBLICATIONS

Kazumitsu Sakamoto, Ken Hiraga, Tomohiro Seki, Tadao Nakagawa, Kazuhiro Uehara, "A method for controlling phase difference between propagation channels for short- range MIMO transmission, Antennas and Propagation" (ISAP), 2012 International Symposium on, Oct. 29, 2012.

International Search Report for PCT Application No. PCT/JP2014/064213, mailed on Aug. 26, 2014.

\* cited by examiner

[ANALYTICAL MODEL (MODEL 1)]

【ANALYTICAL MODEL (MODEL 3)】

[ANALYTICAL MODEL (MODEL 5)]

[ANISOTROPIC METAMATERIAL DIELECTRIC]

MIMO COMMUNICATION SYSTEM FOR PROPAGATION ENVIRONMENT INCLUDING DETERMINISTIC COMMUNICATION CHANNEL, AND ANTENNAS FOR MIMO COMMUNICATION SYSTEM

This application is a National Stage Entry of PCT/JP2014/064213 filed on May 29, 2014, which claims priority from Japanese Patent Application 2013-114036 filed on May 30, 2013, the contents of all of which are incorporated herein by reference, in their entirety.

TECHNICAL FIELD

The present invention relates to a space division multiplexing system (hereinafter, referred to as MIMO; Multiple-Input/Multiple-Output), particularly, pertaining to an MIMO communication system adopted for a fixed microwaves communication system in the line-of-sight communication system, a mobile communication system in which the line-of-sight propagation is included even under the propagation environment entailing reflections and scatterings and the propagation environment in which the line-of-sight propagation is included indoor and to antennas for such MIMO communication system.

BACKGROUND ART

In the wireless communication, the communication system adopting such MIMO has prevailed over the relevant market, so that the MIMO itself comes to be no novel to the persons skilled in the art. However, the communication system adopting the MIMO has been centered on a mobile communication, but has not been applied for a fixed communication to date. With the radio waves propagation line in a mobile communication, the fact is that the radio waves arrived from a transmitting antenna are subjected to reflections and scatterings by the surrounding landforms and as such so as to be received in a receiving apparatus with a collective group of constituent waves. Thus, it is rich scattering resulting from such fact that always hinders a high-quality communication from being realized. The MIMO adopted in a mobile communication was epoch-making in that such rich scattering was reconsidered as the environmental resources to extract the potential inherent in the radio waves propagation in a mobile communication system instead of having been regarded as nuisance.

Against the doubts arising from what's happened when such MIMO communication system is applied to a line-of-sight fixed wireless communication in which a radio waves propagation channel is deterministic, there is disclosure in NPL 1 below on a line-of-sight MIMO applied thereto, though the number of such examples is smaller than those applied to a mobile communication system.

In such mobile communication system, a communication channel is regarded as a probabilistic matrix (or simply referred to as matrix) whereas it is required that such communication channel be deterministically handled in the line-of-sight fixed communication system.

In NPL 1 below, there is disclosure that the conditions expressed with the following formula are imposed on the communication channel matrix H by enlarging the antenna-to-antenna spacing at both of the transmitting and receiving sides, in which n denotes the number of antennas.

$$H \cdot H^H = n \cdot I_n \quad \text{\{Formula 1\}}$$

In this regard, the phase rotation of the signal is feasible with linear antennas as verified by the following formula 2 for the transmitting antenna number i and the receiving antenna number k which are linearly disposed such that they are opposed to each other between transmission and reception.

$$\frac{\pi}{n} \cdot [i-k]^2 \quad \text{\{Formula 2\}}$$

For instance, when n is equal to 2, the communication channel matrix H is defined as the following formula 3.

$$H_{max} = \begin{bmatrix} 1 & j \\ j & 1 \end{bmatrix} \quad \text{\{Formula 3\}}$$

Thus, the antennas arrangement satisfying the conditions of the formula 1 is feasible. In NPL 1, there is disclosure that the communication channel capacity according to the MIMO communication system is maximized by $H_{max}$ when the conditions of the formula 1 are satisfied.

In other words, not in the mobile environment entailing reflections and scatterings, but even in the deterministic line-of-sight communication environment, the increase of communication channel capacity in the MIMO communication system is feasible.

The case where such deterministic line-of-sight MIMO communication system is applied to a small-scale fixed microwaves communication is discussed herein. Generally speaking, for such small-scale microwaves communication, the frequency band ranging from several GHz to several-tens GHz is employed, which corresponds to several mm to several cm in terms of wavelengths. Accordingly, the movement of the antennas orientation whose sensitivity is high against such subtle climate conditions as the wind, the surrounding temperature and so forth causes a serious phase rotation. Under such conditions, it is hard to ensure the aforesaid definitive communication channel matrix.

To note, in the theoretical analysis mentioned below, it is analytically shown that there is no change in communication channel capacity for the aforesaid capacity enlargement even when the displacement of the orientation of such high sensitive antennas might happen.

With the MIMO communication system, plural independent signals are transmitted/received at the same time in the same frequency band. Thus, it requires that the signals be separated and detected accordingly. As one of the means to satisfy such requirement, there is a method according to matrix operation (hereinafter, abbreviated as 'SVD system') employing a unitary matrix obtained by singular value decomposition (hereinafter, abbreviated as 'SVD'). In such SVD system, provided that the feedback data for constructing the unitary matrix is delivered from the receiving end to the transmitting end in an ideal manner, even when the displacement of the orientation of such highly sensitive antennas might happen as described above, the unitary matrix acts to compensate for such displacement. As the result of it, the large capacity fixed microwaves communication is realized according to the MIMO communication system.

However, such feedback data not only increases overheads, but also requires reverse links.

To note, with the modeling of the communication channel matrix H described below, analysis is made inclusive of the displacement of the orientation of such high sensitive antennas.

By the way, upon subjecting the aforesaid line-of-sight fixed communication channel in which a propagation channel is deterministic to the singular value analysis, there is a position between antennas where a singular point arises with a eigenvalue rendered into a geometric multiplicity (double eigenvalue or multiple eigenvalue). Such singular value is uniquely specified, but singular vectors are not so. In particular, such singular states are analytically bothersome, by which there are some cases where the serious transition of such singular vectors might arise.

To note, on the contrary, making use of such phenomenon allows various arrangements to be available. As for various types of exemplified arrangements making the most of such phenomenal characteristics, they are explained in details at the later stage.

Further, as one of the big problems with the deterministic line-of-sight MIMO communication system, it requires that carrier synchronization be made between antennas at the transmitting side or the receiving side according to the aforesaid conventional method. In other words, it requires that the phase among plural antennas at the transmitting side or the receiving side be the same or arranged with a certain difference in phase among them.

On the other hand, with a fixed microwaves communication system, it requires that the antenna-to-antenna spacing be widened in view of the frequencies to be handled. Accordingly, the respective radios including a local oscillator are disposed near the antennas. In other words, the problem with the carrier synchronization among the antennas becomes large constraint to construct the fixed microwaves communication system.

CITATION LIST

Non-Patent Literature

NPL 1: On the capacity of formula for multiple input multiple output wireless channels: a geometric interpretation, pp. 173-176, IEEE Transactions on Communications, published on February 1999

SUMMARY OF INVENTION

Technical Problem

Assuming that the virtual orthogonal channels of the MIMO communication system satisfying such large constraint to construct the fixed microwaves communication system as mentioned above should be formed, for that purpose, it requires that the antenna-to-antenna spacing be widened, which leads to the constraint to construct the MIMO communication system such as ensuring the places where the antennas are actually implemented.

Moreover, the mobile communication system is used in a so-called rich scattering environment in which reflections and scatterings are repeated as described above, and small cell has been streamlined in size in recent years, the proportion of radio waves arriving through line-of-sight communication is on the increase. Under such environment, the characteristics of such mobile communication system deteriorate to the extreme with the conventional method which is targeted on non-line-of-sight (hereinafter, abbreviated as 'NLOS') MIMO communication system.

In other words, even in the mobile communication system under NLOS, the corrective measures to the propagation environment including the deterministic communication channel need to be taken, for which the large constraint, when constructing the MIMO communication system, such that the antenna-to-antenna spacing be widened is still unsolved.

Further, in recent years, with home electric appliances in which non-compressed transmission of HDTV (High Definition Television) videos is carried out in real time indoor, a short range high speed digital wireless transmission has been in demand, so that a so-called short range MIMO, in which the MIMO communication system is used for such high speed transmission, is being tabled for discussion. However, problematically, it often happens that such short range MIMO forms line-of-sight propagation channels due to the fact that such wireless transmission is carried out indoor, so that the characteristics of such transmission deteriorate to the extreme just with the conventional MIMO communication system. Thus, the aforesaid MIMO communication system under the propagation environment including a deterministic communication channel is employed, but it is predicted that the antenna-to-antenna spacing occupying a wider space indoor causes another problem.

Further, due to the fact that such wireless transmission is carried out indoor, according as such appliances are transferred to other places, it requires that the geometric positions such as the antenna-to-antenna spacing to construct the line-of-sight MIMO channels be altered. For the users of such appliances who have no expertise knowledge, altering the positions of antennas is bothersome, so that it causes the problem with the convenience to use.

Purpose of Invention

In view of the above-mentioned inconveniences faced with the prior art, the present invention is to shorten the antenna-to-antenna spacing at the transmitting side or the receiving side or at both sides in the MIMO communication system that forms line-of-sight orthogonal channels between a transmitter-side transmitting antenna and a receiver-side receiving antenna under propagation environment including a deterministic communication channel.

Solution to Problem

The MIMO transmission system according to the present invention is a MIMO communication system that includes a transmitter and a receiver and forms line-of-sight orthogonal channels between a transmitter-side transmitting antenna and a receiver-side receiving antenna under propagation environment including a deterministic communication channel, in which an optimum antenna-to-antenna spacing shortening unit is provided between the transmitting antenna and the receiving antenna to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

The transmitter according to the present invention is a transmitter in a MIMO communication system forming line-of-sight orthogonal channels between a transmitter-side transmitting antenna and a receiver-side receiving antenna under propagation environment including deterministic communications channels, in which an optimum antenna-to-antenna spacing shortening unit is provided in front of the transmitting antenna to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

The transmitter according to the present invention is a receiver in a MIMO communication system forming line-of-sight orthogonal channels between a transmitter-side transmitting antenna and a receiver-side receiving antenna under propagation environment including deterministic communications channels, in which an optimum antenna-to-antenna spacing shortening unit is provided in front of the transmitting antenna to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

The antenna according to the present invention is an antenna on the transmitting side or the receiving side in a MIMO communication system forming line-of-sight orthogonal channels between a transmitter-side transmitting antenna and a receiver-side receiving antenna under propagation environment including deterministic communications channels, in front of which antenna an optimum antenna-to-antenna spacing shortening unit is provided to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

The MIMO communication method according to the present invention is a MIMO communication method in a MIMO communication system forming line-of-sight orthogonal channels between a transmitter-side transmitting antenna and a receiver-side receiving antenna under propagation environment including deterministic communications channels including an optimum antenna-to-antenna spacing shortening step of shortening an optimum antenna-to-antenna spacing by changing between the transmitting antenna and the receiving antennas a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

The program according to the present invention is a program to optimize an antenna-to-antenna spacing in a transmitter or a receiver of a MIMO communication system in which line-of-sight orthogonal channels are formed between a transmitter-side transmitting antenna and a receiver-side receiving antenna under propagation environment including a deterministic communication channel; an optimum antenna-to-antenna spacing shortening unit is provided to shorten an optimum antenna-to-antenna spacing between a transmitting antenna and a receiving antenna by changing a phase rotation of a carrier wave used for directly opposed waves between opposed antennas, and a phase rotation of a carrier wave used for intersecting waves between oblique antennas in such a manner that an amount by which one of the phase rotations changes is different from that by the other phase rotation changes; and the optimum antenna-to-antenna shortening unit is made from anisotropic metamaterial dielectrics and dielectric elements of the anisotropic metamaterial dielectrics are disposed such that their inclination angle with regard to a direction of the opposed antennas is freely changeable, in which the program makes a computer to function as a control unit to change the inclination angle such that the present antenna-to-antenna spacing is rendered into an optimum antenna-to-antenna spacing.

The program according to the present invention is a program to optimize an antenna-to-antenna spacing in a transmitter or a receiver of a MIMO communication system in which line-of-sight orthogonal channels are formed between a transmitter-side transmitting antenna and a receiver-side receiving antenna under propagation environment including a deterministic communication channel; an optimum antenna-to-antenna spacing shortening unit is provided to shorten an optimum antenna-to-antenna spacing between a transmitting antenna and a receiving antenna by changing a phase rotation of a carrier wave used for directly opposed waves between opposed antennas, and a phase rotation of a carrier wave used for intersecting waves between oblique antennas in such a manner that an amount by which one of the phase rotations changes is different from that by the other phase rotation changes; and the optimum antenna-to-antenna shortening unit is a metallic plate guide including a collective body of parallel metallic plates and a guiding direction of the metallic plate guide is disposed such that its inclination angle with regard to a direction of the opposed antennas is freely changeable, in which the program makes a computer to function as a control unit to change the inclination angle such that the present antenna-to-antenna spacing is rendered into an optimum antenna-to-antenna spacing.

Advantageous Effects of Invention

According to the present invention, in the MIMO communication system that forms line-of-sight orthogonal channels between the transmitter-side transmitting antenna and the receiver-side receiving antenna under propagation environment including deterministic communication channel, the antenna-to-antenna spacing can be shortened at the transmitting side, the receiving side or at both sides.

REFERENCE SIGNS LIST 101 matrix operation processing unit by unitary matrix V,
102 frequency conversion unit,
103 mixer,
104 local oscillator,
105 mixer,
106 fixed antenna unit,
107 fixed antenna unit,
108 frequency conversion unit,
109 mixer,
110 local oscillator,
111 mixer,
112 matrix operation processing unit by unitary matrix U,
201 matrix operation processing unit by unitary matrix V,
202 fixed antenna unit,
203 fixed antenna unit,
301 matrix operation processing unit by matrix V,
302 fixed antenna unit,
303 fixed antenna unit,
401 pilot signal generation unit,
402 frequency conversion unit,
403 mixer,
404 local oscillator,
405 local oscillator,
406 modeling of phase noise caused by the carrier synchronization not being carried out,
407 mixer,
408 fixed antenna unit,
409 fixed antenna unit,
410 matrix operation processing unit by unitary matrix U,
501 pilot signal generation unit,
502 frequency conversion unit,
503 mixer,
504 local oscillator,
505 local oscillator,
506 modeling of phase noise caused by the carrier synchronization not being carried out,
507 mixer,
508 fixed antenna unit,
509 fixed antenna unit,
510 frequency conversion unit,
511 mixer,
512 local oscillator,
513 local oscillator,
514 modeling of phase noise caused by the carrier synchronization not being carried out,
515 mixer,
516 pilot signal detection unit,
517 matrix operation processing unit by unitary matrix U,
601 pilot signal generation unit,
602 frequency conversion unit,
603 mixer,
604 local oscillator,
605 local oscillator, 606 modeling of phase noise caused by the carrier synchronization not being carried out,
607 mixer,
608 fixed antenna unit,
609 fixed antenna unit,
610 frequency conversion unit,
611 mixer,
612 local oscillator,
613 local oscillator,
614 modeling of phase noise caused by the carrier synchronization not being carried out,
615 mixer,
616 pilot signal detection unit,
617 matrix operation processing unit by matrix U,
2001 transmitting station,
2002 receiving station 1,
2003 receiving station 2,
2501 and 2502 transmitting antenna,
2503 and 2504 material,
2505 and 2506 receiving antenna,
2507 and 2508 material,
2901 and 2902 antenna element,
2903 and 2904 material,
2901 and 2902 antenna,
2903 and 2904 material.

DESCRIPTION OF EMBODIMENTS

Then, before embodiments of the present invention is explained with reference to the accompanying formulae and drawings, the theoretical grounds on which the communication channel capacity becomes the maximum capacity of the MIMO communication system even in the case of a deterministic line-of-sight communication channel are analytically demonstrated.

Figure 1:
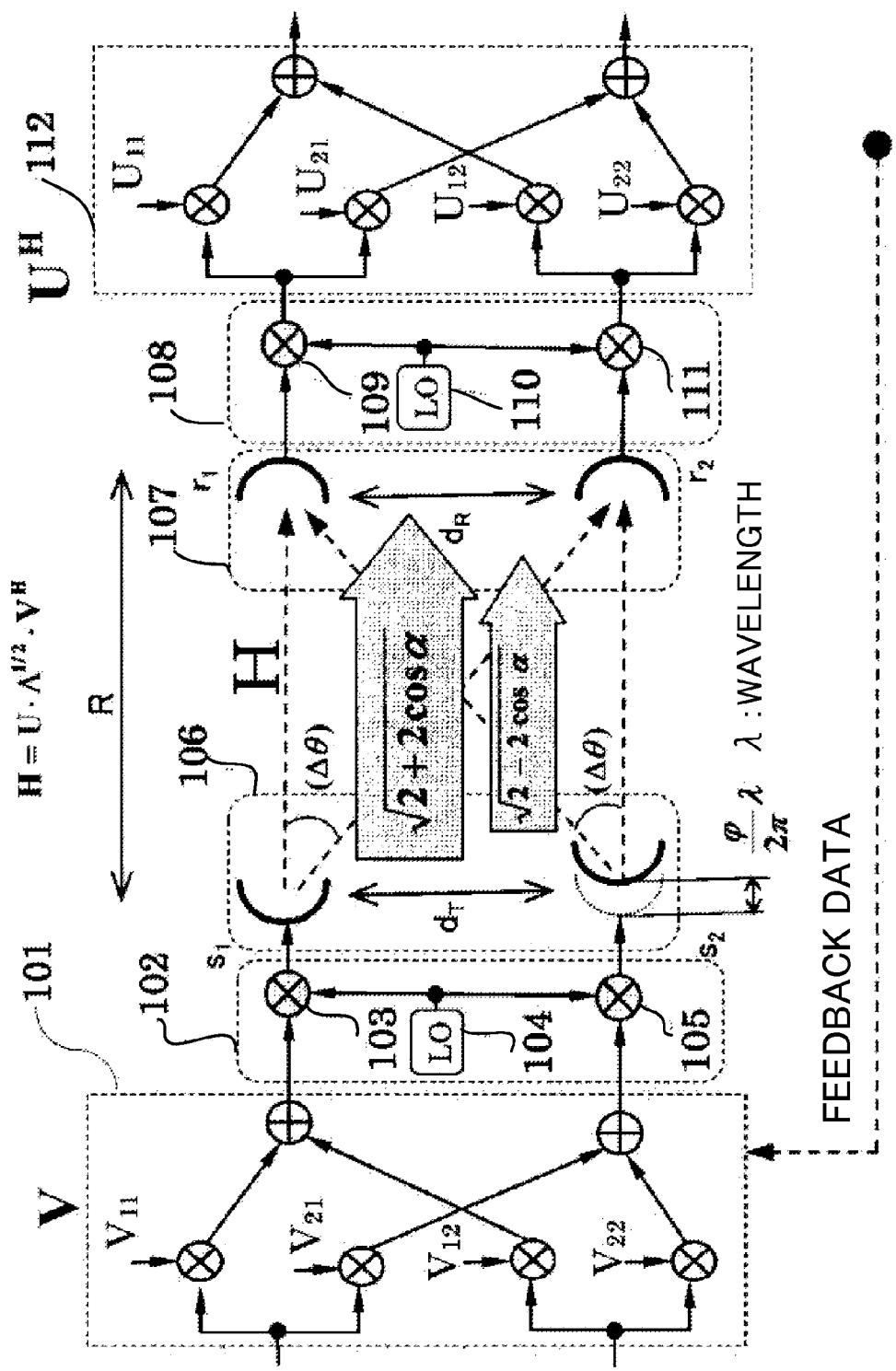
FIG. 1 shows an exemplified arrangement of the line-of-sight MIMO communication system embodied according to the present invention, in which SVD system with the displacement of the highly sensitive antennas taken into account at an arbitrary spacing between antennas is adopted.

The communication channel capacity of the virtual orthogonal channel according to the MIMO communication system is represented with an eigenvalue of each path. Thus, the eigenvalue analysis according to the antenna arrangement as shown in FIG. 1 is made. The directional displacement of highly sensitive antennas is also taken into account in the following modeling.

The following explanation is given based on the case where there are two antennas for convenience, but the calculation is also feasible with the same effect even with the arbitrary number of antennas besides such case. The communication channel capacity is determined by the relative phase shift, so that range attenuation due to the spacing R between transmission and reception and common phase shift are disregarded in the calculation. The path difference with the diagonal path is expressed with the following formula 4.

$$R \cdot (1 - \cos(\Delta\theta)) \approx R \cdot \left(\frac{(\Delta\theta)^2}{2}\right) = \quad \{\text{Formula 4}\}$$

$$R \cdot \left(\frac{1}{2}\left(\frac{d_R}{R}\right)^2\right) = \frac{d_R^2}{2R} \because \frac{d_R}{R} = \tan(\Delta\theta) \approx (\Delta\theta),$$

at $d_T = d_R$

The phase rotation $\alpha$ due to the path difference is expressed with the following formula 5.

$$\alpha = 2\pi\left(\frac{d_R^2}{2R}\right)\bigg/\gamma = \frac{\pi}{\gamma} \cdot \frac{d_R^2}{R} \quad \{\text{Formula 5}\}$$

In this regard, providing that RF frequency is defined as 30 GHz; R is equal to 5000 m; and $d_T$ is equal to $d_R$ or both 5 m, the following formula 6 is established.

$$\alpha = \frac{\pi}{\gamma} \cdot \frac{d_R^2}{R} = \frac{\pi}{(3 \cdot 10^8)/(30 \cdot 10^9)} \cdot \frac{5^2}{5000} = \frac{\pi}{2} \quad \{\text{Formula 6}\}$$

Accordingly, the channel matrix H with the phase shift $\Phi$ due to the positional fluctuation of the $S_2$ transmitting antenna taken into account is expressed with the following formula 7.

$$H = \begin{bmatrix} 1 & e^{-j\alpha} \cdot e^{j\Phi} \\ e^{-j\alpha} & 1 \cdot e^{j\Phi} \end{bmatrix} \quad \{\text{Formula 7}\}$$

Accordingly, the following formula 8 is established.

$$\Omega = H^H \cdot H$$

$$= \begin{bmatrix} 1 & e^{j\alpha} \\ e^{j\alpha} \cdot e^{-j\Phi} & e^{-j\Phi} \end{bmatrix} \cdot \begin{bmatrix} 1 & e^{-j\alpha} \cdot e^{j\Phi} \\ e^{-j\alpha} & e^{j\Phi} \end{bmatrix}$$

$$= \begin{bmatrix} 2 & e^{j\Phi}(e^{j\alpha} + e^{-j\alpha}) \\ e^{-j\Phi}(e^{j\alpha} + e^{-j\alpha}) & 2 \end{bmatrix}$$

$$= \begin{bmatrix} 2 & 2 \cdot \cos\alpha \cdot e^{j\Phi} \\ 2 \cdot \cos\alpha \cdot e^{-j\Phi} & 2 \end{bmatrix}$$

Based on the above formula 8, the eigenvalues $\lambda_1$ and $\lambda_2$ which are communication channel capacities of the virtual orthogonal channels are calculated based on the following formula 9 as follows.

$$\begin{vmatrix} 2-\lambda & 2 \cdot \cos\alpha \cdot e^{j\Phi} \\ 2 \cdot \cos\alpha \cdot e^{-j\Phi} & 2-\lambda \end{vmatrix} = \lambda^2 + 4 - 4\lambda - 4\cos^2\alpha \quad \{\text{Formula 9}\}$$

$$= \lambda^2 - 4\lambda - 4\sin^2\alpha = 0$$

$$\therefore \lambda = 2 \pm \sqrt{4 - 4\sin^2\alpha} = 2 \pm 2\cos\alpha$$

Figure 2:
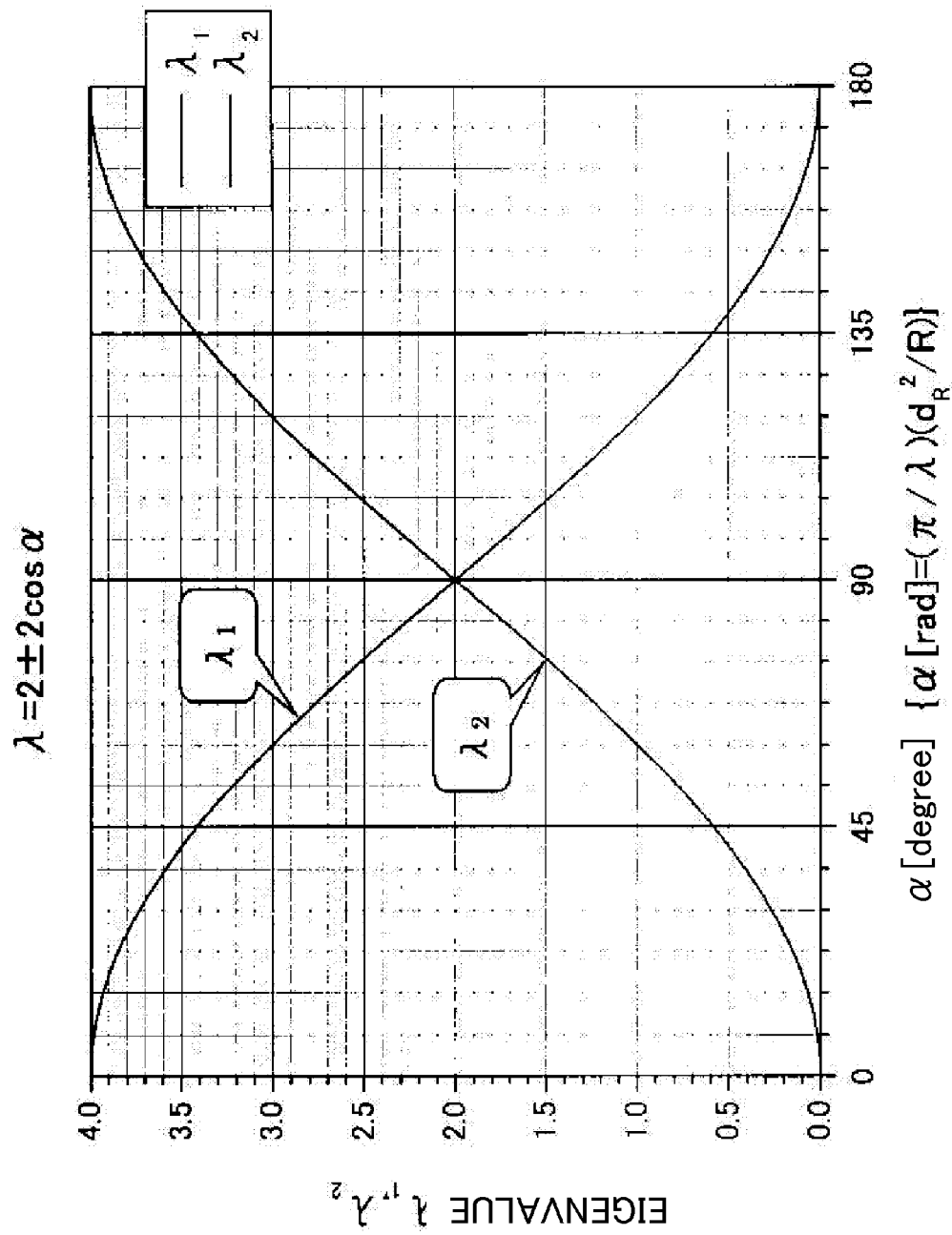
FIG. 2 shows the calculation result of eigenvalues of the orthogonal channels.

The calculation result of such values is shown in FIG. 2.

The analytical result shown in FIG. 2 is based on the unit power electric transmission by each antenna, so that it is shown that the communication channel capacity is doubled corresponding to the number of antennas. Here, attention shall be drawn to the fact that the directional displacement of highly sensitive antennas is also included in the modeling adopted in the above calculation. In spite of such fact, such displacement component does not come to the surface in the result of the eigenvalue corresponding to the finalized communication channel capacity. In other words, communication channel capacity enlargement is feasible through the MIMO communication system even with the line-of-sight fixed wireless communication in which a radio waves propagation channel is deterministic, which is determined by the antenna-to-antenna spacing irrespective of the displacement of highly sensitive antennas.

According to the above example, the case where there are two antennas is exemplified, but other examples besides such case are described as follows.

The phase rotation by the path difference with the diagonal path between the antenna elements linearly implemented to each other between transmission and reception is determined by the formula 5, in which provided that the spacing between elements is defined as d in common, the following formula 10 is established.

$$\frac{\pi}{\gamma} \cdot \frac{d^2}{R} \qquad \text{\{Formula 10\}}$$

Then, selecting the arrangement of three antennas with d and spacing R between transmission and reception defined such that the following formula 11 is established, the following communication channel matrix $H_3$ according to the following formula 12 is obtained.

$$\frac{\pi}{\gamma} \cdot \frac{d^2}{R} = \frac{\pi}{3} \therefore \frac{d^2}{R} = \frac{\gamma}{3} \qquad \text{\{Formula 11\}}$$

$$H_3 = \begin{bmatrix} 1 & e^{-j\frac{\pi}{3}} & e^{-j4\frac{\pi}{3}} \\ e^{-j\frac{\pi}{3}} & 1 & e^{-j\frac{\pi}{3}} \\ e^{-j4\frac{\pi}{3}} & e^{-j\frac{\pi}{3}} & 1 \end{bmatrix} \qquad \text{\{Formula 12\}}$$

Accordingly, the following formula 13 is established, in which three eigenvalues corresponding to the communication channel capacities of the virtual orthogonal channels all result in 3, so that it is seen that the entire communication channel capacity is tripled according to the number of antennas.

$$\Omega = H_3^H \cdot H_3 \qquad \text{\{Formula 13\}}$$

$$= \begin{bmatrix} 1 & e^{j\frac{\pi}{3}} & e^{j4\frac{\pi}{3}} \\ e^{j\frac{\pi}{3}} & 1 & e^{j\frac{\pi}{3}} \\ e^{j4\frac{\pi}{3}} & e^{j\frac{\pi}{3}} & 1 \end{bmatrix} \cdot \begin{bmatrix} 1 & e^{-j\frac{\pi}{3}} & e^{-j4\frac{\pi}{3}} \\ e^{-j\frac{\pi}{3}} & 1 & e^{-j\frac{\pi}{3}} \\ e^{-j4\frac{\pi}{3}} & e^{-j\frac{\pi}{3}} & 1 \end{bmatrix}$$

$$= \begin{bmatrix} 3 & 0 & 0 \\ 0 & 3 & 0 \\ 0 & 0 & 3 \end{bmatrix}$$

Likewise, selecting the arrangement of four antennas with d and spacing R between transmission and reception defined such that the following formula 14 is established, the following communication channel matrix $H_4$ according to the following formula 15 is obtained.

$$\frac{\pi}{\gamma} \cdot \frac{d^2}{R} = \frac{\pi}{4} \therefore \frac{d^2}{R} = \frac{\gamma}{4} \qquad \text{\{Formula 14\}}$$

$$H_4 = \begin{bmatrix} 1 & e^{-j\frac{\pi}{4}} & e^{-j4\frac{\pi}{4}} & e^{-j9\frac{\pi}{4}} \\ e^{-j\frac{\pi}{4}} & 1 & e^{-j\frac{\pi}{4}} & e^{-j4\frac{\pi}{4}} \\ e^{-j4\frac{\pi}{4}} & e^{-j\frac{\pi}{4}} & 1 & e^{-j\frac{\pi}{4}} \\ e^{-j9\frac{\pi}{4}} & e^{-j4\frac{\pi}{4}} & e^{-j\frac{\pi}{4}} & 1 \end{bmatrix} \qquad \text{\{Formula 15\}}$$

Accordingly, the following formula 16 is established, in which four eigenvalues corresponding to the communication channel capacities of the virtual orthogonal channels all result in 4, so that it is seen that the entire communication channel capacity is quadrupled according to the number of antennas.

$$\Omega = H_4^H \cdot H_4 \qquad \text{\{Formula 16\}}$$

$$= \begin{bmatrix} 1 & e^{j\frac{\pi}{4}} & e^{j4\frac{\pi}{4}} & e^{j9\frac{\pi}{4}} \\ e^{j\frac{\pi}{4}} & 1 & e^{j\frac{\pi}{4}} & e^{j4\frac{\pi}{4}} \\ e^{j4\frac{\pi}{4}} & e^{j\frac{\pi}{4}} & 1 & e^{j\frac{\pi}{4}} \\ e^{j9\frac{\pi}{4}} & e^{j4\frac{\pi}{4}} & e^{j\frac{\pi}{4}} & 1 \end{bmatrix} \cdot$$

$$\begin{bmatrix} 1 & e^{-j\frac{\pi}{4}} & e^{-j4\frac{\pi}{4}} & e^{-j9\frac{\pi}{4}} \\ e^{-j\frac{\pi}{4}} & 1 & e^{-j\frac{\pi}{4}} & e^{-j4\frac{\pi}{4}} \\ e^{-j4\frac{\pi}{4}} & e^{-j\frac{\pi}{4}} & 1 & e^{-j\frac{\pi}{4}} \\ e^{-j9\frac{\pi}{4}} & e^{-j4\frac{\pi}{4}} & e^{-j\frac{\pi}{4}} & 1 \end{bmatrix}$$

$$= \begin{bmatrix} 4 & 0 & 0 & 0 \\ 0 & 4 & 0 & 0 \\ 0 & 0 & 4 & 0 \\ 0 & 0 & 0 & 4 \end{bmatrix}$$

In other words, it is concluded that even when the number of antennas goes beyond 2, the communication channel capacity of the deterministic line-of-sight communication channel is enlarged by the number of antennas corresponding to the maximum capacity of the MIMO communication system.

To note, in the following examples, for the sake of explanation, the case where there are two antennas is described, but the same explanation is applicable also to the cases where the number of antennas goes beyond 2, so that it is needless to say that the present invention is not limited to the case where there are two antennas.

Then, the matrix operation method employing the unitary matrix obtained by singular value decomposition (hereinafter, abbreviated as 'SVD system') adopted for the method of separating and detecting signals in the MIMO communication system is described.

In the SVD system, it requires the matrix operation by the unitary matrix V on the transmitting side and that by the unitary matrix U on the receiving side. For the purpose of the matrix operation by the unitary matrix V, it requires that the feedback data for constructing the unitary matrix be delivered from the receiving end to the transmitting end.

Hereafter, the embodiments of the present invention are explained in details with reference to the accompanying formulae and drawings.

With reference to FIG. 1, after a transmission signal processed at a matrix operation processing unit 101 by the unitary matrix V on the transmitting side is converted into a wireless frequency by a frequency conversion unit 102 including a local oscillator 104 and mixers 103 and 105 on the transmitting side, the converted signal is transmitted as $s_1$ and $s_2$ from a fixed antenna unit 106 including plural antennas. Herein, $s_1$ and $s_2$ adopt signal descriptions according to equivalent low-pass representations.

Here, attention shall be drawn to the fact that the local oscillator 104 is single and a signal from the oscillator is supplied to the mixers 103 and 105, thereby, the carrier synchronization between antennas being carried out. This derives from the constraint to construct a space division multiplexing microwaves communication system in which a deterministic communication channel is determined by the phase difference of each path. However, as described later, it is annotated that it is also possible to provide such local oscillator for each antenna.

The signals transmitted this way are received as $r_1$ and $r_2$ by a fixed antenna unit 107 including plural antennas on the receiving side. Herein, $r_1$ and $r_2$ adopt signal descriptions according to equivalent low-pass representations. After the received signals $r_1$ and $r_2$ are converted into a baseband frequency by a frequency conversion unit 108 including a local oscillator 110 and mixers 109 and 111 on the receiving side, they are processed by a matrix operation processing unit 112 according to the unitary matrix U on the receiving side, thereby, the separation/detection of the signals according to the MIMO communication system being completed.

Here, attention shall be drawn to the fact that the local oscillator 110 is single and a signal from the oscillator is supplied to the mixers 109 and 111, thereby, the carrier synchronization between antennas being carried out. This derives from the constraint to construct a space division multiplexing microwaves communication system in which a deterministic communication channel is determined by the phase difference of each path. However, as described later, also in this receiving side, in the same way as the transmitting side, it can be arranged such that a local oscillator is independently provided for each antenna. Further, the antennas adoptable herein include parabola antennas, horn antennas and the like, but the present invention is not necessarily limited to such antennas.

Hereafter, the method of calculating the aforesaid unitary matrices V and U is explained in details or in a concrete manner along with formulae employing the following communication channel matrix H according to the following formula 17 in which an arbitrary spacing between antennas and the displacement of highly sensitive antennas are taken into account.

(Communication Channel Matrix of Line-of-Sight Propagation Channel Used Herein)

$$H = \begin{bmatrix} 1 & e^{-j\alpha} \cdot e^{j\Phi} \\ e^{-j\alpha} & 1 \cdot e^{j\Phi} \end{bmatrix} \quad \{\text{Formula 17}\}$$

where; $\alpha = \frac{\pi}{\gamma} \cdot \frac{d_R^2}{R}$ (at $d_T = d_R$), $\Phi$; phase change caused by displacement Further, hereinafter, the singular value orthogonal matrix $\Lambda^{1/2}$ derived from the aforesaid eigenvalue is expressed according to the following formula 18.

$$\Lambda^{1/2} = \begin{bmatrix} \sqrt{2+2\cos\alpha} & 0 \\ 0 & \sqrt{2-2\cos\alpha} \end{bmatrix} \quad \{\text{Formula 18}\}$$

$$= \begin{bmatrix} 2\cdot\cos(\frac{\alpha}{2}) & 0 \\ 0 & 2\cdot\sin(\frac{\alpha}{2}) \end{bmatrix}$$

$$= \begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix} \because$$

$$\begin{cases} 1+\cos\alpha = 2\cos^2(\frac{\alpha}{2}) \\ 1-\cos\alpha = 2\sin^2(\frac{\alpha}{2}) \end{cases}$$

Hereunder, calculation is carried out in the order of the unitary matrix V and the unitary matrix U with such communication channel matrix H in use.

(Unitary Matrix V)

$$H = \begin{bmatrix} 1 & e^{-j\alpha} \cdot e^{j\Phi} \\ e^{-j\alpha} & 1 \cdot e^{j\Phi} \end{bmatrix} \quad \{\text{Formula 19}\}$$

Assuming that an eigenvector for the unitary matrix V expressed with the formula 19 is expressed with the following formula 20, the following formula 21 is established.

$$\begin{bmatrix} a \\ b \end{bmatrix} \quad \{\text{Formula 20}\}$$

$$\Omega = H^H \cdot H = \begin{bmatrix} 2 & 2\cdot\cos\alpha \cdot e^{j\Phi} \\ 2\cdot\cos\alpha \cdot e^{-j\Phi} & 2 \end{bmatrix} \quad \{\text{Formula 21}\}$$

Thus, based on the following formula 22, the following formula 23 is established.

$$\begin{bmatrix} 2-\lambda & 2\cdot\cos\alpha \cdot e^{j\Phi} \\ 2\cdot\cos\alpha \cdot e^{-j\Phi} & 2-\lambda \end{bmatrix} \cdot \begin{bmatrix} a \\ b \end{bmatrix} = 0 \quad \{\text{Formula 22}\}$$

$$a = \frac{-2\cdot\cos\alpha \cdot e^{j\Phi}}{2-\lambda} b = \frac{\cos\alpha \cdot e^{j\Phi}}{\pm\cos\alpha} b = \pm e^{j\Phi} \cdot b \quad \{\text{Formula 23}\}$$

$$\therefore \lambda = 2 \pm 2\cos\alpha$$

By the way, both members of the following formula 24 being multiplied by $v^H$ from the left side thereof, the following formula 25 is established.

$$\Omega \cdot v = \lambda \cdot v \quad \{\text{Formula 24}\}$$

$$v^H \cdot \Omega \cdot v = \lambda \quad \{\text{Formula 25}\}$$

Gathering orthogonal v, the following formula 26 is established.

$$V^H \cdot \Omega \cdot V = \Lambda \therefore \Omega = V \cdot \Lambda \cdot V^H \quad \{\text{Formula 26}\}$$

Based on the following formula 27, the following formula 28 is established.

$$H = U \cdot \Lambda^{1/2} \cdot V^H \quad \{\text{Formula 27}\}$$

$$\Omega = H^H \cdot H = V \cdot \Lambda^{1/2} \cdot U^H \cdot U \cdot \Lambda^{1/2} \cdot V^H = V \cdot \Lambda \cdot V^H \quad \{\text{Formula 28}\}$$

Thus, gathering the aforesaid eigenvector expressed with the following formula 29, the following formula 30 is established.

$$v = \begin{bmatrix} a \\ \pm a \cdot e^{-j\Phi} \end{bmatrix} \quad \{\text{Formula 29}\}$$

$$V = \begin{bmatrix} x & y \\ x \cdot e^{-j\Phi} & -y \cdot e^{-j\Phi} \end{bmatrix} \quad \{\text{Formula 30}\}$$

With standardization and orthogonality taken into account, assuming that particular solution is expressed according to the following formula 31, the following formula 32 is established.

$$x = \frac{-1}{\sqrt{2}}, y = \frac{1}{\sqrt{2}} \quad \{\text{Formula 31}\}$$

$$V = \begin{bmatrix} \frac{-1}{\sqrt{2}} & \frac{1}{\sqrt{2}} \\ \frac{-e^{-j\Phi}}{\sqrt{2}} & \frac{-e^{-j\Phi}}{\sqrt{2}} \end{bmatrix} \therefore V^H = \begin{bmatrix} \frac{-1}{\sqrt{2}} & \frac{-e^{j\Phi}}{\sqrt{2}} \\ \frac{1}{\sqrt{2}} & \frac{-e^{j\Phi}}{\sqrt{2}} \end{bmatrix} \quad \{\text{Formula 32}\}$$

(Unitary Matrix U)

Assuming that an eigenvector u is expressed with the following formula 34 based on the following formula 33, the following formula 36 is established based on the following formula 35.

$$\Omega' = H \cdot H^H \quad \{\text{Formula 33}\}$$

$$= \begin{bmatrix} 1 & e^{-j\alpha} \cdot e^{j\Phi} \\ e^{-j\alpha} & 1 \cdot e^{j\Phi} \end{bmatrix} \cdot \begin{bmatrix} 1 & e^{j\alpha} \\ e^{j\alpha} \cdot e^{-j\Phi} & 1 \cdot e^{-j\Phi} \end{bmatrix}$$

$$= \begin{bmatrix} 2 & 2 \cdot \cos\alpha \\ 2 \cdot \cos\alpha & 2 \end{bmatrix}$$

$$\begin{bmatrix} a \\ b \end{bmatrix} \quad \{\text{Formula 34}\}$$

$$\begin{bmatrix} 2-\lambda & 2 \cdot \cos\alpha \\ 2 \cdot \cos\alpha & 2-\lambda \end{bmatrix} \cdot \begin{bmatrix} a \\ b \end{bmatrix} = 0 \quad \{\text{Formula 35}\}$$

$$a = \frac{-2 \cdot \cos\alpha}{2-\lambda} b = \frac{\cos\alpha}{\pm\cos\alpha} b = \pm b \therefore \lambda = 2 \pm 2\cos\alpha \quad \{\text{Formula 36}\}$$

By the way, both members of the following formula 37 being multiplied by $u^H$ from the left side, the following formula 38 is established.

$$\Omega' \cdot u = \lambda \cdot u \quad \{\text{Formula 37}\}$$

$$u^H \cdot \Omega' \cdot u = \lambda \quad \{\text{Formula 38}\}$$

Gathering orthogonal u, the following formula 39 is established.

$$U^H \cdot \Omega' \cdot U = \Lambda \therefore \Omega' = U \cdot \Lambda \cdot U^H \quad \{\text{Formula 39}\}$$

Thus, gathering the aforesaid eigenvector u expressed with the following formula 40, the following formula 41 is established.

$$u = \begin{bmatrix} a \\ \pm a \end{bmatrix} \quad \{\text{Formula 40}\}$$

$$U = \begin{bmatrix} x & y \\ x & -y \end{bmatrix} \quad \{\text{Formula 41}\}$$

With standardization and orthogonality taken into account, assuming that particular solution is expressed according to the following formula 42, the following formula 43 is established.

$$x = \frac{-e^{-j\frac{\alpha}{2}}}{\sqrt{2}}, y = \frac{j \cdot e^{-j\frac{\alpha}{2}}}{\sqrt{2}} \quad \{\text{Formula 42}\}$$

$$U = \begin{bmatrix} \frac{-e^{-j\frac{\alpha}{2}}}{\sqrt{2}} & \frac{j \cdot e^{-j\frac{\alpha}{2}}}{\sqrt{2}} \\ \frac{-e^{-j\frac{\alpha}{2}}}{\sqrt{2}} & \frac{-j \cdot e^{-j\frac{\alpha}{2}}}{\sqrt{2}} \end{bmatrix} \therefore U^H = \begin{bmatrix} \frac{-e^{j\frac{\alpha}{2}}}{\sqrt{2}} & \frac{-e^{j\frac{\alpha}{2}}}{\sqrt{2}} \\ \frac{-je^{j\frac{\alpha}{2}}}{\sqrt{2}} & \frac{j \cdot e^{j\frac{\alpha}{2}}}{\sqrt{2}} \end{bmatrix} \quad \{\text{Formula 43}\}$$

For the confirmation of the unitary matrices V and U obtained by the above-mentioned calculation, the communication channel matrix H is subjected to singular value decomposition with V and U.

(Singular Value Decomposition $H = U \cdot \Lambda \cdot V^H$)

The singular value decomposition H is expressed with the following formula 44, so that it is seen that the formation of the orthogonal channel is feasible at the optimum positions: $R = 5000$ m; and $d_T = d_R = 5$ m as exemplified above or otherwise.

$$H = U \cdot \Lambda^{1/2} \cdot V^H \quad \{\text{Formula 44}\}$$

$$= \begin{bmatrix} \frac{-e^{-j\frac{\alpha}{2}}}{\sqrt{2}} & \frac{j \cdot e^{-j\frac{\alpha}{2}}}{\sqrt{2}} \\ \frac{-e^{-j\frac{\alpha}{2}}}{\sqrt{2}} & \frac{-j \cdot e^{-j\frac{\alpha}{2}}}{\sqrt{2}} \end{bmatrix} \cdot$$

$$\begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix} \cdot \begin{bmatrix} \frac{-1}{\sqrt{2}} & \frac{-e^{j\Phi}}{\sqrt{2}} \\ \frac{1}{\sqrt{2}} & \frac{-e^{j\Phi}}{\sqrt{2}} \end{bmatrix}$$

$$= \begin{bmatrix} \frac{-(1+e^{-j\alpha})}{\sqrt{2}} & \frac{(1-e^{-j\alpha})}{\sqrt{2}} \\ \frac{-(1+e^{-j\alpha})}{\sqrt{2}} & \frac{-(1-e^{-j\alpha})}{\sqrt{2}} \end{bmatrix} \cdot \begin{bmatrix} \frac{-1}{\sqrt{2}} & \frac{-e^{j\Phi}}{\sqrt{2}} \\ \frac{1}{\sqrt{2}} & \frac{-e^{j\Phi}}{\sqrt{2}} \end{bmatrix}$$

$$= \begin{bmatrix} 1 & e^{-j\alpha} \cdot e^{j\Phi} \\ e^{-j\alpha} & 1 \cdot e^{j\Phi} \end{bmatrix}$$

To note, the quality of the respective channels differs from $2^{1/2}$ and $2^{1/2}$ in proportion to $(2+2\cos\alpha)^{1/2}$ and $(2-2\cos\alpha)^{1/2}$.

In the block diagram of FIG. 1, virtual orthogonal channels in which $(2+2\cos\alpha)^{1/2}$ and $(2-2\cos\alpha)^{1/2}$ indicated with bold arrow signs therein are constructed are shown.

Attention shall be drawn to the fact that the aforesaid unitary matrices include the fluctuation of the channel caused by the external factors such as the positional fluctuation (modeled with Φ in FIG. 1) of highly sensitive antennas against subtle climate conditions such as the wind and the surrounding temperature and act accordingly to compensate for the directional displacement of highly sensitive antennas if any caused by such fluctuation of the channel. As described later, even with the arrangement in which an independent local oscillator is adopted for each antenna (hereinafter, simply referred to as 'L.O. independent arrangement'), the phase difference is modeled to the positional fluctuation of antennas, so that L.O. independent arrangement is feasible even with the arrangement shown in FIG. 1.

To note, according to the arrangement shown in FIG. 1, it requires that the feedback data for the purpose of constructing the V matrix is delivered from the receiving end to the transmitting end, but such feedback data can be dispensed with by compensation only on the receiving side.

The foregoing explanation is centered on a general virtual orthogonal channel encompassing the cases where the thicknesses of the constructed paths are different from one another. Then, the singular point where an eigenvalue of the line-of-sight fixed communication channel is rendered into a geometric multiplicity (double eigenvalue or multiple eigenvalue) is described as follows.

Upon subjecting the aforesaid line-of-sight fixed communication channel in which a propagation channel is deterministic to the singular value analysis, there is a position between antennas where a singular point arises with an eigenvalue rendered into a geometric multiplicity (double eigenvalue or multiple eigenvalue). Such singular value is uniquely specified, but singular vectors are not so. In particular, such singular states (Deficient matrix) are analytically bothersome, by which there are some cases where the serious transition of such singular vectors might arise. To note, on the contrary, making use of such phenomenon allows various arrangements to be available. As for various types of exemplified arrangements making the most of such phenomenal characteristics, they are explained below, but beforehand the fundamental explanations are given as follows.

The position between antennas where the following formula 46 is established with the phase rotation $\alpha$ expressed with the following formula 45 is discussed. Hereinafter, such position is denoted with j in order to avoid cumbersome explanations.

$$\alpha = 2\pi\left(\frac{d^2}{2R}\right)/\gamma = \frac{\pi}{\gamma} \cdot \frac{d^2}{R} \quad \{\text{Formula 45}\}$$

$$e^{j\alpha} = \pm j \quad \{\text{Formula 46}\}$$

The communication channel matrix in this state is expressed with the following formula 47.

$$H = \begin{bmatrix} 1 & e^{-j\alpha} \cdot e^{j\Phi} \\ e^{-j\alpha} & 1 \cdot e^{j\Phi} \end{bmatrix} \Rightarrow \begin{bmatrix} 1 & -j \cdot e^{j\Phi} \\ -j & 1 \cdot e^{j\Phi} \end{bmatrix} \quad \{\text{Formula 47}\}$$

Starting from the following formula 48, the eigenequation is rendered into a multiple root based on the following formula 49. In the case of such multiple root, the following conversion is feasible.

$$\Omega' = \quad \{\text{Formula 48}\}$$

$$H \cdot H^H = \begin{bmatrix} 1 & -j \cdot e^{j\Phi} \\ -j & 1 \cdot e^{j\Phi} \end{bmatrix} \cdot \begin{bmatrix} 1 & j \\ j \cdot e^{-j\Phi} & 1 \cdot e^{-j\Phi} \end{bmatrix} = \begin{bmatrix} 2 & 0 \\ 0 & 2 \end{bmatrix}$$

$$\begin{vmatrix} 2-\lambda & 0 \\ 0 & 2-\lambda \end{vmatrix} = (2-\lambda)^2 \quad \{\text{Formula 49}\}$$

Now, for a certain eigenvector $u_1$ for the eigenvalue $\lambda$, the following formula 50 is established.

$$\Omega' \cdot u_1 = \lambda \cdot u_1 \quad \{\text{Formula 50}\}$$

Likewise, for another eigenvector $u_2$ for the eigenvalue $\lambda$, the following formula 51 is established.

$$\Omega' \cdot u_2 = \lambda \cdot u_2 \quad \{\text{Formula 51}\}$$

Accordingly, for the linear sum of both of eigenvectors, the following formula 52 is established, so that the linear sum $(c_1 \cdot u_1 + c_2 \cdot u_2)$ also becomes an eigenvector.

$$\Omega' \cdot (c_1 \cdot u_1 + c_2 \cdot u_2) = \lambda \cdot (c_1 \cdot u_1 + c_2 \cdot u_2) \quad \{\text{Formula 52}\}$$

Thus, assuming that an asymptotic eigenvector from the other conditions is expressed with the following formula 53 for the multiple root, the following formula 55 is established based on the following formula 54.

$$\begin{bmatrix} a \\ b \end{bmatrix} \quad \{\text{Formula 53}\}$$

$$\begin{bmatrix} 2-\lambda & 2\cdot\cos\alpha \\ 2\cdot\cos\alpha & 2-\lambda \end{bmatrix} \cdot \begin{bmatrix} a \\ b \end{bmatrix} = 0 \quad \{\text{Formula 54}\}$$

$$a = \frac{-2\cdot\cos\alpha}{2-\lambda}b = \frac{\cos\alpha}{\pm\cos\alpha}b = \pm b \therefore \lambda = 2 \pm 2\cos\alpha \quad \{\text{Formula 55}\}$$

By the way, both members of the following formula 56 being multiplied by $u^H$ from the left side thereof, the following formula 57 is established.

$$\Omega' \cdot u = \lambda \cdot u \quad \{\text{Formula 56}\}$$

$$u^H \cdot \Omega' \cdot u = \lambda \quad \{\text{Formula 57}\}$$

Further, gathering orthogonal u, the following formula 58 is established.

$$U^H \cdot \Omega' \cdot U = \Lambda \therefore \Omega' = U \cdot \Lambda \cdot U^H \quad \{\text{Formula 58}\}$$

Further, starting from the following formula 59, the following formula 61 is established with the aforesaid eigenvector expressed with the following formula 60 gathered and standardization and orthogonality taken into account.

$$\Omega' = H \cdot H^H = U \cdot \Lambda^{1/2} \cdot V^H \cdot V \cdot \Lambda^{1/2} \cdot U^H = U \cdot \Lambda \cdot U^H \quad \{\text{Formula 59}\}$$

$$u = \begin{bmatrix} a \\ \pm a \end{bmatrix} \quad \{\text{Formula 60}\}$$

$$u_1 = \begin{bmatrix} x \\ x \end{bmatrix}, u_2 = \begin{bmatrix} x \\ -x \end{bmatrix} \quad \{\text{Formula 61}\}$$

Addition and subtraction being considered as the linear combination, the following formula 62 is established, based on which the following formula 63 is established.

$$u_1 + u_2 = \begin{bmatrix} 2x \\ 0 \end{bmatrix}, u_1 - u_2 = \begin{bmatrix} 0 \\ 2x \end{bmatrix} \quad \{\text{Formula 62}\}$$

$$U = \begin{bmatrix} 1 & 0 \\ 0 & 1 \end{bmatrix} \quad \{\text{Formula 63}\}$$

Further, starting from the following formula 64, the following formula 65 is established.

$$H = U \cdot \Lambda^{1/2} \cdot V^H = \quad \{\text{Formula 64}\}$$

$$\begin{bmatrix} 1 & -j \cdot e^{j\Phi} \\ -j & 1 \cdot e^{j\Phi} \end{bmatrix} = \begin{bmatrix} 1 & 0 \\ 0 & 1 \end{bmatrix} \cdot \begin{bmatrix} \sqrt{2} & 0 \\ 0 & \sqrt{2} \end{bmatrix} \cdot V^H$$

$$V^H = \begin{bmatrix} \frac{1}{\sqrt{2}} & 0 \\ 0 & \frac{1}{\sqrt{2}} \end{bmatrix} \cdot \begin{bmatrix} 1 & -j \cdot e^{j\Phi} \\ -j & 1 \cdot e^{j\Phi} \end{bmatrix} = \begin{bmatrix} \frac{1}{\sqrt{2}} & \frac{-j \cdot e^{j\Phi}}{\sqrt{2}} \\ \frac{-j}{\sqrt{2}} & \frac{e^{j\Phi}}{\sqrt{2}} \end{bmatrix} \quad \{\text{Formula 65}\}$$

In attempt, H being calculated from U, $\Lambda^{1/2}$ and $V^H$ determined herein, the following formula 66 is established in which the communication channel matrix holds firm. The above is simply one example, so that there are various decomposition methods in the similar way to the above according to a singular point arising with an eigenvalue rendered into a multiple root.

$$H = U \cdot \Lambda^{1/2} \cdot V^H \quad \{\text{Formula 66}\}$$

$$= \begin{bmatrix} 1 & 0 \\ 0 & 1 \end{bmatrix} \cdot \begin{bmatrix} \sqrt{2} & 0 \\ 0 & \sqrt{2} \end{bmatrix} \cdot \begin{bmatrix} \frac{1}{\sqrt{2}} & \frac{-j \cdot e^{j\Phi}}{\sqrt{2}} \\ \frac{-j}{\sqrt{2}} & \frac{e^{j\Phi}}{\sqrt{2}} \end{bmatrix}$$

$$= \begin{bmatrix} 1 & -j \cdot e^{j\Phi} \\ -j & e^{j\Phi} \end{bmatrix}$$

In the first place, an exemplified arrangement (1) in which the matrix operation is carried out only on the transmitting side is shown.

(Exemplified Arrangement (1): In the Case of the Matrix Operation being Carried Out Only on the Transmitting Side)

(Singular Value Orthogonal Matrix $\Lambda^{1/2}$)

The case is where there are virtual orthogonal channels of the same value, so that the following formula 67 is established.

$$\Lambda^{1/2} = \begin{bmatrix} \sqrt{\lambda_1} & 0 \\ 0 & \sqrt{\lambda_2} \end{bmatrix} = \quad \{\text{Formula 67}\}$$

$$\begin{bmatrix} \sqrt{2+2\cos\alpha} & 0 \\ 0 & \sqrt{2-2\cos\alpha} \end{bmatrix} = \begin{bmatrix} \sqrt{2} & 0 \\ 0 & \sqrt{2} \end{bmatrix}$$

(Communication Channel Matrix H)

The communication channel matrix is expressed with the following formula 68.

$$H = U \cdot \Lambda^{1/2} \cdot V^H \quad \{\text{Formula 68}\}$$

$$= \begin{bmatrix} 1 & 0 \\ 0 & 1 \end{bmatrix} \cdot \begin{bmatrix} \sqrt{2} & 0 \\ 0 & \sqrt{2} \end{bmatrix} \cdot \begin{bmatrix} \frac{1}{\sqrt{2}} & \frac{-j \cdot e^{j\Phi}}{\sqrt{2}} \\ \frac{-j \cdot}{\sqrt{2}} & \frac{e^{j\Phi}}{\sqrt{2}} \end{bmatrix}$$

$$\therefore V = \begin{bmatrix} V_{11} & V_{12} \\ V_{21} & V_{22} \end{bmatrix} = \begin{bmatrix} \frac{1}{\sqrt{2}} & \frac{j}{\sqrt{2}} \\ \frac{j \cdot e^{-j\Phi}}{\sqrt{2}} & \frac{e^{-j\Phi}}{\sqrt{2}} \end{bmatrix}$$

$$U^H = \begin{bmatrix} U_{11} & U_{12} \\ U_{21} & U_{22} \end{bmatrix} = \begin{bmatrix} 1 & 0 \\ 0 & 1 \end{bmatrix}$$

$$\text{where; } \alpha = 2\pi \left(\frac{d_R^2}{2R}\right) / \gamma = \frac{\pi}{\gamma} \cdot \frac{d_R^2}{R} = \frac{\pi}{2}$$

Figure 3:
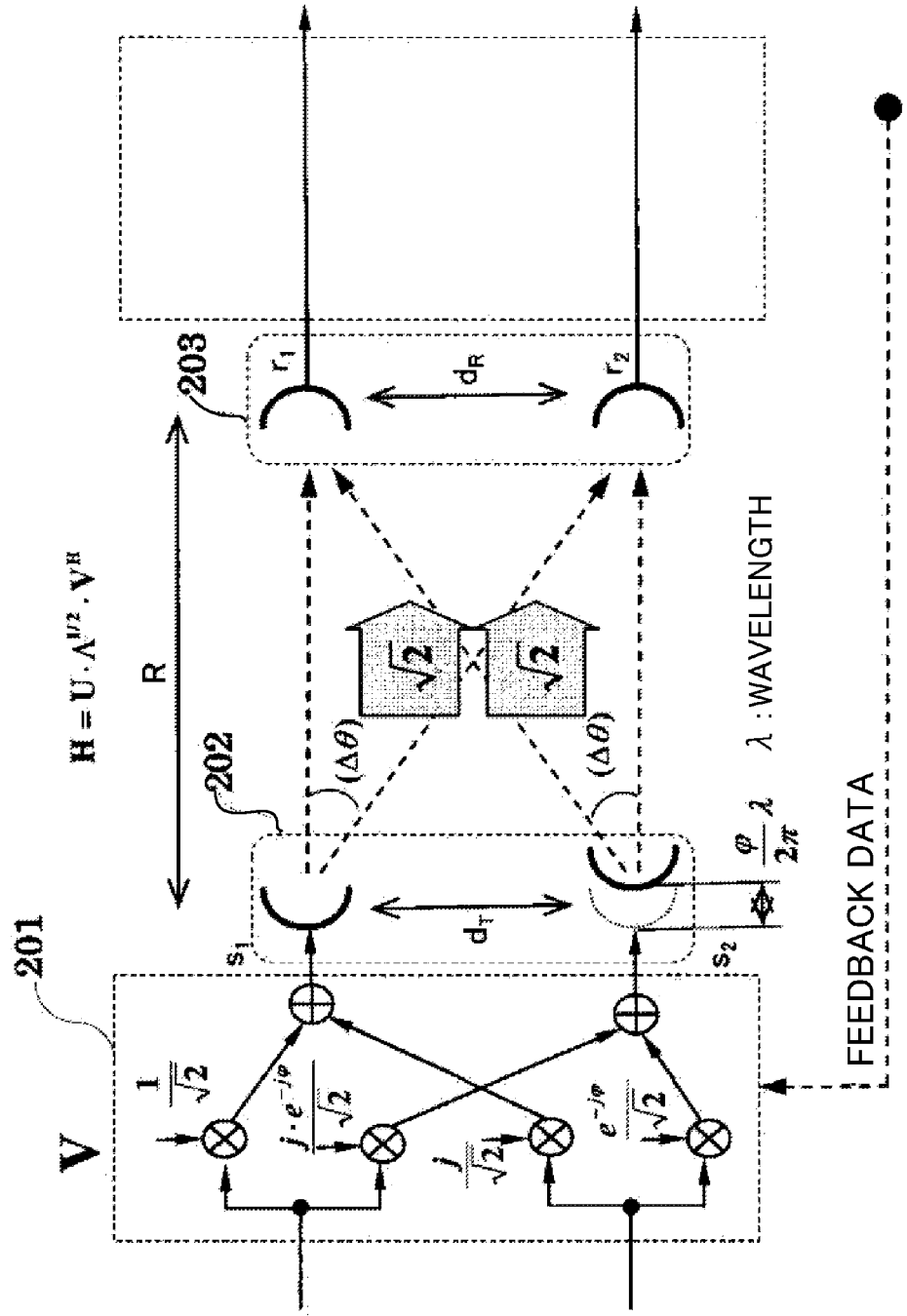
FIG. 3 shows an exemplified arrangement (1) of the line-of-sight MIMO communication system embodied in the present invention, in which the operation by the unitary matrix V only on the transmitting side is used.

FIG. 3 shows the arrangement based on the foregoing results.

In FIG. 3, the transmission signal processed at the matrix operation processing unit 201 by the unitary matrix V on the transmitting side is transmitted as $s_1$ and $s_2$ from the fixed antenna unit 202 including plural antennas. Here, $s_1$ and $s_2$ adopt signal descriptions according to equivalent low-pass representations, in which the processing of frequency conversion is omitted to avoid cumbersomeness.

The signals transmitted this way are received as $r_1$ and $r_2$ by the fixed antenna unit 203 including plural antennas on the receiving side. Here, $r_1$ and $r_2$ adopt signal descriptions according to equivalent low-pass representations, in which the frequency conversion to the baseband is omitted.

The arrangement shown in FIG. 3 is characterized in that there is no matrix operation processing unit by the unitary matrix U on the receiving side and the entire matrix operation is carried out only on the transmitting side. It is also characterized in that as verified by the formula 68 just with the matrix operation only on the transmitting side the aforesaid unitary matrix includes the fluctuation of the channel caused by the external factors such as the positional fluctuation (modeled with $\Phi$ in FIG. 3) of highly sensitive antennas against subtle climate conditions such as the wind and the surrounding temperature and acts accordingly to compensate for the directional displacement of highly sensitive antennas if any caused by such fluctuation of the channel.

To note, according to the arrangement shown in FIG. 3, it requires that the feedback data for the purpose of constructing the V matrix is delivered from the receiving end to the transmitting end. The bold arrow signs indicated in FIG. 3 show the virtual orthogonal channels whose quality is constructed in proportion to $2^{1/2}$ and $2^{1/2}$. Further, the antennas adoptable herein include parabola antennas, horn antennas and the like, but the present invention is not limited to such antennas.

Then, an exemplified arrangement (2) is shown in which virtual orthogonal channels having a different path thickness are formed and the matrix operation is carried out only on the transmitting side.

(Exemplified Arrangement (2): In the Case of Virtual Orthogonal Channels Having a Different Path Thickness in which the Matrix Operation is Carried Out Only on the Transmitting Side)

(Singular Value Orthogonal Matrix $\Lambda^{1/2}$)

This is the case where there are virtual orthogonal channels having different values, so that the following formula 69 is established.

$$\Lambda^{1/2} = \begin{bmatrix} \sqrt{\lambda_1} & 0 \\ 0 & \sqrt{\lambda_2} \end{bmatrix} = \quad \{\text{Formula 69}\}$$

$$\begin{bmatrix} \sqrt{2+2\cos\alpha} & 0 \\ 0 & \sqrt{2-2\cos\alpha} \end{bmatrix}$$

$$= \begin{bmatrix} 2\cos\left(\frac{\alpha}{2}\right) & 0 \\ 0 & 2\sin\left(\frac{\alpha}{2}\right) \end{bmatrix} =$$

$$\begin{bmatrix} \left(e^{j\frac{\alpha}{2}} + e^{-j\frac{\alpha}{2}}\right) & 0 \\ 0 & -j\left(e^{j\frac{\alpha}{2}} - e^{-j\frac{\alpha}{2}}\right) \end{bmatrix}$$

(Communication Channel Matrix H)

$$H = U \cdot \Lambda^{1/2} \cdot V^H$$

$$= \begin{bmatrix} 1 & 0 \\ 0 & 1 \end{bmatrix} \cdot \begin{bmatrix} 2\cos\left(\frac{\alpha}{2}\right) & 0 \\ 0 & 2\sin\left(\frac{\alpha}{2}\right) \end{bmatrix} \cdot \begin{bmatrix} \dfrac{1}{2\cos\left(\frac{\alpha}{2}\right)} & \dfrac{e^{-j\alpha} \cdot e^{j\Phi}}{2\cos\left(\frac{\alpha}{2}\right)} \\ \dfrac{e^{-j\alpha}}{2\sin\left(\frac{\alpha}{2}\right)} & \dfrac{e^{jK}}{2\sin\left(\frac{\alpha}{2}\right)} \end{bmatrix}$$

$$= \begin{bmatrix} 1 & e^{-j\alpha} \cdot e^{j\Phi} \\ e^{-j\alpha} & 1 \cdot e^{j\Phi} \end{bmatrix}$$

Starting from the following formula 70 expressing the communication channel matrix, the following formula 71 is established.

$$H = U \cdot \Lambda^{1/2} \cdot V^H = \begin{bmatrix} 1 & e^{-j\alpha} \cdot e^{j\Phi} \\ e^{-j\alpha} & 1 \cdot e^{j\Phi} \end{bmatrix} = \qquad \{\text{Formula 70}\}$$

$$\begin{bmatrix} 1 & 0 \\ 0 & 1 \end{bmatrix} \cdot \begin{bmatrix} \left(e^{j\frac{\alpha}{2}} + e^{-j\frac{\alpha}{2}}\right) & 0 \\ 0 & -j\left(e^{j\frac{\alpha}{2}} - e^{-j\frac{\alpha}{2}}\right) \end{bmatrix} \cdot V^H$$

$$V^H = \qquad \{\text{Formula 71}\}$$

$$\begin{bmatrix} \left(e^{j\frac{\alpha}{2}} + e^{-j\frac{\alpha}{2}}\right) & 0 \\ 0 & -j\left(e^{j\frac{\alpha}{2}} - e^{-j\frac{\alpha}{2}}\right) \end{bmatrix}^{-1} \cdot \begin{bmatrix} 1 & e^{-j\alpha} \cdot e^{j\Phi} \\ e^{-j\alpha} & 1 \cdot e^{j\Phi} \end{bmatrix}$$

Here, starting from the following formula 72, the following formula 73 is established.

$$\frac{1}{\left(e^{j\frac{\alpha}{2}} + e^{-j\frac{\alpha}{2}}\right)} = \frac{1}{2\cos\left(\frac{\alpha}{2}\right)}, \frac{1}{-j\left(e^{j\frac{\alpha}{2}} - e^{-j\frac{\alpha}{2}}\right)} = \frac{1}{2\sin\left(\frac{\alpha}{2}\right)} \quad \{\text{Formula 72}\}$$

$$V^H = \begin{bmatrix} \dfrac{1}{2\cos\left(\frac{\alpha}{2}\right)} & 0 \\ 0 & \dfrac{1}{2\sin\left(\frac{\alpha}{2}\right)} \end{bmatrix} \cdot \begin{bmatrix} 1 & e^{-j\alpha} \cdot e^{j\Phi} \\ e^{-j\alpha} & 1 \cdot e^{j\Phi} \end{bmatrix} \quad \{\text{Formula 73}\}$$

$$= \begin{bmatrix} \dfrac{1}{2\cos\left(\frac{\alpha}{2}\right)} & \dfrac{e^{-j\alpha} \cdot e^{j\Phi}}{2\cos\left(\frac{\alpha}{2}\right)} \\ \dfrac{e^{-j\alpha}}{2\sin\left(\frac{\alpha}{2}\right)} & \dfrac{e^{j\Phi}}{2\sin\left(\frac{\alpha}{2}\right)} \end{bmatrix}$$

To note, referring to the square norm of the vector, the following formula 74 is established, so that $V^H$ is not the unitary matrix any more. Thus, in order to determine V, inverse matrix operation is required.

$$\frac{1}{4 \cdot \cos^2\left(\frac{\alpha}{2}\right)} + \frac{1}{4 \cdot \sin^2\left(\frac{\alpha}{2}\right)} = \qquad \{\text{Formula 74}\}$$

$$\frac{4}{16 \cdot \sin^2\left(\frac{\alpha}{2}\right) \cdot \cos^2\left(\frac{\alpha}{2}\right)} = \frac{1}{2 \cdot \sin^2(\alpha)}$$

In attempt, H being calculated based on U, $\Lambda^{1/2}$ and $V^H$ determined herein, it is known that the following formula 75 is established in which the communication channel matrix holds firm. {Formula 75}

Then, considering the inverse matrix V of $V^H$, the inverse matrix of an arbitrary matrix expressed with the following formula 76 is expressed with the following formula 77.

$$A = \begin{bmatrix} a_{11} & a_{12} \\ a_{21} & a_{22} \end{bmatrix} \qquad \{\text{Formula 76}\}$$

$$A^{-1} = \frac{1}{a_{11}a_{22} - a_{12}a_{21}} \begin{bmatrix} a_{22} & -a_{12} \\ -a_{21} & a_{11} \end{bmatrix} \qquad \{\text{Formula 77}\}$$

$$\left( \because AA^{-1} = \frac{1}{a_{11}a_{22} - a_{12}a_{21}} \begin{bmatrix} a_{11} & a_{12} \\ a_{21} & a_{22} \end{bmatrix} \cdot \begin{bmatrix} a_{22} & -a_{12} \\ -a_{21} & a_{11} \end{bmatrix} \right.$$

$$\left. = \frac{1}{a_{11}a_{22} - a_{12}a_{21}} \begin{bmatrix} a_{11}a_{22} - a_{12}a_{21} & 0 \\ 0 & a_{11}a_{22} - a_{12}a_{21} \end{bmatrix} \right)$$

Accordingly, the following formula 78 is established.

$$V = \begin{bmatrix} \dfrac{1}{2\cos\left(\frac{\alpha}{2}\right)} & \dfrac{e^{-j\alpha} \cdot e^{j\Phi}}{2\cos\left(\frac{\alpha}{2}\right)} \\ \dfrac{e^{-j\alpha}}{2\sin\left(\frac{\alpha}{2}\right)} & \dfrac{e^{j\Phi}}{2\sin\left(\frac{\alpha}{2}\right)} \end{bmatrix}^{-1} = \qquad \{\text{Formula 78}\}$$

$$\frac{1}{\dfrac{1}{2\cos\left(\frac{\alpha}{2}\right)} \cdot \dfrac{e^{j\Phi}}{2\sin\left(\frac{\alpha}{2}\right)} - \dfrac{e^{-j\alpha} \cdot e^{j\Phi}}{2\cos\left(\frac{\alpha}{2}\right)} \cdot \dfrac{e^{-j\alpha}}{2\sin\left(\frac{\alpha}{2}\right)}}$$

$$\begin{bmatrix} \dfrac{e^{j\Phi}}{2\sin\left(\frac{\alpha}{2}\right)} & -\dfrac{e^{-j\alpha} \cdot e^{j\Phi}}{2\cos\left(\frac{\alpha}{2}\right)} \\ -\dfrac{e^{-j\alpha}}{2\sin\left(\frac{\alpha}{2}\right)} & \dfrac{1}{2\cos\left(\frac{\alpha}{2}\right)} \end{bmatrix} =$$

$$\frac{2 \cdot \left(2 \cdot \sin\left(\frac{\alpha}{2}\right) \cdot \cos\left(\frac{\alpha}{2}\right)\right)}{1 - e^{-j2\alpha}} \begin{bmatrix} \dfrac{1}{2\sin\left(\frac{\alpha}{2}\right)} & -\dfrac{e^{-j\alpha}}{2\cos\left(\frac{\alpha}{2}\right)} \\ -\dfrac{e^{-j\alpha} \cdot e^{j\Phi}}{2\sin\left(\frac{\alpha}{2}\right)} & \dfrac{e^{j\Phi}}{2\cos\left(\frac{\alpha}{2}\right)} \end{bmatrix} =$$

-continued $$\frac{2}{1-e^{-j2\alpha}} \begin{bmatrix} \cos(\frac{\alpha}{2}) & -e^{-j\alpha}\sin(\frac{\alpha}{2}) \\ -e^{-j\Phi} \cdot e^{-j\alpha}\cos(\frac{\alpha}{2}) & e^{-j\Phi}\sin(\frac{\alpha}{2}) \end{bmatrix} =$$

$$\frac{2}{e^{j\alpha}-e^{-j\alpha}} \begin{bmatrix} e^{j\alpha}\cos(\frac{\alpha}{2}) & -\sin(\frac{\alpha}{2}) \\ -e^{-j\Phi}\cos(\frac{\alpha}{2}) & e^{-j\Phi}e^{j\alpha}\sin(\frac{\alpha}{2}) \end{bmatrix} =$$

$$\frac{1}{j\sin\alpha} \begin{bmatrix} e^{j\alpha}\cos(\frac{\alpha}{2}) & -\sin(\frac{\alpha}{2}) \\ -e^{-j\Phi}\cos(\frac{\alpha}{2}) & e^{-j\Phi}e^{j\alpha}\sin(\frac{\alpha}{2}) \end{bmatrix} =$$

$$\begin{bmatrix} -je^{j\alpha}\frac{\cos(\alpha/2)}{\sin\alpha} & \frac{j\sin(\alpha/2)}{\sin\alpha} \\ \frac{je^{-j\Phi}\cos(\alpha/2)}{\sin\alpha} & -\frac{je^{-j\Phi}e^{j\alpha}\sin(\alpha/2)}{\sin\alpha} \end{bmatrix}$$

where; $\alpha = 2\pi\left(\frac{d_R^2}{2R}\right) / \gamma = \frac{\pi}{\gamma} \cdot \frac{d_R^2}{R}$ FIG. 4 shows the arrangement based on the foregoing results.

Figure 4:
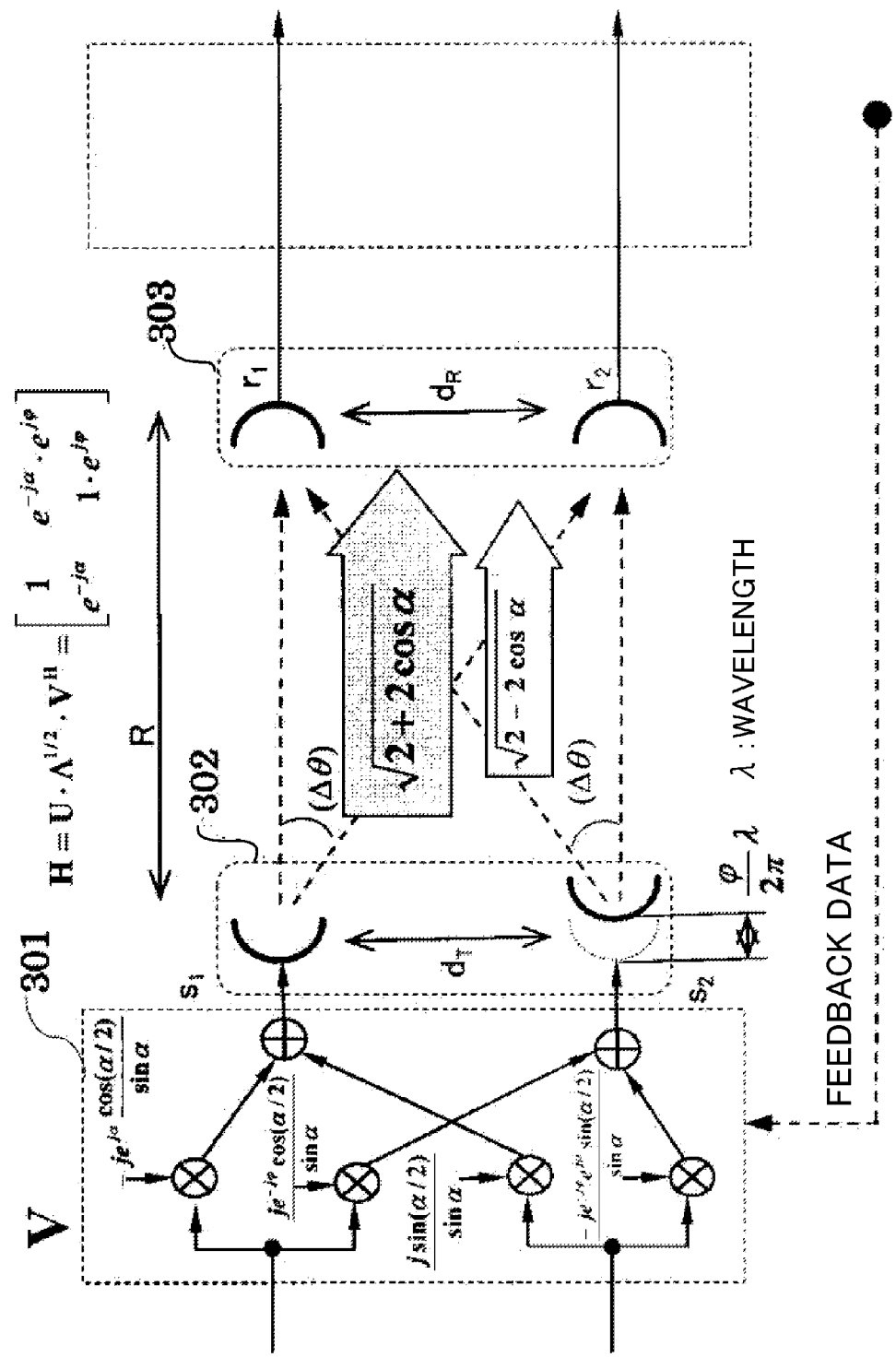
FIG. 4 shows an exemplified arrangement (2) of the line-of-sight MIMO communication system embodied in the present invention, in which an example where the virtual orthogonal channels having different values are formed by the matrix operation only on the transmitting side is shown.

In FIG. 4, the transmission signal processed at the matrix operation processing unit 301 by the matrix V on the transmitting side is transmitted as $s_1$ and $s_2$ from the fixed antenna unit 302 including plural antennas. Here, $s_1$ and $s_2$ adopt signal descriptions according to equivalent low-pass representations, in which the processing of frequency conversion is omitted to avoid cumbersomeness.

The signals transmitted in this way are received as $r_1$ and $r_2$ by the fixed antenna unit 303 including plural antennas. Here, $r_1$ and $r_2$ adopt signal descriptions according to equivalent low-pass representations, in which the frequency conversion into the baseband is omitted.

The arrangement shown in FIG. 4 is characterized in that there is no matrix operation processing unit by the matrix U on the receiving side and the entire matrix operation is carried out only on the transmitting side. It is also characterized in that as verified by the formula 78 just with the matrix operation only on the transmitting side the aforesaid matrix includes the fluctuation of the channel caused by the external factors such as the positional fluctuation (modeled with Φ in FIG. 4) of highly sensitive antennas against subtle climate conditions such as the wind and the surrounding temperature and acts accordingly to compensate for the directional displacement of highly sensitive antennas if any caused by such fluctuation of the channel.

To note, according to the arrangement shown in FIG. 4, it requires that the feedback data for the purpose of constructing the V matrix is delivered from the receiving end to the transmitting end. Further, the antennas adoptable herein include parabola antennas, horn antennas and the like, but the present invention is not limited to such antennas.

In this way, it is seen that the formation of the virtual orthogonal channel is feasible at positions other than the optimum positions: R=5000 m; and $d_T$=$d_R$=5 m as exemplified above and further such formation is realized only by the matrix processing on the transmitting side.

Figure 5:
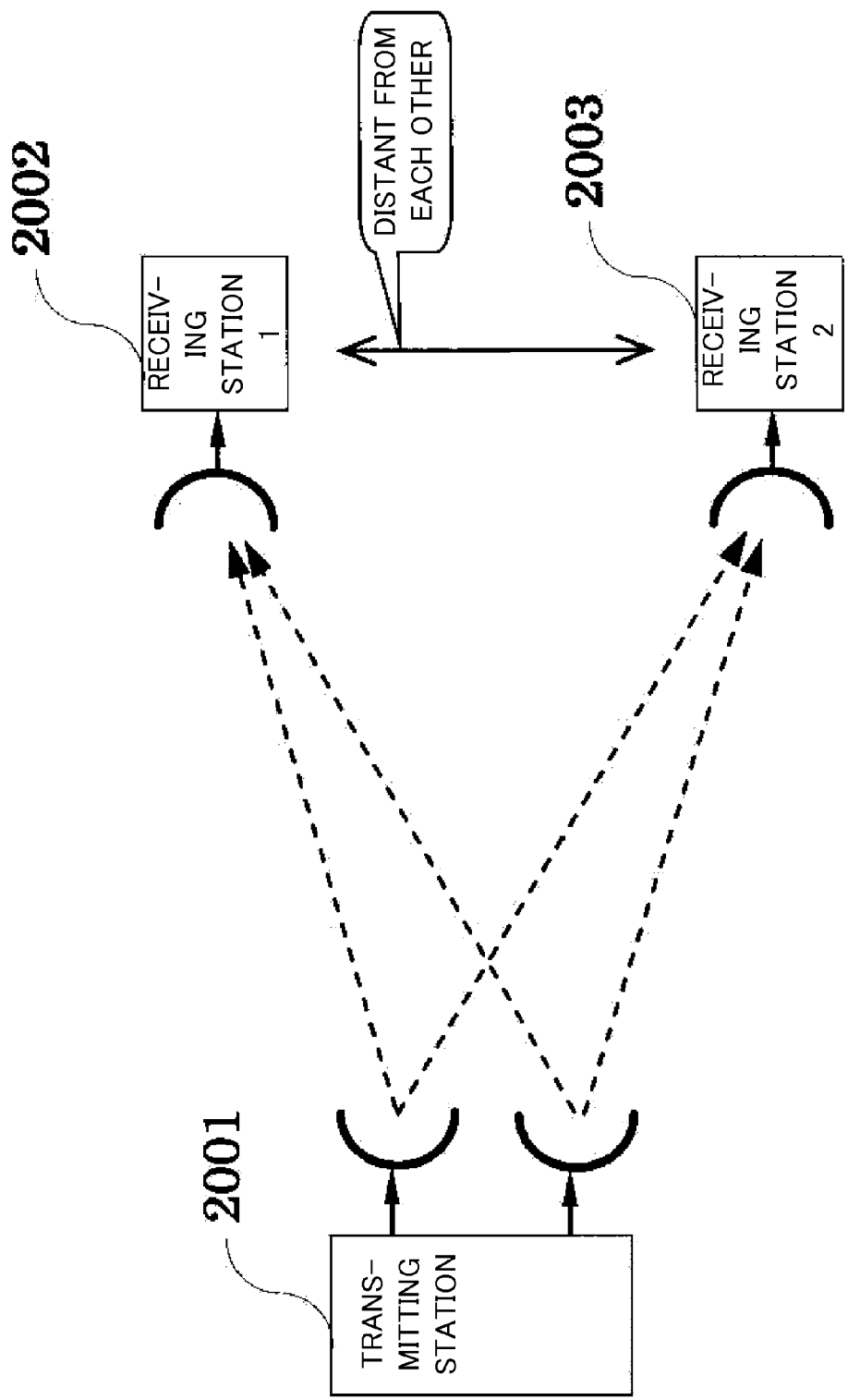
FIG. 5 shows an application example of the matrix operation arrangement only on transmission.

FIG. 5 shows an application example in which the matrix operation is carried out only on the transmitting side as described above. In FIG. 5, it is shown that plural antennas are provided at a transmitting station 2001 near a trunk network and one antenna is provided at a receiving station 2002 and a receiving station 2003 respectively near a user network. The receiving station 2001 is distant away from the receiving station 2003, so that the matrix operation is infeasible. In contrast, as such operation is feasible at the transmitting station 2001, the matrix operation arrangement only on the transmitting side as described above is applicable thereto. To note, it is needless to say that such conception as mentioned above entailing the arrangement of one station versus multiple stations is applicable in the form of the arrangement of multiple stations versus one station to the matrix operation arrangement only on the receiving side to be described as follows.

Then, an exemplified arrangement (3) in which the unitary matrix operation is carried out only on the receiving side is shown as follows.

(Exemplified Arrangement (3): In the Case of the Unitary Matrix Operation being Carried Out Only on the Receiving Side and L.O. Independent Arrangement being Adopted on the Transmitting Side)

This exemplified arrangement (3) does not require that the feedback data is delivered from the receiving end to the transmitting end and the arrangement in which an independent local oscillator is adopted for each antenna on the transmitting end is feasible, in which the characteristics of this exemplified arrangement are completely the same as those of SVD system.

(Singular Value Orthogonal Matrix $\Lambda^{1/2}$)

Since the case is where there are virtual orthogonal channels having the same value, the singular value orthogonal matrix is expressed with the following formula 79.

$$\Lambda^{1/2} = \begin{bmatrix} \sqrt{\lambda_1} & 0 \\ 0 & \sqrt{\lambda_2} \end{bmatrix} = \begin{bmatrix} \sqrt{2+2\cos\alpha} & 0 \\ 0 & \sqrt{2-2\cos\alpha} \end{bmatrix} =$$

$$\begin{bmatrix} \sqrt{2} & 0 \\ 0 & \sqrt{2} \end{bmatrix}$$

{Formula 79}

(Communication Channel Matrix H)

The communication channel matrix H is established as the following formula 80.

$$H = U \cdot \Lambda^{1/2} \cdot V^H =$$

$$U \cdot \begin{bmatrix} \sqrt{2} & 0 \\ 0 & \sqrt{2} \end{bmatrix} \cdot \begin{bmatrix} 1 & 0 \\ 0 & 1 \end{bmatrix} \text{ where; } \Phi = \Phi_L + \Phi_A$$

$$\therefore U = \begin{bmatrix} U_{11} & U_{12} \\ U_{21} & U_{22} \end{bmatrix}$$

$$= \begin{bmatrix} 1 & -j \cdot e^{j\Phi} \\ -j & 1 \cdot e^{j\Phi} \end{bmatrix} \cdot \begin{bmatrix} 1/\sqrt{2} & 0 \\ 0 & 1/\sqrt{2} \end{bmatrix}$$

$$= \begin{bmatrix} 1/\sqrt{2} & -j \cdot e^{j\Phi}/\sqrt{2} \\ -j/\sqrt{2} & e^{j\Phi}/\sqrt{2} \end{bmatrix}$$

$$\therefore U^H = \begin{bmatrix} 1/\sqrt{2} & j/\sqrt{2} \\ j \cdot e^{-j\Phi}/\sqrt{2} & e^{-j\Phi}/\sqrt{2} \end{bmatrix} \text{ where;}$$

$$\alpha = 2\pi\left(\frac{d_R^2}{2R}\right) / \gamma = \frac{\pi}{\gamma} \cdot \frac{d_R^2}{R} = \frac{\pi}{2}$$

{Formula 80}

Figure 6:
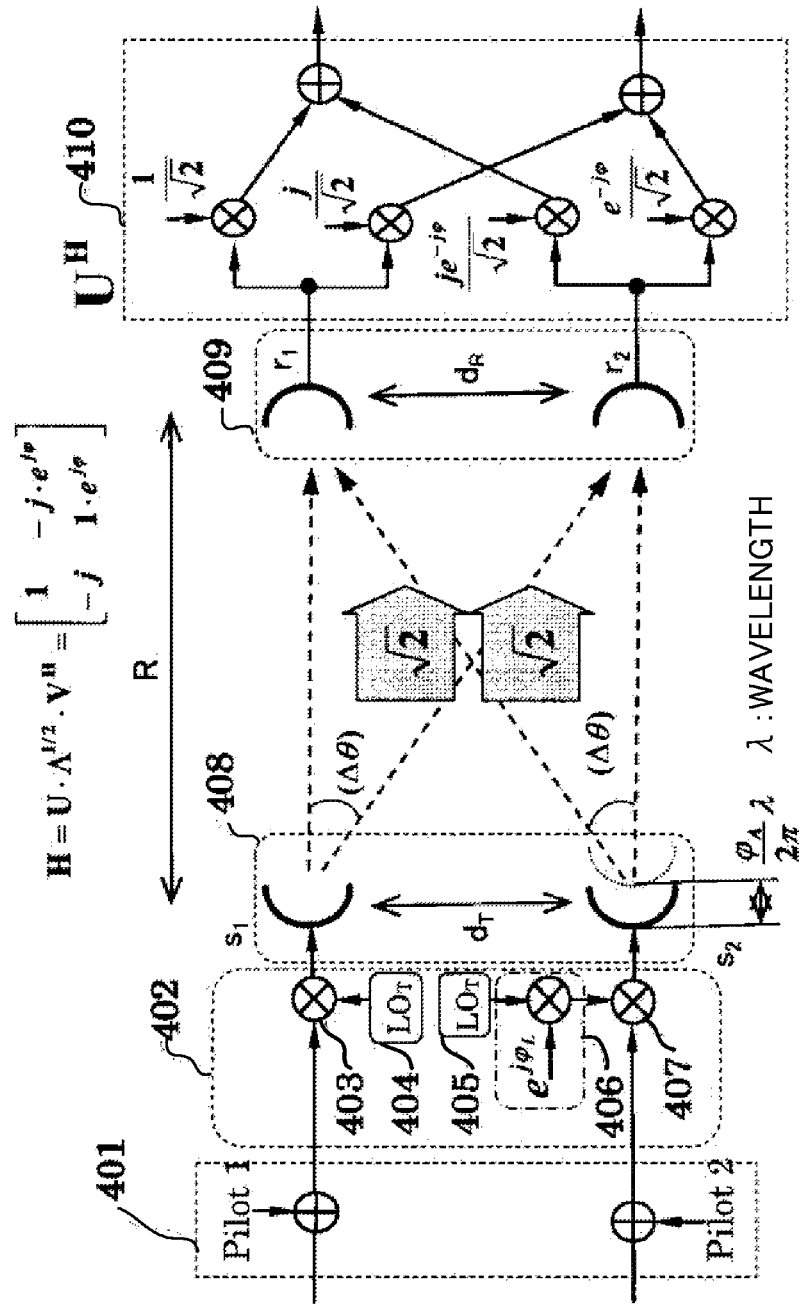
FIG. 6 shows an exemplified arrangement (3) of the line-of-sight MIMO communication system embodied in the present invention, in which a local oscillator is independently provided on the transmitting side by the unitary matrix operation only on the receiving side.

FIG. 6 shows the arrangement based on the foregoing results.

The arrangement shown in FIG. 6 is characterized in that there is no matrix operation processing unit by the unitary matrix V on the transmitting side and the entire matrix operation is carried out only on the receiving side. It is also characterized in that as verified by the formula 80 just with the matrix operation only on the receiving side the aforesaid matrix includes the fluctuation of the channel caused by the external factors such as the positional fluctuation (modeled with $\phi_\lambda$ in FIG. 6) of highly sensitive antennas against subtle climate conditions such as the wind and the surrounding temperature and acts accordingly to compensate for the directional displacement of highly sensitive antennas if any caused by such fluctuation of the channel.

Further, the most characteristic feature of the exemplified arrangement shown in FIG. 6 lies in the fact that the antenna-to-antenna spacing needs to be enlarged according to the frequency handled by the fixed microwaves communication system and the local oscillators are implemented near the antennas accordingly. In other words, there are characteristics in an independent local oscillator being adopted for each antenna on the transmitting side.

With reference to FIG. 6, after the transmission signal is added with a pilot signal for each antenna by a pilot signal generation unit 401, it is subjected to the frequency conversion into a wireless frequency by the frequency conversion unit 402 including local oscillators 404 and 405 and mixers 403 and 407 on the transmitting side so as to be transmitted as $s_1$ and $s_2$ from the fixed antenna unit 408 including plural antennas. Here, $s_1$ and $s_2$ adopt signal descriptions according to equivalent low-pass representations.

Here, attention shall be drawn to the fact that due to the fact that independent local oscillators 404 and 405 are adopted for each antenna, a phase noise $\Phi_L$ arises caused by the carrier synchronization not being carried out between the carriers of each antenna. Such noise is modeled with the reference sign 406 in FIG. 6. The signals transmitted this way are received as $r_1$ and $r_2$ by the fixed antenna unit 409 including plural antennas on the receiving side. Here, $r_1$ and $r_2$ adopt signal descriptions according to equivalent low-pass representations, in which the frequency conversion into the baseband is omitted. The respective received signals $r_1$ and $r_2$ are processed by the matrix operation processing unit 410 by the unitary matrix U on the receiving side, thereby, the separation/detection of the signals according to the MIMO communication system being completed.

Here, attention shall be drawn to the fact that the arrangement shown in FIG. 6 is characterized in that there is no matrix operation processing unit by the unitary matrix V on the transmitting side and the entire matrix operation is carried out only on the receiving side. It is also characterized in that as verified by the formula 80 just with the matrix operation only on the receiving side the aforesaid matrix includes the fluctuation of the channel caused by the external factors such as the positional fluctuation (modeled with $\phi_\lambda$ in FIG. 6) of highly sensitive antennas against subtle climate conditions such as the wind and the surrounding temperature and further includes the phase noise $\Phi_L$ caused by the carrier synchronization not being carried out so as to act accordingly to compensate for the directional displacement of highly sensitive antennas and the phase rotation between the carriers if any caused by such fluctuation of the channel.

To note, the most advantageous point of the exemplified arrangement (3) lies in the fact that it does not require that the feedback data for the purpose of constructing the V matrix is delivered from the receiving end to the transmitting end. The bold arrow signs shown in FIG. 6 indicate virtual orthogonal channels whose quality is constructed in proportion to $2^{1/2}$ and $2^{1/2}$. Further, the antennas adoptable herein include parabola antennas, horn antennas and the like, but the present invention is not limited to such antennas.

In this way, even in the arrangement in which the unitary matrix operation is not carried out on the transmitting end, the formation of the orthogonal channel is feasible. Further, if the phase difference $\Phi=\Phi_L+\Phi_A$ is detectable by the pilot signal, the construction of the virtual orthogonal channel is feasible even when the independent local oscillators might be used on the transmitting end. The orthogonal channel formed this way is not affected by the phase difference $\Phi$. Further, it does not require the feedback from the receiving end to the transmitting end. The matrix in use is the unitary matrix, so that the characteristics of the exemplified arrangement (3) become completely the same as those of SVD system.

Then, an exemplified arrangement (4), in which the virtual orthogonal channels having the same thickness are formed; independent local oscillators are adopted for each antenna on both of the transmitting and receiving sides; and the unitary operation is carried out only on the receiving side, is shown as follows.

(Exemplified Arrangement (4): In the Case of L.Os. Independent Arrangement being Adopted for Both of the Receiving and Transmitting Sides and the Unitary Matrix Operation being Carried Out Only on the Receiving Side)

This exemplified arrangement (4) does not require the feedback data from the receiving end to the transmitting end either. Further, it allows an independent local oscillator for each antenna to be adopted on both of the transmitting and receiving sides, in which the characteristics of the exemplified arrangement hereof are completely the same as those of SVD system. Moreover, analysis is made by making use of the fact that even when a serious phase rotation might occur on the transmitting antenna and the receiving antenna owing to the directional movement of highly sensitive antennas against such subtle climate conditions such as the wind and the surrounding temperature, such phase rotation all can be ascribed to the same modeling as that of the phase fluctuation by the local oscillators for each antenna. To note, according to the aforesaid theoretical analysis, it is analytically shown that the communication channel capacity for the aforesaid capacity enlargement does not change even when the directional displacement of such highly sensitive antennas might occur.

(Singular Value Orthogonal Matrix $\Lambda^{1/2}$)

The singular value orthogonal matrix is expressed with the following formula 81.

$$\Lambda^{1/2} = \begin{bmatrix} \sqrt{\lambda_1} & 0 \\ 0 & \sqrt{\lambda_2} \end{bmatrix} = \begin{bmatrix} \sqrt{2+2\cos\alpha} & 0 \\ 0 & \sqrt{2-2\cos\alpha} \end{bmatrix} = \begin{bmatrix} \sqrt{2} & 0 \\ 0 & \sqrt{2} \end{bmatrix} \quad \{\text{Formula 81}\}$$

(Communication Channel Matrix H)

The communication channel matrix is expressed with the following formula 82.

$$H = \begin{bmatrix} 1 & -j \cdot e^{j\Phi} \\ -j \cdot e^{j\phi} & 1 \cdot e^{j(\Phi+\phi)} \end{bmatrix} \quad \{\text{Formula 82}\}$$

$$= U \cdot \Lambda^{1/2} \cdot V^H =$$

$$U \cdot \begin{bmatrix} \sqrt{2} & 0 \\ 0 & \sqrt{2} \end{bmatrix} \cdot \begin{bmatrix} 1 & 0 \\ 0 & 1 \end{bmatrix} \text{ where; } \begin{cases} \Phi = \Phi_L + \Phi_A \\ \phi = \phi_L + \phi_A \end{cases}$$

-continued $$\therefore U = \begin{bmatrix} U_{11} & U_{12} \\ U_{21} & U_{22} \end{bmatrix}$$

$$= \begin{bmatrix} 1 & -j \cdot e^{j\Phi} \\ -j \cdot e^{j\phi} & 1 \cdot e^{j(\Phi+\phi)} \end{bmatrix} \cdot \begin{bmatrix} 1/\sqrt{2} & 0 \\ 0 & 1/\sqrt{2} \end{bmatrix}$$

$$= \begin{bmatrix} 1/\sqrt{2} & -j \cdot e^{j\Phi}/\sqrt{2} \\ -j \cdot e^{j\phi}/\sqrt{2} & e^{j(\Phi+\phi)}/\sqrt{2} \end{bmatrix}$$

$$\therefore U^H = \begin{bmatrix} 1/\sqrt{2} & j \cdot e^{-j\phi}/\sqrt{2} \\ j \cdot e^{-j\Phi}/\sqrt{2} & e^{-j(\Phi+\phi)}/\sqrt{2} \end{bmatrix} \text{ where;}$$

$$\alpha = 2\pi \left(\frac{d_R^2}{2R}\right) \Big/ \gamma = \frac{\pi}{\gamma} \cdot \frac{d_R^2}{R} = \frac{\pi}{2}$$

Figure 7:
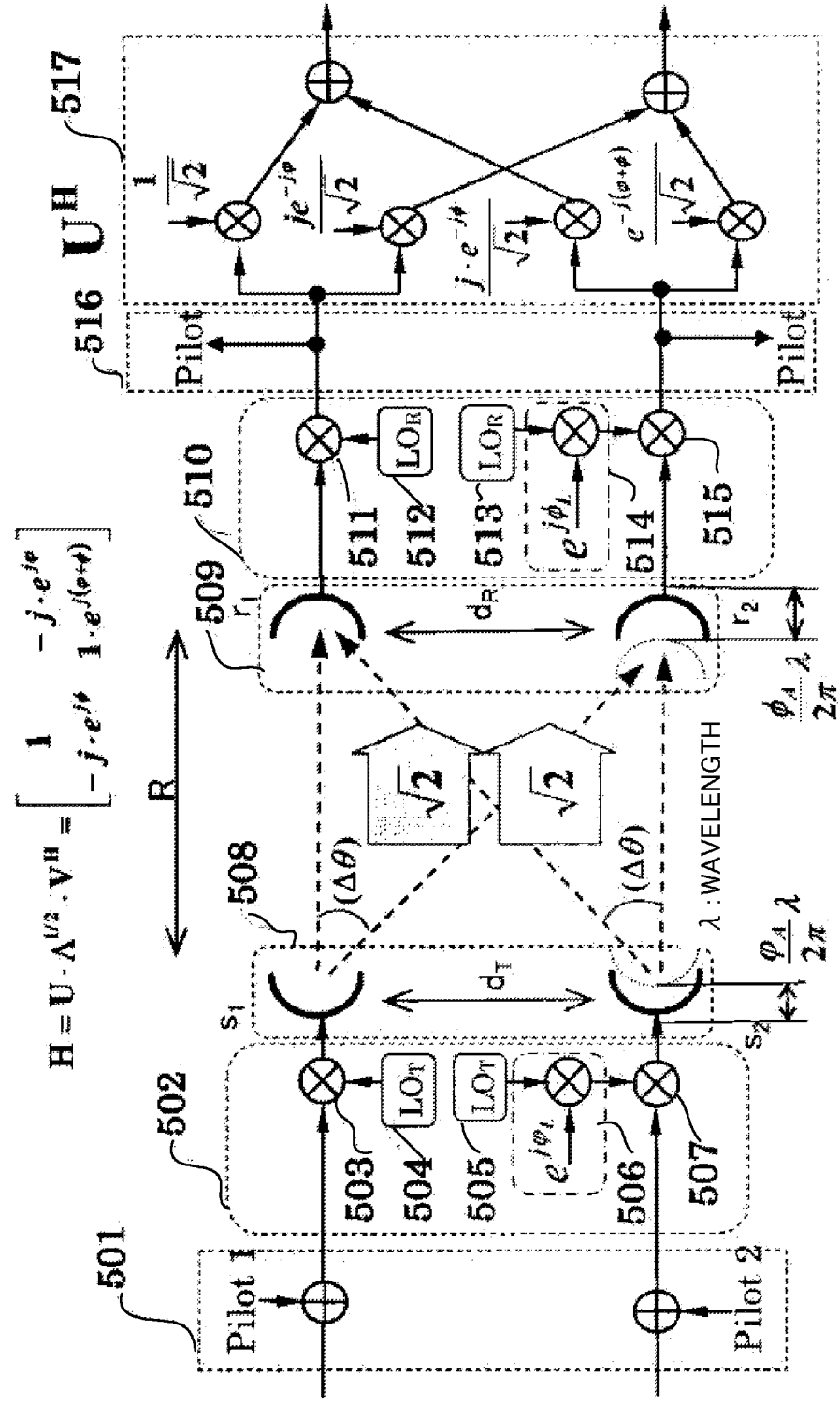
FIG. 7 shows an exemplified arrangement (4) of the line-of-sight MIMO communication system embodied in the present invention, in which local oscillators are independently provided on both the transmitting and receiving sides by the unitary matrix operation only on the receiving side.

FIG. 7 shows the arrangement based on the foregoing results.

The arrangement shown in FIG. 7 is characterized in that there is no matrix operation processing unit by the unitary matrix V on the transmitting side and the entire matrix operation is carried out only on the receiving side. It is also characterized in that just with the matrix operation only on the receiving side the aforesaid matrix includes the fluctuation of the channel caused by the external factors such as the positional fluctuation (modeled with $\Phi_A$ and $\phi_A$ in FIG. 7) of highly sensitive antennas against subtle climate conditions such as the wind and the surrounding temperature on the transmitting and receiving sides and acts accordingly to compensate for the directional displacement of highly sensitive antennas if any caused by such fluctuation of the channel.

Further, the exemplified arrangement hereof is characterized in that due to the fact that the antenna-to-antenna spacing needs to be enlarged in view of the frequency handled by the fixed microwaves communication system, the local oscillators are implemented near the antennas accordingly. In other words, the most characteristic feature hereof lies in that independent local oscillators are adopted for each antenna on both of the transmitting and receiving sides. In this way, even adopting independent local oscillators for each antenna on both of the transmitting and receiving sides, properly detecting the pilot signal permits the exemplified arrangement hereof to gain the equivalent characteristics to SVD system.

With reference to FIG. 7, after the transmission signal is added with a pilot signal for each antenna by the pilot signal generation unit 501, it is subjected to the frequency conversion into a wireless frequency by the frequency conversion unit 502 including local oscillators 504 and 505 and mixers 503 and 507 on the transmitting side so as to be transmitted as $s_1$ and $s_2$ from the fixed antenna unit 508 including plural antennas. Here, $s_1$ and $s_2$ adopt signal descriptions according to equivalent low-pass representations.

Here, attention shall be drawn to the fact that due to the fact that independent local oscillators 504 and 505 are adopted for each antenna, a phase noise $\Phi_L$ arises caused by the carrier synchronization not being carried out between the carriers of each antenna. Such noise is modeled with the reference sign 506 in FIG. 7. The signals transmitted this way are received as $r_1$ and $r_2$ by the fixed antenna unit 509 including plural antennas on the receiving side. Here, $r_1$ and $r_2$ adopt signal descriptions according to equivalent low-pass representations.

After the received signals $r_1$ and $r_2$ are subjected to the frequency conversion into the baseband by the frequency conversion unit 510 including the local oscillators 512 and 513 and mixers 511 and 515 on the receiving side, they are processed by the matrix operation processing unit 517 by the unitary matrix U on the receiving side via the pilot signal detection unit 516, thereby, the separation/detection of the signals according to the MIMO communication system being completed.

Here, upon executing the processing on the receiving side, attention shall be drawn to the fact that due to the fact that independent local oscillators 512 and 513 are adopted for each antenna, a phase noise $\Phi_L$ arises caused by the carrier synchronization not being carried out between the carriers of each antenna. Such noise is modeled with the reference sign 514 in FIG. 7. Further, the antennas adoptable herein include parabola antennas, horn antennas and the like, but the present invention is not limited to such antennas.

At the pilot signal detection unit 516, the pilot signal generation step is placed before the processing by the local oscillators on the transmitting side and the pilot detection step is placed after the processing by the local oscillators on the receiving side, so that the detections of the phase differences $\Phi=\Phi_L+\Phi_A$ and $\Phi=\Phi_L+\Phi_A$ represented in the formula 82 are feasible, which allows the entire matrix operation to be carried out only on the receiving side by omitting the matrix operation processing unit by the unitary matrix V on the transmitting side. This is because as verified by the formula 82 the unitary matrix acts to compensate for the fluctuation of the channel caused by the external factors such as the positional fluctuation (modeled with $\Phi_A$ and $\phi_A$ in FIG. 7) of highly sensitive antennas against subtle climate conditions such as the wind and the surrounding temperature and the phase noises $\Phi_L$ and $\phi_L$ caused by the carrier synchronization not being carried out.

To note, the most advantageous point of the exemplified arrangement hereof lies in the fact that it does not require that the feedback data for the purpose of constructing the V matrix is delivered from the receiving end to the transmitting end. The bold arrow signs shown in FIG. 7 indicate virtual orthogonal channels whose quality is constructed in proportion to $2^{1/2}$ and $2^{1/2}$.

In this way, the formation of the orthogonal channel is feasible even in the arrangement in which the unitary matrix operation is not carried out on the transmitting end and the phase differences $\Phi=\Phi_L+\Phi_A$ and $\Phi=\Phi_L+\Phi_A$ are detectable by the pilot signal, so that either adopting independent local oscillators on the transmitting end or adopting them on the receiving end permits the virtual orthogonal channel to be formed. Such orthogonal channel is not affected by such phase differences $\Phi$ and $\phi$. Further, the exemplified arrangement hereof does not require the feedback from the receiving end to the transmitting end. Moreover, the matrix in use is the unitary matrix, so that the characteristics of the exemplified arrangement hereof become completely the same as those of SVD system.

Then, an exemplified arrangement (5) in which virtual orthogonal channels having different thicknesses are formed; the matrix operation is carried out only on the receiving side; and independent local oscillators are adopted for each antenna on both of the transmitting and receiving sides is shown as follows.

(Exemplified Arrangement (5): In the Case of Virtual Orthogonal Channels Having Different Thicknesses being Formed; the Matrix Operation being Carried Out Only on the Receiving Side; and L.Os. Independent Arrangement being Adopted for Each Antenna on Both of the Transmitting and Receiving Sides)

Virtual orthogonal channels having different values are formed in this exemplified arrangement (5). It does not require the feedback data from the receiving end to the transmitting end either. Further, it allows an independent local oscillator for each antenna to be adopted on both of the transmitting and receiving sides. Moreover, analysis is made by making use of the fact that even when a serious phase rotation might occur on the transmitting antenna and the receiving antenna owing to the directional movement of highly sensitive antennas against such subtle climate conditions as the wind and the surrounding temperature, such phase rotation all can be ascribed to the same modeling as that of the phase fluctuation by the local oscillator for each antenna. In order to make the exemplified arrangement hereof practically flexible, it is arranged with an antenna-to-antenna spacing different from an optimum antenna position. Accordingly, the characteristics of the exemplified arrangement hereof differ from those of SVD system. The characteristic analysis of the exemplified arrangement hereof is described later.

(Singular Value Orthogonal Matrix $\Lambda^{1/2}$)

The case is where virtual orthogonal channels having different values are formed, so that the singular value orthogonal matrix is expressed with the following formula 83.

$$\Lambda^{1/2} = \begin{bmatrix} \sqrt{\lambda_1} & 0 \\ 0 & \sqrt{\lambda_2} \end{bmatrix} = \begin{bmatrix} \sqrt{2+2\cos\alpha} & 0 \\ 0 & \sqrt{2-2\cos\alpha} \end{bmatrix} = \quad \{\text{Formula 83}\}$$

$$\begin{bmatrix} 2\cos\left(\frac{\alpha}{2}\right) & 0 \\ 0 & 2\sin\left(\frac{\alpha}{2}\right) \end{bmatrix} =$$

$$\begin{bmatrix} \left(e^{j\frac{\alpha}{2}}+e^{-j\frac{\alpha}{2}}\right) & 0 \\ 0 & -j\left(e^{j\frac{\alpha}{2}}-e^{-j\frac{\alpha}{2}}\right) \end{bmatrix}$$

(Communication Channel Matrix H)

The communication channel matrix is expressed as the following formula 84.

$$H = \begin{bmatrix} 1 & e^{-j\alpha}\cdot e^{j\Phi} \\ e^{-j\alpha}\cdot e^{j\phi} & 1\cdot e^{j(\Phi+\phi)} \end{bmatrix} \text{ where; } \begin{cases} \Phi = \Phi_L + \Phi_A \\ \phi = \phi_L + \phi_A \end{cases} \quad \{\text{Formula 84}\}$$

Here, the displacement $\Phi_A$ of highly sensitive antennas on the transmitting side is incorporated in the phase fluctuation $\Phi_L$ by independent local oscillators for each antenna on the transmitting side so as to be defined as $\phi$ while the displacement $\Phi_A$ of highly sensitive antennas is incorporated in the phase fluctuation $\Phi_L$ by independent local oscillators for each antenna on the receiving side so as to be defined as $\phi$.

Based on the following formula 85, the following formula 86 is established.

$$H = U \cdot \Lambda^{1/2} \cdot V^H \quad \{\text{Formula 85}\}$$

$$= \begin{bmatrix} 1 & e^{-j\alpha}\cdot e^{j\Phi} \\ e^{-j\alpha}\cdot e^{j\phi} & 1\cdot e^{j(\Phi+\phi)} \end{bmatrix}$$

$$= U \cdot \begin{bmatrix} \left(e^{j\frac{\alpha}{2}}+e^{-j\frac{\alpha}{2}}\right) & 0 \\ 0 & -j\left(e^{j\frac{\alpha}{2}}-e^{-j\frac{\alpha}{2}}\right) \end{bmatrix} \cdot \begin{bmatrix} 1 & 0 \\ 0 & 1 \end{bmatrix}$$

$$U = \begin{bmatrix} 1 & e^{-j\alpha}\cdot e^{j\Phi} \\ e^{-j\alpha}\cdot e^{j\phi} & 1\cdot e^{j(\Phi+\phi)} \end{bmatrix} \cdot \quad \{\text{Formula 86}\}$$

$$\begin{bmatrix} \left(e^{j\frac{\alpha}{2}}+e^{-j\frac{\alpha}{2}}\right) & 0 \\ 0 & -j\left(e^{j\frac{\alpha}{2}}-e^{-j\frac{\alpha}{2}}\right) \end{bmatrix}^{-1}$$

Further, based on the following formula 87, the following formula 88 is established.

$$\frac{1}{\left(e^{j\frac{\alpha}{2}}+e^{-j\frac{\alpha}{2}}\right)} = \frac{1}{2\cdot\cos\left(\frac{\alpha}{2}\right)}, \frac{1}{-j\left(e^{j\frac{\alpha}{2}}-e^{-j\frac{\alpha}{2}}\right)} = \frac{1}{2\cdot\sin\left(\frac{\alpha}{2}\right)} \quad \{\text{Formula 87}\}$$

$$U = \begin{bmatrix} 1 & e^{-j\alpha}\cdot e^{j\Phi} \\ e^{-j\alpha}\cdot e^{j\phi} & 1\cdot e^{j(\Phi+\phi)} \end{bmatrix} \cdot \begin{bmatrix} \frac{1}{2\cdot\cos\left(\frac{\alpha}{2}\right)} & 0 \\ 0 & \frac{1}{2\cdot\sin\left(\frac{\alpha}{2}\right)} \end{bmatrix} \quad \{\text{Formula 88}\}$$

$$= \begin{bmatrix} \frac{1}{2\cdot\cos\left(\frac{\alpha}{2}\right)} & \frac{e^{-j\alpha}\cdot e^{j\Phi}}{2\cdot\sin\left(\frac{\alpha}{2}\right)} \\ \frac{e^{-j\alpha}\cdot e^{j\phi}}{2\cdot\cos\left(\frac{\alpha}{2}\right)} & \frac{e^{-j(\Phi+\phi)}}{2\cdot\sin\left(\frac{\alpha}{2}\right)} \end{bmatrix}$$

To note, referring to the square norm of the vector, the following formula 89 is established, so that U is not the unitary matrix any more. Accordingly, to determine $U^H$, it requires the inverse matrix operation.

$$\frac{1}{4\cdot\cos^2\left(\frac{\alpha}{2}\right)} + \frac{1}{4\cdot\sin^2\left(\frac{\alpha}{2}\right)} = \quad \{\text{Formula 89}\}$$

$$\frac{4}{16\cdot\sin^2\left(\frac{\alpha}{2}\right)\cdot\cos^2\left(\frac{\alpha}{2}\right)} = \frac{1}{2\cdot\sin^2(\alpha)}$$

In attempt, H being calculated based on U, $\Lambda^{1/2}$ and $V^H$ determined herein, the following formula 90 is established, so that it is known that the communication channel matrix holds firm.

$$H = U \cdot \Lambda^{1/2} \cdot V^H \quad \{\text{Formula 90}\}$$

$$= \begin{bmatrix} \frac{1}{2\cdot\cos\left(\frac{\alpha}{2}\right)} & \frac{e^{-j\alpha}\cdot e^{j\Phi}}{2\cdot\sin\left(\frac{\alpha}{2}\right)} \\ \frac{e^{-j\alpha}\cdot e^{j\phi}}{2\cdot\cos\left(\frac{\alpha}{2}\right)} & \frac{e^{j(\Phi+\phi)}}{2\cdot\sin\left(\frac{\alpha}{2}\right)} \end{bmatrix} \cdot$$

$$\begin{bmatrix} 2\cdot\cos\left(\frac{\alpha}{2}\right) & 0 \\ 0 & 2\cdot\sin\left(\frac{\alpha}{2}\right) \end{bmatrix} \cdot \begin{bmatrix} 1 & 0 \\ 0 & 1 \end{bmatrix}$$

-continued $$= \begin{bmatrix} 1 & e^{-j\alpha} \cdot e^{j\Phi} \\ e^{-j\alpha} \cdot e^{j\phi} & 1 \cdot e^{j(\Phi+\phi)} \end{bmatrix}$$

Then, the inverse matrix $U^{-1}$ of $U$ is considered. The inverse matrix of an arbitrary matrix expressed with the following formula 91 is expressed with the following formula 92.

$$A = \begin{bmatrix} a_{11} & a_{12} \\ a_{21} & a_{22} \end{bmatrix} \quad \text{\{Formula 91\}}$$

$$A^{-1} = \frac{1}{a_{11}a_{22} - a_{12}a_{21}} \begin{bmatrix} a_{22} & -a_{12} \\ -a_{21} & a_{11} \end{bmatrix} \quad \text{\{Formula 92\}}$$

$$\left( \because AA^{-1} = \frac{1}{a_{11}a_{22} - a_{12}a_{21}} \begin{bmatrix} a_{11} & -a_{12} \\ -a_{21} & a_{22} \end{bmatrix} \cdot \begin{bmatrix} a_{22} & -a_{12} \\ -a_{21} & a_{11} \end{bmatrix} \right.$$
$$\left. = \frac{1}{a_{11}a_{22} - a_{12}a_{21}} \begin{bmatrix} a_{11}a_{22} - a_{12}a_{21} & 0 \\ 0 & a_{11}a_{22} - a_{12}a_{21} \end{bmatrix} \right)$$

Accordingly, the following formula 93 is established.

{Formula 93}

$$U^{-1} = \begin{bmatrix} \frac{1}{2 \cdot \cos(\frac{\alpha}{2})} & \frac{e^{-j\alpha} \cdot e^{j\Phi}}{2 \cdot \sin(\frac{\alpha}{2})} \\ \frac{e^{-j\alpha} \cdot e^{j\phi}}{2 \cdot \cos(\frac{\alpha}{2})} & \frac{e^{j(\Phi+\phi)}}{2 \cdot \sin(\frac{\alpha}{2})} \end{bmatrix}^{-1} =$$

$$\frac{1}{\frac{1}{2 \cdot \cos(\frac{\alpha}{2})} \cdot \frac{e^{j(\Phi+\phi)}}{2 \cdot \sin(\frac{\alpha}{2})} - \frac{e^{-j\alpha} \cdot e^{j\Phi}}{2 \cdot \sin(\frac{\alpha}{2})} \cdot \frac{e^{-j\alpha} \cdot e^{j\phi}}{2 \cdot \cos(\frac{\alpha}{2})}}$$

$$\begin{bmatrix} \frac{e^{j(\Phi+\phi)}}{2 \cdot \sin(\frac{\alpha}{2})} & -\frac{e^{-j\alpha} \cdot e^{j\Phi}}{2 \cdot \sin(\frac{\alpha}{2})} \\ -\frac{e^{-j\alpha} \cdot e^{j\phi}}{2 \cdot \cos(\frac{\alpha}{2})} & \frac{1}{2 \cdot \cos(\frac{\alpha}{2})} \end{bmatrix} =$$

$$\frac{2 \cdot (2 \cdot \sin(\frac{\alpha}{2}) \cdot \cos(\frac{\alpha}{2}))}{1 - e^{-j2\alpha}} \begin{bmatrix} \frac{1}{2 \cdot \sin(\frac{\alpha}{2})} & -\frac{e^{-j\alpha} \cdot e^{-j\phi}}{2 \cdot \sin(\frac{\alpha}{2})} \\ -\frac{e^{-j\alpha} \cdot e^{-j\Phi}}{2 \cdot \cos(\frac{\alpha}{2})} & \frac{e^{-j(\Phi+\phi)}}{2 \cdot \cos(\frac{\alpha}{2})} \end{bmatrix} =$$

$$\frac{2}{1 - e^{-j2\alpha}} \begin{bmatrix} \cos(\frac{\alpha}{2}) & -e^{-j\alpha} \cdot e^{-j\phi} \cos(\frac{\alpha}{2}) \\ -e^{-j\Phi}e^{-j\alpha}\sin(\frac{\alpha}{2}) & e^{-j(\Phi+\phi)}\sin(\frac{\alpha}{2}) \end{bmatrix} =$$

$$\frac{2}{e^{j\alpha} - e^{-j\alpha}} \begin{bmatrix} e^{j\alpha}\cos(\frac{\alpha}{2}) & -e^{-j\phi}\cos(\frac{\alpha}{2}) \\ -e^{-j\Phi}\sin(\frac{\alpha}{2}) & e^{-j(\Phi+\phi)}e^{j\alpha}\sin(\frac{\alpha}{2}) \end{bmatrix} =$$

$$\frac{1}{j\sin\alpha} \begin{bmatrix} e^{j\alpha}\cos(\frac{\alpha}{2}) & -e^{-j\phi}\cos(\frac{\alpha}{2}) \\ -e^{-j\Phi}\sin(\frac{\alpha}{2}) & e^{-j(\Phi+\phi)}e^{j\alpha}\sin(\frac{\alpha}{2}) \end{bmatrix} =$$

$$\begin{bmatrix} -je^{j\alpha}\frac{\cos(\alpha/2)}{\sin\alpha} & je^{-j\phi}\frac{\cos(\alpha/2)}{\sin\alpha} \\ je^{-j\Phi}\frac{\sin(\alpha/2)}{\sin\alpha} & -je^{-j(\Phi+\phi)}e^{j\alpha}\frac{\sin(\alpha/2)}{\sin\alpha} \end{bmatrix}$$

where; $\alpha = 2\pi \left(\frac{d_R^2}{2R}\right) / \gamma = \frac{\pi}{\gamma} \cdot \frac{d_R^2}{R}$ FIG. 8 shows the arrangement based on the foregoing results.

This is the case where the virtual orthogonal channels having different values are formed, but just if the pilot detection is properly performed, the formation of the orthogonal channel is feasible even when the local oscillators are adopted for each antenna on both of the transmitting and receiving sides. The exemplified arrangement hereof does not use the matrix operation on the transmitting side, so that it does not require that the feedback data is delivered from the receiving end to the transmitting end, with the result that it can respond well to fast phase fluctuation such as the transmitting end phase fluctuation Φ and the receiving end phase fluctuation φ.

The formation of the virtual orthogonal channels which have different channel qualities is feasible at positions other than the optimum positions between antennas: R=5000 m; and $d_T=d_R=5$ m as exemplified above without the matrix processing being carried out on the transmitting side. However, $U^H$ is not the unitary matrix any more. It results in the inverse matrix $U^{-1}$. Thus, it is predicted that the characteristic deterioration from SVD system arises herein. As for the characteristic difference between the exemplified arrangement hereof and SVD system, it is described later.

Figure 8:
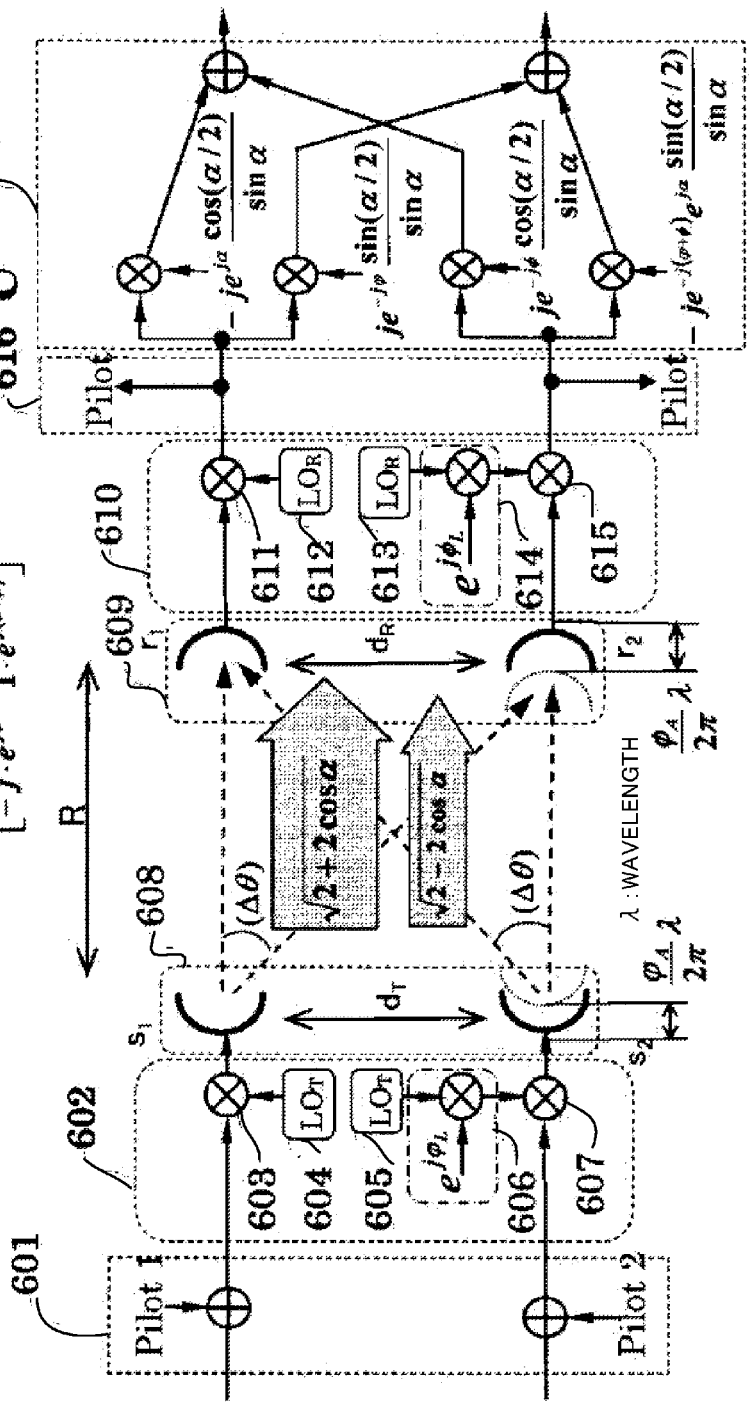
FIG. 8 shows an exemplified arrangement (5) of the line-of-sight MIMO communication system embodied in the present invention, in which the virtual orthogonal channels having different values are formed by the matrix operation only on the receiving side and further local oscillators are independently provided on both the transmitting and receiving sides.

With reference to FIG. 8, the transmission signal is added by the pilot signal generation unit 601 with pilot signals which intersect perpendicularly with each another for each antenna. As the orthogonal pilot signal in use, the orthogonal pattern obtained from Hadamard matrix or CAZAC sequences may be adopted. The transmission signal added with such pilot signal in this way is subjected to the frequency conversion into a wireless frequency by the frequency conversion unit 602 including local oscillators 604 and 605 and mixers 603 and 607 on the transmitting side so as to be transmitted as $s_1$ and $s_2$ from the fixed antenna unit 608 including plural antennas, in which $s_1$ and $s_2$ adopt signal descriptions according to equivalent low-pass representations.

Here, attention shall be drawn to the fact that due to the fact that independent local oscillators 604 and 605 are adopted for each antenna, a phase noise $\Phi_L$ arises caused by the carrier synchronization not being carried out between the carriers of each antenna. Such noise is modeled with the reference sign 606 in FIG. 7. The signals transmitted this way are received as $r_1$ and $r_2$ by the fixed antenna unit 609 including plural antennas on the receiving side. Here, $r_1$ and $r_2$ adopt signal descriptions according to equivalent low-pass representations.

After the received signals $r_1$ and $r_2$ are subjected to the frequency conversion into the baseband signals by the frequency conversion unit 610 including the local oscillators 612 and 613 and mixers 611 and 615 on the receiving side, they are processed by the matrix operation processing unit 617 by the matrix U on the receiving side via the pilot signal detection unit 616, thereby, the separation/detection of the signals according to the MIMO communication system being completed. Upon executing the processing on the receiving side, independent local oscillators 612 and 613 are adopted for each antenna, so that a phase noise $\Phi_L$ arises caused by the carrier synchronization not being carried out between the carriers of each antenna. Such noise is modeled with the reference sign 614 in FIG. 8. Further, the antennas adoptable herein include parabola antennas, horn antennas and the like, but the present invention is not limited to such antennas.

At the pilot signal detection unit 616, the generation step of the pilot signals intersecting perpendicularly with each another is placed before the processing by the local oscillators on the transmitting side and the pilot detection step is placed after the processing by the local oscillators on the receiving side, so that the detections of the phase differences $\Phi=\Phi_L+\Phi_A$ and $\phi=\phi_L+\phi_A$ represented in the formula 93 are feasible. The pattern adopted for the pilot signals is an orthogonal pattern such as Hadamard sequences or CAZAC sequences, so that the phase differences $\Phi$ and $\phi$ are detectable by means of a simplified correlation device, which is not shown in the drawings. This means that the entire matrix operations come to be performed only on the receiving side. In other words, as verified by the formula 93, the matrix on the receiving side acts to compensate for the fluctuation of the channel caused by the external factors such as the positional fluctuation (modeled with $\Phi_A$ and $\phi_A$ in FIG. 8) of highly sensitive antennas against subtle climate conditions such as the wind and the surrounding temperature and the phase noises $\Phi_L$ and $\phi_L$ caused by the carrier synchronization not being carried out.

To note, the most advantageous point of the exemplified arrangement hereof lies in the fact that it does not require that the feedback data for the purpose of constructing the V matrix is delivered from the receiving end to the transmitting end. The bold arrow signs shown in FIG. 8 indicate virtual orthogonal channels, which channels are different in thickness differently from the previous exemplified arrangements. However, as described later, the exemplified arrangement hereof is characterized in that adopting the same permits such virtual orthogonal channels to have the same transmission quality.

Up to here, the exemplified arrangements with two antennas are explained. However, as mentioned above, the present invention is not limited to those with two antennas, but may be applied to those with more than two antennas.

To avoid cumbersomeness, only the transmitting and receiving antennas are illustrated and the other structural elements are omitted in illustration. Hereafter, the cases where more than two antennas are adopted are explained.
(Exemplified Arrangement (6) with Three Antennas: In the Case of the Unitary Matrix Operation being Carried Out Only on the Receiving Side)
(Singular Value Orthogonal Matrix $\Lambda^{1/2}$)
The singular value orthogonal matrix is expressed with the following formula 94.

$$\Lambda^{1/2} = \begin{bmatrix} \sqrt{\lambda_1} & 0 & 0 \\ 0 & \sqrt{\lambda_2} & 0 \\ 0 & 0 & \sqrt{\lambda_3} \end{bmatrix} = \begin{bmatrix} \sqrt{3} & 0 & 0 \\ 0 & \sqrt{3} & 0 \\ 0 & 0 & \sqrt{3} \end{bmatrix} \quad \{\text{Formula 94}\}$$

Figure 9:
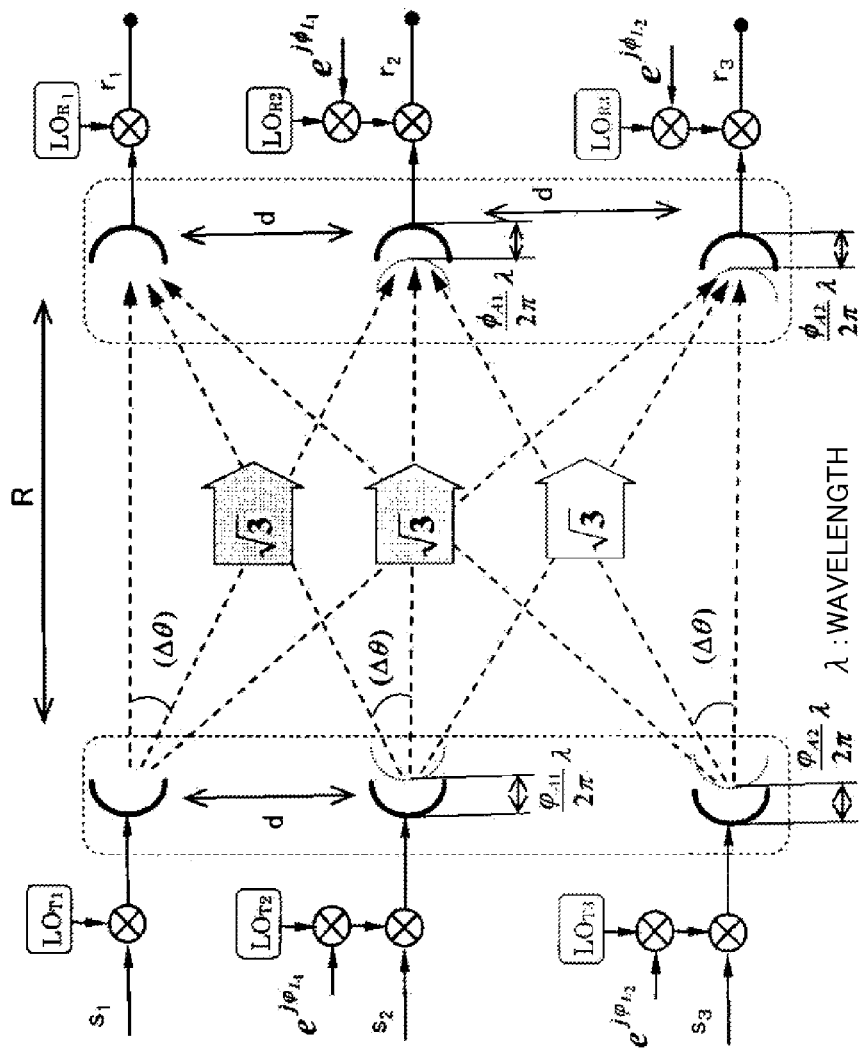
FIG. 9 shows an exemplified arrangement (6) of the line-of-sight MIMO communication system embodied in the present invention, in which the number of antennas is three on each of the transmitting and receiving sides and a local oscillator is independently provided on each of them.

(Communication Channel Matrix H)
With reference to FIG. 9, defining the communication channel as the following formula 95, the following formula 96 is established.

$$\frac{(n \cdot d)^2}{R} = \frac{n^2 \cdot \gamma}{3} \quad \{\text{Formula 95}\}$$

where; $n = 0, 1, 2$ $$H = \begin{bmatrix} 1 & 0 & 0 \\ 0 & e^{j\phi_1} & 0 \\ 0 & 0 & e^{j\phi_2} \end{bmatrix} \cdot \begin{bmatrix} 1 & e^{-j\frac{\pi}{3}} & e^{-j4\frac{\pi}{3}} \\ e^{-j\frac{\pi}{3}} & 1 & e^{-j\frac{\pi}{3}} \\ e^{-j4\frac{\pi}{3}} & e^{-j\frac{\pi}{3}} & 1 \end{bmatrix} \cdot \begin{bmatrix} 1 & 0 & 0 \\ 0 & e^{j\Phi_1} & 0 \\ 0 & 0 & e^{j\Phi_2} \end{bmatrix} \quad \{\text{Formula 96}\}$$

where;

$$\begin{cases} \Phi_1 = \Phi_{L_1} + \Phi_{A_2} \\ \Phi_2 = \Phi_{L_2} + \Phi_{A_2} \\ \phi_1 = \phi_{L_1} + \phi_{A_1} \\ \phi_2 = \phi_{L_2} + \phi_{A_2} \end{cases} = U \cdot \Lambda^{1/2} \cdot V^H = U \cdot \begin{bmatrix} \sqrt{3} & 0 & 0 \\ 0 & \sqrt{3} & 0 \\ 0 & 0 & \sqrt{3} \end{bmatrix} \cdot \begin{bmatrix} 1 & 0 & 0 \\ 0 & 1 & 0 \\ 0 & 0 & 1 \end{bmatrix}$$

$$\therefore U = \begin{bmatrix} U_{11} & U_{12} & U_{13} \\ U_{21} & U_{22} & U_{23} \\ U_{31} & U_{32} & U_{33} \end{bmatrix} =$$

$$\begin{bmatrix} 1 & e^{-j\frac{\pi}{3}} \cdot e^{j\phi_1} & e^{-j4\frac{\pi}{3}} \cdot e^{j\phi_2} \\ e^{-j\frac{\pi}{3}} \cdot e^{j\phi_1} & 1 \cdot e^{j(\phi_1+\Phi_1)} & e^{-j\frac{\pi}{3}} \cdot e^{j(\phi_1+\Phi_2)} \\ e^{-j4\frac{\pi}{3}} \cdot e^{j\phi_2} & e^{-j\frac{\pi}{3}} \cdot e^{j(\phi_2+\Phi_1)} & 1 \cdot e^{j(\phi_2+\Phi_2)} \end{bmatrix} \cdot$$

$$\begin{bmatrix} \frac{1}{\sqrt{3}} & 0 & 0 \\ 0 & \frac{1}{\sqrt{3}} & 0 \\ 0 & 0 & \frac{1}{\sqrt{3}} \end{bmatrix} \begin{bmatrix} \frac{1}{\sqrt{3}} & \frac{e^{-j\frac{\pi}{3}} \cdot e^{j\phi_1}}{\sqrt{3}} & \frac{e^{-j4\frac{\pi}{3}} \cdot e^{j\phi_2}}{\sqrt{3}} \\ \frac{e^{-j\frac{\pi}{3}} \cdot e^{j\phi_1}}{\sqrt{3}} & \frac{1 \cdot e^{j(\phi_1+\Phi_1)}}{\sqrt{3}} & \frac{e^{-j\frac{\pi}{3}} \cdot e^{j(\phi_1+\Phi_2)}}{\sqrt{3}} \\ \frac{e^{-j4\frac{\pi}{3}} \cdot e^{j\phi_2}}{\sqrt{3}} & \frac{e^{-j\frac{\pi}{3}} \cdot e^{j(\phi_2+\Phi_1)}}{\sqrt{3}} & \frac{1 \cdot e^{j(\phi_2+\Phi_2)}}{\sqrt{3}} \end{bmatrix}$$

where; $\alpha = \frac{\pi}{\gamma} \cdot \frac{d^2}{R} = \frac{\pi}{3}$

Accordingly, the following formula 97 is established.

$$\therefore U^H = \begin{bmatrix} \frac{1}{\sqrt{3}} & \frac{e^{j\frac{\pi}{3}} \cdot e^{-j\phi_1}}{\sqrt{3}} & \frac{e^{j4\frac{\pi}{3}} \cdot e^{-j\phi_2}}{\sqrt{3}} \\ \frac{e^{j\frac{\pi}{3}} \cdot e^{-j\phi_1}}{\sqrt{3}} & \frac{1 \cdot e^{-j(\phi_1+\Phi_1)}}{\sqrt{3}} & \frac{e^{j\frac{\pi}{3}} \cdot e^{-j(\phi_2+\Phi_1)}}{\sqrt{3}} \\ \frac{e^{j4\frac{\pi}{3}} \cdot e^{-j\phi_2}}{\sqrt{3}} & \frac{e^{j\frac{\pi}{3}} \cdot e^{-j(\phi_1+\Phi_2)}}{\sqrt{3}} & \frac{1 \cdot e^{-j(\phi_2+\Phi_2)}}{\sqrt{3}} \end{bmatrix} \quad \{\text{Formula 97}\}$$

where; $\begin{cases} \Phi_1 = \Phi_{L_1} + \Phi_{A_2} \\ \Phi_2 = \Phi_{L_2} + \Phi_{A_2} \\ \phi_1 = \phi_{L_1} + \phi_{A_1} \\ \phi_2 = \phi_{L_2} + \phi_{A_2} \end{cases}$ Here, $\Phi_A$ and $\phi_A$ represented in the formula 97 indicate the carrier phase rotation caused by the positional fluctuation of highly sensitive antennas against subtle climate conditions such as the wind and the surrounding temperature on the transmitting and receiving sides, in which the subscripts 1 and 2 indicate the phase rotation of the second and third antennas viewed from the uppermost antenna.

Further, the antenna-to-antenna spacing needs to be enlarged according to the frequency handled by the fixed microwaves communication and the local oscillators are implemented near the antennas accordingly. In other words, independent local oscillators are adopted for each antenna on both of the transmitting and receiving sides. Accordingly, the phase noises $\Phi_L$ and $\phi_L$ are caused by the carrier synchronization not being carried out. The subscripts 1 and 2 indicate the phase rotation of the second and third antennas viewed from the uppermost antenna.

With the aforesaid transmitting antenna and receiving antenna in common, a serious phase rotation caused by the directional movement of highly sensitive antennas against subtle climate conditions as the wind and the surrounding temperature all can be ascribed to the same modeling as that of the phase fluctuation by the local oscillators for each antenna, so that with the analysis according to the formula 97, it is made with the phase differences defined as $\Phi_1=\Phi_{L1}+\Phi_{A1}$ and $\Phi_2=\Phi_{L2}+\Phi_{A2}$ at the second and third antennas on the transmitting side and those defined as $\Phi_1=\Phi_{L1}+\Phi_{A1}$ and $\Phi_2=\Phi_{L2}+\Phi_{A2}$ at the second and third antennas on the receiving side viewed from the uppermost antenna.

In other words, even with the exemplified arrangement hereof with three antennas, the formation of virtual orthogonal channels is feasible just with the unitary matrix operation just on the receiving side. The bold arrow signs shown in FIG. 9 indicate virtual orthogonal channels whose quality is constructed in proportion to $3^{1/2}$, $3^{1/2}$, and $3^{1/2}$.

Further, properly detecting the phase rotation of each antenna permits the equivalent characteristics to SVD system to be gained. The communication channel capacity is tripled according to the entire antenna power comparison.

(Exemplified Arrangement (7) with Four Antennas: In the Case of the Unitary Matrix Operation being Carried Out Only on the Receiving Side and L.Os. Independent Arrangement being Adopted on Both of the Transmitting and Receiving Sides).

(Singular Value Orthogonal Matrix $\Lambda^{1/2}$)

The singular value orthogonal matrix is expressed with the following formula 98.

$$\Lambda^{1/2} = \begin{bmatrix} \sqrt{\lambda_1} & 0 & 0 & 0 \\ 0 & \sqrt{\lambda_2} & 0 & 0 \\ 0 & 0 & \sqrt{\lambda_3} & 0 \\ 0 & 0 & 0 & \sqrt{\lambda_4} \end{bmatrix} = \begin{bmatrix} \sqrt{4} & 0 & 0 & 0 \\ 0 & \sqrt{4} & 0 & 0 \\ 0 & 0 & \sqrt{4} & 0 \\ 0 & 0 & 0 & \sqrt{4} \end{bmatrix} \quad \{\text{Formula 98}\}$$

(Communication Channel Matrix H)

Figure 10:
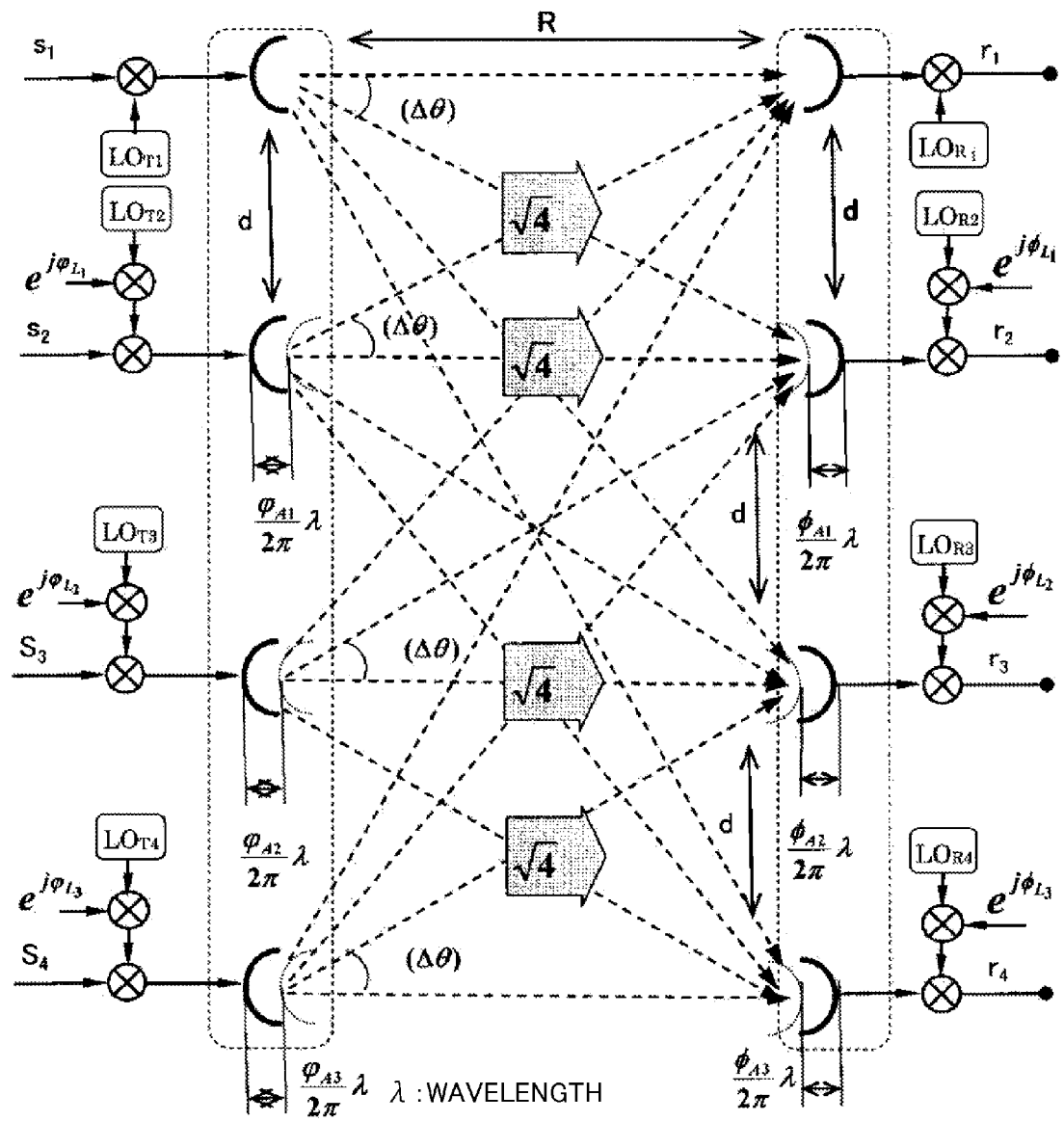
FIG. 10 shows an exemplified arrangement (7) of the line-of-sight MIMO communication system embodied in the present invention, in which the number of antennas is four on each of the transmitting and receiving sides and a local oscillator is independently provided on each of them.

With reference to FIG. 10, defining the communication channel matrix as the following formula 99, the following formula 100 is established.

$$\frac{(n \cdot d)^2}{R} = \frac{n^2 \cdot \gamma}{4} \quad \text{where;} \quad n = 0, 1, 2, 3 \quad \{\text{Formula 99}\}$$

{Formula 100}

$$H = \begin{bmatrix} 1 & 0 & 0 & 0 \\ 0 & e^{j\phi_1} & 0 & 0 \\ 0 & 0 & e^{j\phi_2} & 0 \\ 0 & 0 & 0 & e^{j\phi_3} \end{bmatrix} \cdot$$

$$\begin{bmatrix} 1 & e^{-j\frac{\pi}{4}} & e^{-j\frac{4\pi}{4}} & e^{-j\frac{9\pi}{4}} \\ e^{-j\frac{\pi}{4}} & 1 & e^{-j\frac{\pi}{4}} & e^{-j\frac{4\pi}{4}} \\ e^{-j\frac{4\pi}{4}} & e^{-j\frac{\pi}{4}} & 1 & e^{-j\frac{\pi}{4}} \\ e^{-j\frac{9\pi}{4}} & e^{-j\frac{4\pi}{4}} & e^{-j\frac{\pi}{4}} & 1 \end{bmatrix} \begin{bmatrix} 1 & 0 & 0 & 0 \\ 0 & e^{j\varphi_1} & 0 & 0 \\ 0 & 0 & e^{j\varphi_2} & 0 \\ 0 & 0 & 0 & e^{j\varphi_3} \end{bmatrix}$$

$$= U \cdot \Lambda^{1/2} \cdot V^H = U \cdot \begin{bmatrix} \sqrt{4} & 0 & 0 & 0 \\ 0 & \sqrt{4} & 0 & 0 \\ 0 & 0 & \sqrt{4} & 0 \\ 0 & 0 & 0 & \sqrt{4} \end{bmatrix} \cdot \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

where;
$$\begin{cases} \Phi_1 = \Phi_{L_1} + \Phi_{A_2} \\ \Phi_2 = \Phi_{L_2} + \Phi_{A_2} \\ \Phi_3 = \Phi_{L_3} + \Phi_{A_3} \\ \phi_1 = \phi_{L_1} + \phi_{A_2} \\ \phi_2 = \phi_{L_2} + \phi_{A_2} \\ \phi_3 = \phi_{L_3} + \phi_{A_3} \end{cases}$$

$$\therefore U =$$

$$\begin{bmatrix} 1 & e^{-j\frac{\pi}{4}} \cdot e^{j\Phi_1} & e^{-j\frac{4\pi}{4}} \cdot e^{j\Phi_2} & e^{-j\frac{9\pi}{4}} \cdot e^{j\Phi_3} \\ e^{-j\frac{\pi}{4}} \cdot e^{j\phi_1} & 1 \cdot e^{j(\phi_1 + \Phi_1)} & e^{-j\frac{\pi}{4}} \cdot e^{j(\phi_1 + \Phi_2)} & e^{-j\frac{4\pi}{4}} \cdot e^{j(\phi_1 + \Phi_3)} \\ e^{-j\frac{4\pi}{4}} \cdot e^{j\phi_2} & e^{-j\frac{4\pi}{4}} \cdot e^{j(\phi_2 + \Phi_1)} & 1 \cdot e^{j(\phi_2 + \Phi_2)} & e^{-j\frac{\pi}{4}} \cdot e^{j(\phi_2 + \Phi_3)} \\ e^{-j\frac{9\pi}{4}} \cdot e^{j\phi_3} & e^{-j\frac{4\pi}{4}} \cdot e^{j(\phi_3 + \Phi_1)} & e^{-j\frac{\pi}{4}} \cdot e^{j(\phi_3 + \Phi_2)} & 1 \cdot e^{j(\phi_3 + \Phi_3)} \end{bmatrix} \cdot$$

$$\begin{bmatrix} 1/\sqrt{4} & 0 & 0 & 0 \\ 0 & 1/\sqrt{4} & 0 & 0 \\ 0 & 0 & 1/\sqrt{4} & 0 \\ 0 & 0 & 0 & 1/\sqrt{4} \end{bmatrix} =$$

$$\begin{bmatrix} \frac{1}{\sqrt{4}} & \frac{e^{-j\frac{\pi}{4}} \cdot e^{j\Phi_1}}{\sqrt{4}} & \frac{e^{-j\frac{4\pi}{4}} \cdot e^{j\Phi_2}}{\sqrt{4}} & \frac{e^{-j\frac{9\pi}{4}} \cdot e^{j\Phi_3}}{\sqrt{4}} \\ \frac{e^{-j\frac{\pi}{4}} \cdot e^{j\phi_1}}{\sqrt{4}} & \frac{1 \cdot e^{j(\phi_1 + \Phi_1)}}{\sqrt{4}} & \frac{e^{-j\frac{\pi}{4}} \cdot e^{j(\phi_1 + \Phi_2)}}{\sqrt{4}} & \frac{e^{-j\frac{4\pi}{4}} \cdot e^{j(\phi_1 + \Phi_3)}}{\sqrt{4}} \\ \frac{e^{-j\frac{4\pi}{4}} \cdot e^{j\phi_2}}{\sqrt{4}} & \frac{e^{-j\frac{\pi}{4}} \cdot e^{j(\phi_2 + \Phi_1)}}{\sqrt{4}} & \frac{1 \cdot e^{j(\phi_2 + \Phi_2)}}{\sqrt{4}} & \frac{e^{-j\frac{\pi}{4}} \cdot e^{j(\phi_2 + \Phi_3)}}{\sqrt{4}} \\ \frac{e^{-j\frac{9\pi}{4}} \cdot e^{j\phi_2}}{\sqrt{4}} & \frac{e^{-j\frac{4\pi}{4}} \cdot e^{j(\phi_3 + \Phi_1)}}{\sqrt{4}} & \frac{e^{-j\frac{\pi}{4}} \cdot e^{j(\phi_3 + \Phi_2)}}{\sqrt{4}} & \frac{1 \cdot e^{j(\phi_3 + \Phi_3)}}{\sqrt{4}} \end{bmatrix}$$

where; $\alpha = \frac{\pi}{\gamma} \cdot \frac{d^2}{R} = \frac{\pi}{4}$

60

Accordingly, the following formula 101 is established.

$$\therefore U^H =$$

{Formula 101}

$$\begin{bmatrix} \frac{1}{\sqrt{4}} & \frac{e^{j\frac{\pi}{4}} \cdot e^{-j\phi_1}}{\sqrt{4}} & \frac{e^{j\frac{4\pi}{4}} \cdot e^{-j\phi_2}}{\sqrt{4}} & \frac{e^{j\frac{9\pi}{4}} \cdot e^{-j\phi_3}}{\sqrt{4}} \\ \frac{e^{j\frac{\pi}{4}} \cdot e^{-j\Phi_1}}{\sqrt{4}} & \frac{1 \cdot e^{-j(\phi_1+\Phi_1)}}{\sqrt{4}} & \frac{e^{j\frac{\pi}{4}} \cdot e^{-j(\phi_2+\Phi_1)}}{\sqrt{4}} & \frac{e^{j\frac{4\pi}{4}} \cdot e^{-j(\phi_3+\Phi_1)}}{\sqrt{4}} \\ \frac{e^{j\frac{4\pi}{4}} \cdot e^{-j\Phi_2}}{\sqrt{4}} & \frac{e^{j\frac{\pi}{4}} \cdot e^{-j(\phi_1+\Phi_2)}}{\sqrt{4}} & \frac{1 \cdot e^{-j(\phi_2+\Phi_2)}}{\sqrt{4}} & \frac{e^{j\frac{\pi}{4}} \cdot e^{-j(\phi_3+\Phi_2)}}{\sqrt{4}} \\ \frac{e^{j\frac{9\pi}{4}} \cdot e^{-j\Phi_3}}{\sqrt{4}} & \frac{e^{j\frac{4\pi}{4}} \cdot e^{-j(\phi_1+\Phi_3)}}{\sqrt{4}} & \frac{e^{-j\frac{\pi}{4}} \cdot e^{j(\phi_2+\Phi_3)}}{\sqrt{4}} & \frac{1 \cdot e^{-j(\phi_3+\Phi_3)}}{\sqrt{4}} \end{bmatrix}$$

where;
$$\begin{cases} \Phi_1 = \Phi_{L_1} + \Phi_{A_2} \\ \Phi_2 = \Phi_{L_2} + \Phi_{A_2} \\ \Phi_3 = \Phi_{L_3} + \Phi_{A_3} \\ \phi_1 = \phi_{L_1} + \phi_{A_1} \\ \phi_2 = \phi_{L_2} + \phi_{A_2} \\ \phi_3 = \phi_{L_3} + \phi_{A_3} \end{cases}$$

Here, $\Phi_A$ and $\phi_A$ represented in the formula 101 indicate the carrier phase rotation caused by the positional fluctuation of highly sensitive antennas against subtle climate conditions such as the wind and the surrounding temperature on the transmitting and receiving sides, in which the subscripts 1, 2 and 3 indicate the phase rotation of the second, third and fourth antennas viewed from the uppermost antenna.

By the way, the antenna-to-antenna spacing needs to be enlarged according to the frequency handled by the fixed microwaves communication and the local oscillators are implemented near the antennas accordingly. In other words, independent local oscillators are adopted for each antenna on both of the transmitting and receiving sides.

Accordingly, the phase noises $\Phi_L$ and $\phi_L$ are caused by the carrier synchronization not being carried out. The subscripts 1, 2 and 3 indicate the phase rotation of the local oscillators of the second, third and fourth antennas viewed from the uppermost antenna. With the aforesaid transmitting antenna and receiving antenna in common, a serious phase rotation caused by the directional movement of highly sensitive antennas against subtle climate conditions as the wind and the surrounding temperature all can be ascribed to the same modeling as that of the phase fluctuation by the local oscillators for each antenna, so that with the analysis according to the formula 101, it is made with the phase rotations defined as $\Phi_1=\Phi_{L1}+\Phi_{A1}$, $\Phi_2=\Phi_{L2}+\Phi_{A2}$ and $\Phi_3=\Phi_{L3}+\Phi_{A3}$ at the second, third and fourth antennas on the transmitting side and those defined as $\Phi_1=\Phi_{L1}+\Phi_{A1}$, $\Phi_2=\Phi_{L2}+\Phi_{A2}$ and $\Phi_3=\Phi_{L3}+\Phi_{A3}$ at the second, third and fourth antennas on the receiving side viewed from the uppermost antenna.

In other words, even with the exemplified arrangement hereof with four antennas, the formation of virtual orthogonal channels is feasible just with the unitary matrix operation just on the receiving side. The bold arrow signs shown in FIG. 10 indicate virtual orthogonal channels whose quality is constructed in proportion to $4^{1/2}$, $4^{1/2}$, $4^{1/2}$, and $4^{1/2}$.

Further, properly detecting the phase rotation of each antenna permits the equivalent characteristics to SVD system to be gained. The communication channel capacity is quadrupled according to the entire antenna power comparison.

Further, the cases where the matrix operation is carried out only on the receiving side, only on the transmitting side and on both of the transmitting and receiving sides with the arbitrary number of antennas are explained as follows in this order.

(Arrangement with the Arbitrary Number N of Antennas (General Solution))

The arrangement with the arbitrary number N of antennas is considered.

(Singular Value Orthogonal Matrix $\Lambda^{1/2}$)

The singular value orthogonal matrix is expressed with the following formula 102.

$$\Lambda^{1/2} = \begin{bmatrix} \sqrt{\lambda_1} & 0 & \cdots & 0 \\ 0 & \sqrt{\lambda_2} & \cdots & 0 \\ \vdots & \vdots & \ddots & \vdots \\ 0 & 0 & \cdots & \sqrt{\lambda_N} \end{bmatrix} = \quad \{\text{Formula 102}\}$$

$$\begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix}$$

(Communication Channel Matrix H)

Defining the communication channel matrix as the following formula 103, the idealistic line-of-sight channel matrix without any phase rotation on either of the transmitting and receiving sides is expressed with the following formula 104.

$$\frac{(n \cdot d)^2}{R} = \frac{n^2 \cdot \gamma}{N} \text{ where; } n = 0, 1, 2, 3, \cdots, N-1 \quad \{\text{Formula 103}\}$$

$$H_o = \begin{bmatrix} 1 & e^{-j\frac{\pi}{N}} & \cdots & e^{-j\frac{(N-1)^2\pi}{N}} \\ e^{-j\frac{\pi}{N}} & 1 & \ddots & e^{-j\frac{(N-2)^2\pi}{N}} \\ \vdots & \ddots & \ddots & \vdots \\ e^{-j\frac{(N-1)^2\pi}{N}} & e^{-j\frac{(N-2)^2\pi}{N}} & \cdots & 1 \end{bmatrix} \quad \{\text{Formula 104}\}$$

The phase rotation matrix T on the transmitting side is defined as the following formula 105.

$$T = \begin{bmatrix} 1 & 0 & \cdots & 0 \\ 0 & e^{j\Phi_1} & \cdots & 0 \\ \vdots & \vdots & \ddots & \vdots \\ 0 & 0 & \cdots & e^{j\phi_{N-1}} \end{bmatrix} \quad \{\text{Formula 106}\}$$

Likewise, the phase rotation matrix W on the receiving side is defined as the following formula 106.

$$W = \begin{bmatrix} 1 & 0 & \cdots & 0 \\ 0 & e^{j\phi_1} & \cdots & 0 \\ \vdots & \vdots & \ddots & \vdots \\ 0 & 0 & \cdots & e^{j\phi_{N-1}} \end{bmatrix} \quad \{\text{Formula 106}\}$$

Here, the phase differences are expressed with the following formulae 107 and 108, in which $\Phi_A$ and $\phi_A$ indicate the phase rotation caused by the positional fluctuation of highly sensitive antennas against subtle climate conditions such as the wind and the surrounding temperature and $\Phi_L$ and $\phi_L$ indicate the phase fluctuation caused by the carrier synchronization not being carried out on the transmitting and receiving sides as well as the subscripts indicate the places corresponding to the antennas viewed from the uppermost antenna.

$$\begin{cases} \phi_1 = \phi_{L_1} + \phi_{A_1} \\ \vdots \\ \phi_{N-1} = \phi_{L_{N-1}} + \phi_{A_{N-1}} \end{cases} \quad \{\text{Formula 107}\}$$

$$\begin{cases} \Phi_1 = \Phi_{L_1} + \Phi_{A_1} \\ \vdots \\ \Phi_{N-1} = \Phi_{L_{N-1}} + \Phi_{A_{N-1}} \end{cases} \quad \{\text{Formula 108}\}$$

Accordingly, the actual line-of-sight channel matrix with the phase rotation on both of the transmitting and receiving sides is expressed with the following formula 109.

$$H = W \cdot H_o \cdot T = \begin{bmatrix} 1 & 0 & \cdots & 0 \\ 0 & e^{j\phi_1} & \cdots & 0 \\ \vdots & \vdots & \ddots & \vdots \\ 0 & 0 & \cdots & e^{j\phi_{N-1}} \end{bmatrix} \cdot$$

$$\begin{bmatrix} 1 & e^{-j\frac{\pi}{N}} & \cdots & e^{-j\frac{(N-1)^2\pi}{N}} \\ e^{-j\frac{\pi}{N}} & 1 & \ddots & e^{-j\frac{(N-2)^2\pi}{N}} \\ \vdots & \ddots & \ddots & \vdots \\ e^{-j\frac{(N-1)^2\pi}{N}} & e^{-j\frac{(N-2)^2\pi}{N}} & \cdots & 1 \end{bmatrix} \cdot$$

$$\begin{bmatrix} 1 & 0 & \cdots & 0 \\ 0 & e^{j\phi_1} & \cdots & 0 \\ \vdots & \vdots & \ddots & \vdots \\ 0 & 0 & \cdots & e^{j\phi_{N-1}} \end{bmatrix}$$

{Formula 109}

(In the Case of the Unitary Matrix Operation being Carried Out Only on the Receiving Side)

Based on the following formula 110, the following formula 111 is established.

$$H = W \cdot H_o \cdot T = U \cdot A^{1/2} \cdot V^H = \quad \{\text{Formula 110}\}$$

$$U \cdot \begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix} \cdot \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix}$$

$$U = \frac{1}{\sqrt{N}} \cdot W \cdot H_o \cdot T \quad \{\text{Formula 111}\}$$

Accordingly, the following formula 112 is established.

$$U^H = \quad \{\text{Formula 112}\}$$

$$\frac{1}{\sqrt{N}} \cdot T^H \cdot H_o^H \cdot W^H = \frac{1}{\sqrt{N}} \cdot \begin{bmatrix} 1 & 0 & \cdots & 0 \\ 0 & e^{-j\Phi_1} & \cdots & 0 \\ \vdots & \vdots & \ddots & \vdots \\ 0 & 0 & \cdots & e^{-j\Phi_{N-1}} \end{bmatrix} \cdot$$

$$\begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \ddots & \ddots & \vdots \\ e^{j\frac{(N-1)^2\pi}{N}} & e^{j\frac{(N-2)^2\pi}{N}} & \cdots & 1 \end{bmatrix} \cdot$$

$$\begin{bmatrix} 1 & 0 & \cdots & 0 \\ 0 & e^{-j\phi_1} & \cdots & 0 \\ \vdots & \vdots & \ddots & \vdots \\ 0 & 0 & \cdots & e^{-j\phi_{N-1}} \end{bmatrix}$$

In other words, even in the arrangement with the arbitrary number N of antennas, the virtual orthogonal matrix can be constructed by the matrix operation processing only on the receiving side in the case of L.Os independent arrangement and/or against the directional displacement of highly sensitive antennas.

In this relation, reference is made to the following formula 113.

$$U^H \cdot U = \frac{1}{\sqrt{N}} \cdot T^H \cdot H_o^H \cdot W^H \cdot \frac{1}{\sqrt{N}} \cdot W \cdot H_o \cdot T = \quad \{\text{Formula 113}\}$$

$$\frac{1}{N} T^H \cdot H_o^H \cdot H_o \cdot T$$

Here, the following formula 114 is established.

$$H_o^H \cdot H_o = \begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \vdots & \ddots & \vdots \\ e^{j\frac{(N-1)^2\pi}{N}} & e^{j\frac{(N-2)^2\pi}{N}} & \cdots & 1 \end{bmatrix} \cdot \quad \{\text{Formula 114}\}$$

$$\begin{bmatrix} 1 & e^{-j\frac{\pi}{N}} & \cdots & e^{-j\frac{(N-1)^2\pi}{N}} \\ e^{-j\frac{\pi}{N}} & 1 & \ddots & e^{-j\frac{(N-2)^2\pi}{N}} \\ \vdots & \vdots & \ddots & \vdots \\ e^{-j\frac{(N-1)^2\pi}{N}} & e^{-j\frac{(N-2)^2\pi}{N}} & \cdots & 1 \end{bmatrix} = N \cdot I$$

This is due to the fact that when N is an even number, the aforesaid arbitrary column vector or the arbitrary row vector is what Chu sequences are subjected to the cyclic shift, so that their autocorrelations (E[a, a*]) intersect perpendicularly with each other. In turn, when N is an odd number, the cyclic shift is out of the question, but it is known as mentioned later that the autocorrelations intersect perpendicularly with each other.

(In the Case of the Unitary Matrix Operation being Carried Out Only on the Transmitting Side)

Based on the following formula 115, the following formula 116 is established.

$$H = W \cdot H_o \cdot T = U \cdot \Lambda^{1/2} \cdot V^H = \quad \{\text{Formula 115}\}$$

$$\begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix} \cdot \begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix} \cdot V^H$$

$$V^H = \frac{1}{\sqrt{N}} \cdot W \cdot H_o \cdot T \quad \{\text{Formula 116}\}$$

Accordingly, the following formula 117 is established.

$$V = \quad \{\text{Formula 117}\}$$

$$\frac{1}{\sqrt{N}} \cdot T^H \cdot H_o^H \cdot W^H = \frac{1}{\sqrt{N}} \cdot \begin{bmatrix} 1 & 0 & \cdots & 0 \\ 0 & e^{-j\phi_1} & \cdots & 0 \\ \vdots & \vdots & \ddots & \vdots \\ 0 & 0 & \cdots & e^{-j\phi_{N-1}} \end{bmatrix} \cdot$$

$$\begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \vdots & \ddots & \vdots \\ e^{j\frac{(N-1)^2\pi}{N}} & e^{j\frac{(N-2)^2\pi}{N}} & \cdots & 1 \end{bmatrix} \cdot$$

$$\begin{bmatrix} 1 & 0 & \cdots & 0 \\ 0 & e^{-j\phi_1} & \cdots & 0 \\ \vdots & \vdots & \ddots & \vdots \\ 0 & 0 & \cdots & e^{-j\phi_{N-1}} \end{bmatrix}$$

In other words, even in the arrangement with the arbitrary number N of antennas, the virtual orthogonal matrix can be constructed by the matrix operation processing V only on the transmitting side in the case of L.Os. independent arrangement and/or against the directional displacement of highly sensitive antennas.

(In the Case of the Unitary Matrix Operation being Carried Out on Both of the Transmitting and Receiving Sides)

(Singular Value Orthogonal Matrix $\Lambda^{1/2}$)

The singular value orthogonal matrix is expressed with the following formula 118.

$$\Lambda^{1/2} = \begin{bmatrix} \sqrt{\lambda_1} & 0 & \cdots & 0 \\ 0 & \sqrt{\lambda_2} & \cdots & 0 \\ \vdots & \vdots & \ddots & \vdots \\ 0 & 0 & \cdots & \sqrt{\lambda_N} \end{bmatrix} = \quad \{\text{Formula 118}\}$$

$$\begin{bmatrix} \sqrt{N} & 0 & \cdots & 0 \\ 0 & \sqrt{N} & \cdots & 0 \\ \vdots & \vdots & \ddots & \vdots \\ 0 & 0 & \cdots & \sqrt{N} \end{bmatrix}$$

Accordingly, the following formula 119 is established.

$$H = W \cdot H_0 \cdot T = U \cdot \Lambda^{1/2} \cdot V^H = \sqrt{N} \cdot U \cdot V^H \quad \{\text{Formula 119}\}$$

Here, defining the arbitrary unitary matrix as V, the following formula 120 is established.

$$U = \frac{1}{\sqrt{N}} \cdot W \cdot H_o \cdot T \cdot V \quad \{\text{Formula 120}\}$$

In this relation, the following formula 121 is established, in which U becomes the unitary matrix even when the arbitrary unitary matrix is defined as V.

$$U^H \cdot U = \frac{1}{\sqrt{N}} \cdot V^H \cdot T^H \cdot H_o^H \cdot W^H \cdot \frac{1}{\sqrt{N}} \cdot W \cdot H_o \cdot T \cdot V = \quad \{\text{Formula 121}\}$$

$$\frac{1}{N} \cdot N \cdot I = I$$

Accordingly, the following formula 122 is established.

$$U^H = \frac{1}{\sqrt{N}} \cdot V^H \cdot T^H \cdot H_o^H \cdot W^H = \quad \{\text{Formula 122}\}$$

$$\frac{V^H}{\sqrt{N}} \cdot \begin{bmatrix} 1 & 0 & \cdots & 0 \\ 0 & e^{-j\Phi_1} & \cdots & 0 \\ \vdots & \vdots & \ddots & \vdots \\ 0 & 0 & \cdots & e^{-j\Phi_{N-1}} \end{bmatrix} \cdot$$

$$\begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \ddots & \ddots & \vdots \\ e^{j\frac{(N-1)^2\pi}{N}} & e^{j\frac{(N-2)^2\pi}{N}} & \cdots & 1 \end{bmatrix} \cdot$$

$$\begin{bmatrix} 1 & 0 & \cdots & 0 \\ 0 & e^{-j\phi_1} & \cdots & 0 \\ \vdots & \vdots & \ddots & \vdots \\ 0 & 0 & \cdots & e^{-j\phi_{N-1}} \end{bmatrix}$$

In other words, even in the arrangement with the arbitrary number N of antennas and the unitary matrix operation being carried out on both of the transmitting and receiving sides, the virtual orthogonal matrix can be constructed by the matrix operation processing only on the receiving side even in the case of L.Os. independent arrangement and against the directional displacement of highly sensitive antennas.

At this time, with the fixed transmission matrix V, anything will do just if it is the unitary matrix while the unitary matrix operation on the receiving side is expressed with the following formula 123, which acts to compensate for the fluctuation caused by local oscillators and the directional displacement of antennas.

$$U^H = \frac{V^H}{\sqrt{N}} \cdot T^H \cdot H_o^H \cdot W^H \qquad \{\text{Formula 123}\}$$

Example

As a simple example, the above formula is applied to the arrangement with two antennas.

As the fixed arbitrary transmission matrix, for instance, the following formula 124 is selected.

$$V = \begin{bmatrix} \frac{-1}{\sqrt{2}} & \frac{1}{\sqrt{2}} \\ \frac{-1}{\sqrt{2}} & \frac{-1}{\sqrt{2}} \end{bmatrix} \qquad \{\text{Formula 124}\}$$

Based on the following formula 125, the following formula 126 is established.

$$H_0 = \begin{bmatrix} 1 & -j \\ -j & 1 \end{bmatrix} \qquad \{\text{Formula 125}\}$$

$$\begin{aligned} U^H &= \frac{V^H}{\sqrt{N}} \cdot T^H \cdot H_o^H \cdot W^H \\ &= \begin{bmatrix} \frac{-1}{2} & \frac{-1}{2} \\ \frac{1}{2} & \frac{-1}{2} \end{bmatrix} \cdot \begin{bmatrix} 1 & 0 \\ 0 & e^{-j\phi_1} \end{bmatrix} \cdot \begin{bmatrix} 1 & j \\ j & 1 \end{bmatrix} \cdot \\ &\quad \begin{bmatrix} 1 & 0 \\ 0 & e^{-j\phi_1} \end{bmatrix} \\ &= \begin{bmatrix} \frac{-1 - je^{-j\Phi_1}}{2} & \frac{-je^{-j\phi_1} - je^{-j(\Phi_1 + \phi_1)}}{2} \\ \frac{1 - je^{-j\Phi_1}}{2} & \frac{je^{-j\phi_1} - je^{-j(\Phi_1 + \phi_1)}}{2} \end{bmatrix} \end{aligned} \qquad \{\text{Formula 126}\}$$

Hereafter, the orthogonal relation adopted in the above formula 114 is explained as follows.

APPENDIX

The multiplication of the arbitrary m rows vector by the arbitrary n columns vector in the following formula 127 is calculated.

$$H_o^H \cdot H_o = \begin{bmatrix} 1 & e^{j\frac{\pi}{N}} & \cdots & e^{j\frac{(N-1)^2\pi}{N}} \\ e^{j\frac{\pi}{N}} & 1 & \ddots & e^{j\frac{(N-2)^2\pi}{N}} \\ \vdots & \ddots & \ddots & \vdots \\ e^{j\frac{(N-1)^2\pi}{N}} & e^{j\frac{(N-2)^2\pi}{N}} & \cdots & 1 \end{bmatrix} \cdot \qquad \{\text{Formula 127}\}$$

$$\begin{bmatrix} 1 & e^{-j\frac{\pi}{N}} & \cdots & e^{-j\frac{(N-1)^2\pi}{N}} \\ e^{-j\frac{\pi}{N}} & 1 & \ddots & e^{-j\frac{(N-2)^2\pi}{N}} \\ \vdots & \ddots & \ddots & \vdots \\ e^{-j\frac{(N-1)^2\pi}{N}} & e^{-j\frac{(N-2)^2\pi}{N}} & \cdots & 1 \end{bmatrix}$$

(1) In the Case of m<n
The following formula 128 is established.

$$\sum_{k=1}^{m} e^{j\frac{(m-k)^2\pi}{N}} \cdot e^{-j\frac{(n-k)^2\pi}{N}} + \sum_{k=m+1}^{n} e^{j\frac{(k-m)^2\pi}{N}} \cdot e^{-j\frac{(n-k)^2\pi}{N}} + \qquad \{\text{Formula 128}\}$$

$$\sum_{k=n+1}^{N} e^{j\frac{(k-m)^2\pi}{N}} \cdot e^{-j\frac{(k-n)^2\pi}{N}} =$$

$$\sum_{k=1}^{N} e^{j\frac{(m-k)^2\pi}{N}} \cdot e^{-j\frac{(n-k)^2\pi}{N}} =$$

$$\sum_{k=1}^{N} e^{j\frac{(m^2-n^2-2k(m-n))\pi}{N}} = e^{j\frac{(m^2-n^2)\pi}{N}} \cdot \sum_{k=1}^{N} e^{-j\frac{2k(m-n)\pi}{N}}$$

Here, supposing that the following formula 129 holds firm, the following formula 130 is established. Accordingly, the autocorrelations intersect perpendicularly with each other.

$$S = \sum_{k=1}^{N} e^{-j\frac{2k(m-n)\pi}{N}} = \sum_{k=1}^{N} (e^{-j\frac{2(m-n)\pi}{N}})^k \qquad \{\text{Formula 129}\}$$

$$(1 - e^{-j\frac{2(m-n)\pi}{N}}) \cdot S = e^{-j\frac{2(m-n)\pi}{N}} - (e^{-j\frac{2(m-n)\pi}{N}})^{N+1} = \qquad \{\text{Formula 130}\}$$

$$e^{-j\frac{2(m-n)\pi}{N}} \cdot \{1 - (e^{-j\frac{2(m-n)\pi}{N}})^N\} = 0 \therefore S = 0$$

(2) In the Case of m>n
The following formula 131 is established.

$$\sum_{k=1}^{n} e^{j\frac{(m-k)^2\pi}{N}} \cdot e^{-j\frac{(n-k)^2\pi}{N}} + \sum_{k=n+1}^{m} e^{j\frac{(m-k)^2\pi}{N}} \cdot e^{-j\frac{(k-n)^2\pi}{N}} + \qquad \{\text{Formula 131}\}$$

$$\sum_{k=m+1}^{N} e^{j\frac{(k-m)^2\pi}{N}} \cdot e^{-j\frac{(k-n)^2\pi}{N}} =$$

-continued $$\sum_{k=1}^{N} e^{j\frac{(m-k)2\pi}{N}} \cdot e^{-j\frac{(n-k)2\pi}{N}} =$$

$$\sum_{k=1}^{N} e^{j\frac{(m^2-n^2-2k(m-n))\pi}{N}} = e^{j\frac{(m^2-n^2)\pi}{N}} \cdot \sum_{k=1}^{N} e^{-j\frac{2k(m-n)\pi}{N}}$$

Likewise, the following formula 132 is established, so that the autocorrelations intersect perpendicularly with each other.

$$S = \sum_{k=1}^{N} e^{-j\frac{2k(m-n)\pi}{N}} = \sum_{k=1}^{N} (e^{-j\frac{2(m-n)\pi}{N}})^k = 0 \quad \{\text{Formula 131}\}$$

In view of the foregoing, the following formula 133 is established.

$$H_o^H \cdot H_o = \begin{bmatrix} 1 & e^{j\frac{\pi}{N}} & \cdots & e^{j\frac{(N-1)2\pi}{N}} \\ e^{j\frac{\pi}{N}} & 1 & \ddots & e^{j\frac{(N-2)2\pi}{N}} \\ \vdots & \ddots & \ddots & \vdots \\ e^{j\frac{(N-1)2\pi}{N}} & e^{j\frac{(N-2)2\pi}{N}} & \cdots & 1 \end{bmatrix} \cdot \quad \{\text{Formula 133}\}$$

$$\begin{bmatrix} 1 & e^{-j\frac{\pi}{N}} & \cdots & e^{-j\frac{(N-1)2\pi}{N}} \\ e^{j\frac{\pi}{N}} & 1 & \ddots & e^{-j\frac{(N-2)2\pi}{N}} \\ \vdots & \ddots & \ddots & \vdots \\ e^{-j\frac{(N-1)2\pi}{N}} & e^{-j\frac{(N-2)2\pi}{N}} & \cdots & 1 \end{bmatrix} = N \cdot I$$

Up to here, the arrangement, in which the communication capacity is multiplied by the number of antennas by correcting only with the unitary matrix U on the receiving side the phase noises caused by the directional displacement of highly sensitive antennas and by the carrier synchronization being infeasible due to the fact that the local oscillators are adopted for each antenna, has been explained.

Hereinafter, the characteristic aspects in the state of such non-idealistic distance between antennas or in the state where the virtual orthogonal channels have different thicknesses are explained as follows. The exemplified arrangement (5) is referred to as such one example.

(Characteristic analysis by SVD system according to line-of-sight fixed communication channel and by exemplified arrangement (5): in the case of virtual orthogonal channels having different thicknesses being formed; the matrix operation being carried out only on the receiving side; and local oscillators being adopted for each antenna on both of the transmitting and receiving sides)

Characteristic analysis is made in comparison with SVD system on the exemplified arrangement (5) in which the antenna-to-antenna spacing different from the optimum antenna position is adopted in order to make it practically flexible.

Based on the exemplified arrangement (5), assuming that the received signal vector is defined as r, the signal vector after being subjected to the matrix operation on the receiving side is expressed with the following formula 134.

$$U^{-1} \cdot r = U^{-1} \cdot (H \cdot S + n) \quad \{\text{Formula 134}\}$$
$$= U^{-1} \cdot (U \cdot \Lambda^{1/2} \cdot S + n) =$$
$$\Lambda^{1/2} \cdot S + U^{-1} \cdot n \because V = I$$

Here, S and n denote a transmitted signal vector and a noise vector respectively. Based on the exemplified arrangement (5), the following formula 135 is established, from which the following formula 136 is derived. Further, in order to make comparison with relative values, standardization being made in the expression of the following formula 137, the $SNR_1$ of $\lambda_1$ channel being expressed with the following formula 138.

$$U^{-1} = \begin{bmatrix} -je^{j\alpha}\frac{\cos(\alpha/2)}{\sin\alpha} & -je^{-j\phi}\frac{\cos(\alpha/2)}{\sin\alpha} \\ je^{-j\Phi}\frac{\sin(\alpha/2)}{\sin\alpha} & -je^{-j(\Phi+\phi)}e^{j\alpha}\frac{\sin(\alpha/2)}{\sin\alpha} \end{bmatrix} \quad \{\text{Formula 135}\}$$

$$S = \begin{bmatrix} s_1 \\ s_2 \end{bmatrix}, n = \begin{bmatrix} n_1 \\ n_2 \end{bmatrix} \quad \{\text{Formula 136}\}$$

$$E[|s_1|^2] = E[|s_2|^2] = 1, E[|n_1|^2] = E[|n_2|^2] = 1 \quad \{\text{Formula 137}\}$$

$$SNR_1 = \frac{|\lambda_1 \cdot s_1|^2}{E\left[\left|-je^{j\alpha}\frac{\cos(\alpha/2)}{\sin\alpha} \cdot n_1 + je^{-j\phi}\frac{\cos(\alpha/2)}{\sin\alpha} \cdot n_2\right|^2\right]} \quad \{\text{Formula 138}\}$$

$$= \frac{2 + 2\cos\alpha}{\left(2 \cdot \frac{\cos(\alpha/2)}{\sin\alpha}\right)^2} = \frac{4 \cdot \cos^2(\alpha/2)}{4 \cdot \frac{\cos^2(\alpha/2)}{\sin^2\alpha}}$$

$$= \sin^2\alpha$$

Likewise, the $SNR_2$ of $\lambda_2$ channel is expressed with the following formula 139, so that the SNR becomes $\sin^2\alpha$ in spite of the fact that the thicknesses of the orthogonal channels are different from each other or expressed with $\lambda_1 = 2 + 2\cos\alpha$ and $\lambda_2 = 2 - 2\cos\alpha$.

$$SNR_2 = \frac{|\lambda_2 \cdot s_2|^2}{E\left[\left|je^{-j\Phi}\frac{\sin(\alpha/2)}{\sin\alpha} \cdot n_1 - je^{-j(\Phi+\phi)}e^{j\alpha}\frac{\sin(\alpha/2)}{\sin\alpha} \cdot n_2\right|^2\right]} \quad \{\text{Formula 139}\}$$

$$= \frac{2 - 2\cos\alpha}{\left(2 \cdot \frac{\sin(\alpha/2)}{\sin\alpha}\right)^2} = \frac{4 \cdot \sin^2(\alpha/2)}{4 \cdot \frac{\sin^2(\alpha/2)}{\sin^2\alpha}}$$

$$= \sin^2\alpha$$

(In the Case of SVD System)

Hereafter, the characteristic analysis of SVD system is made to be compared with the above exemplified arrangement (5). Based on the view showing the exemplified arrangement of the line-of-sight MIMO communication system, the received signal vector after being subjected to the unitary matrix operation according to SVD system is expressed with the following formula 140.

$$U^H \cdot r = U^H \cdot (H \cdot V \cdot S + n) \quad \{\text{Formula 140}\}$$
$$= U^H \cdot (U \cdot \Lambda^{1/2} \cdot V^H \cdot V \cdot S + n) =$$

-continued
$$\Lambda^{1/2} \cdot S + U^H \cdot n$$

Based on the formula 43, the following formula 141 is established, so that the $SNR_1$ of $\lambda_1$ channel after being subjected to standardization is expressed with the following formula 142.

$$U^H = \begin{bmatrix} \frac{-e^{j\frac{\alpha}{2}}}{\sqrt{2}} & \frac{-e^{j\frac{\alpha}{2}}}{\sqrt{2}} \\ \frac{-je^{j\frac{\alpha}{2}}}{\sqrt{2}} & \frac{j \cdot e^{j\frac{\alpha}{2}}}{\sqrt{2}} \end{bmatrix}$$ {Formula 141}

$$SNR_1 = \frac{|\lambda_1 \cdot s_1|^2}{E\left[\left|\frac{-e^{j\alpha/2}}{\sqrt{2}} \cdot n_1 + \frac{-e^{j\alpha/2}}{\sqrt{2}} \cdot n_2\right|^2\right]}$$ {Formula 142}

$$= \frac{2 + 2\cos\alpha}{\left(2 \cdot \frac{1}{\sqrt{2}}\right)^2} = 1 + \cos\alpha$$

Likewise, the $SNR_2$ of $\lambda_2$ channel is expressed with the following formula 143, so that the respective SNRs are defined as $SNR_1=1+1 \cos \alpha$ and $SNR_2=1-1 \cos \alpha$ with the thicknesses of the orthogonal channels being in proportion to $\lambda_1=2+2 \cos \alpha$ and $\lambda_2=2-2 \cos \alpha$.

$$SNR_2 = \frac{|\lambda_2 \cdot s_2|^2}{E\left[\left|\frac{-je^{j\alpha/2}}{\sqrt{2}} \cdot n_1 + \frac{je^{j\alpha/2}}{\sqrt{2}} \cdot n_2\right|^2\right]}$$ {Formula 143}

$$= \frac{2 - 2\cos\alpha}{\left(2 \cdot \frac{1}{\sqrt{2}}\right)^2} = 1 - \cos\alpha$$

(Comparison of SNR of each orthogonal channel against the antenna-to-antenna spacing according to each system)

The characteristic analysis results according to the exemplified arrangement (5) and SVD system as described above are illustrated in FIG. 11 when they are compared in terms of the antenna-to-antenna spacing $d_T$ and $d_R$.

It is known that the exemplified arrangement (5) shows the same SNR value irrespective of the orthogonal channels $\lambda_1$ and $\lambda_2$, so that it is not controlled by the antenna-to-antenna spacing so much.

Analysis is made on the arrangement in which there is a position between antennas where a singular point arises with an eigenvalue rendered into a geometric multiplicity (double eigenvalue or multiple eigenvalue) in order to make it practically flexible on the premise that the matrix operation is carried out only on the receiving side which does not require sending the feedback data to the transmitting side.

As for the signal power after being subjected to the matrix operation on the receiving side, there is no difference between the exemplified arrangement (5) and SVD system or it results in a value in proportion to an eigenvalue, but in the case of SVD system, the noise power does not change even when an eigenvalue might change or always has the same value, since the matrix operation on the receiving side is the unitary matrix. Thus, the SNR of each path of SVD system changes along with the antenna-to-antenna spacing by different values in proportion to an eigenvalue.

Figure 11:
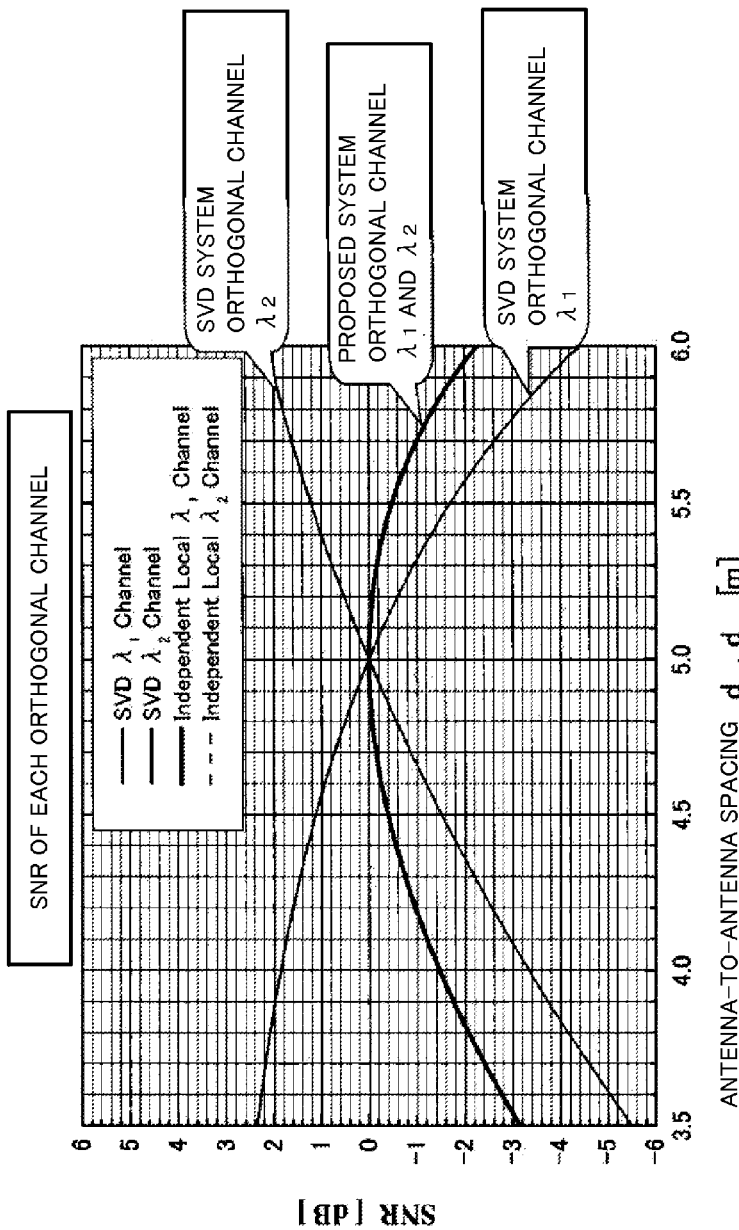
FIG. 11 is a view showing that the SNRs of the respective virtual orthogonal channels for the antenna-to-antenna spacing according to each system are compared among the respective systems.

On the other hand, the system of the exemplified arrangement (5) is not the unitary matrix anymore, so that the noise power changes along with the eigenvalue, as the result of which the SNR of each path thereof always has the same value and changes according to the antenna-to-antenna spacing with the same value and in the same manner whereas the signal power becomes large or small in proportion to the eigenvalue, which analysis result is illustrated in FIG. 11.

Accordingly, with the system of the exemplified arrangement (5), the SNR of each path against the virtual orthogonal channels keeps the same even when the antenna-to-antenna spacing might fluctuate, so that it is less controlled by the antenna-to-antenna spacing so much. This means that the system of the exemplified arrangement (5) is more practical and convenient to use than SVD system.

To note, the aforesaid results obtained through the theoretical analysis on the arrangement in which local oscillators are adopted for each antenna cover all the affects brought by such subtle climate conditions as the wind, since the phase rotation all can be ascribed to the same modeling as that of the phase fluctuation by the local oscillators for each antenna.

Then, the antennas implementation with the actual places where they are implemented taken into account is described. It is predicted that securing the places where they are implemented at the locations nearer to the users is hard to do. On the other hand, there is likelihood that it is comparatively much easier to ensure the places where the opposed antennas near the trunk network are implemented. Regarding the implementing relation between the antennas near the users and those near the trunk network, the case as shown in FIG. 12 where a different antenna-to-antenna spacing is adopted between the transmitting and receiving sides is described.

Figure 12:
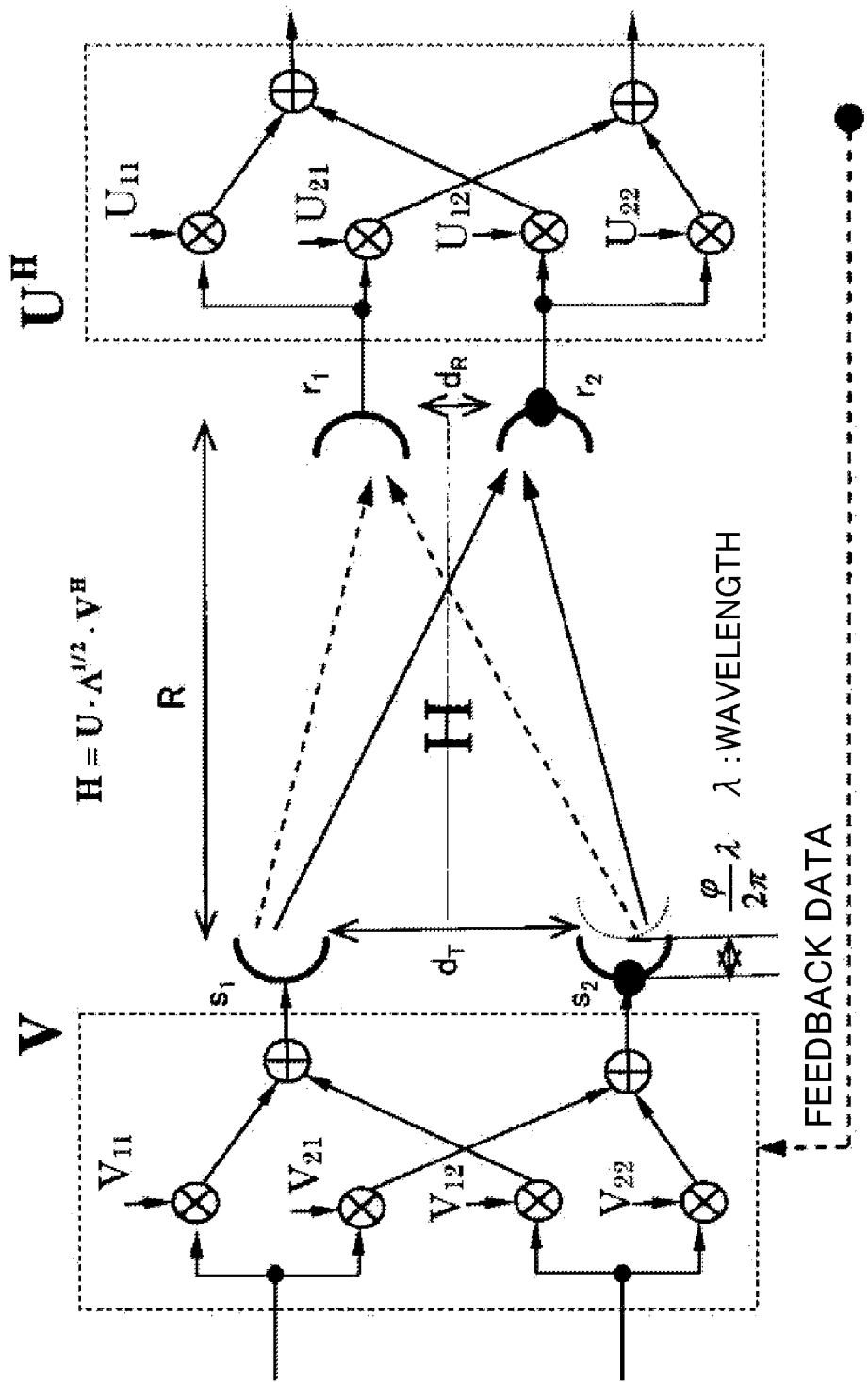
FIG. 12 shows an exemplified arrangement in which a different antenna-to-antenna spacing is adopted for transmission and reception.
Figure 13:
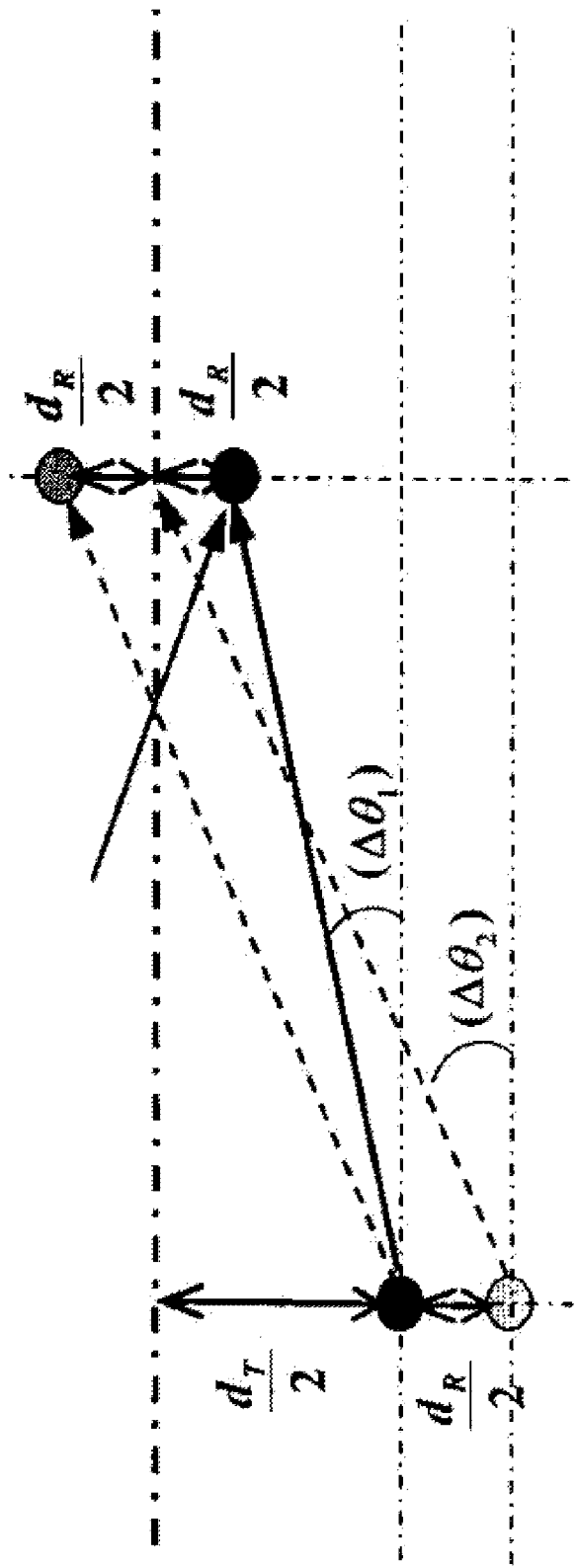
FIG. 13 shows the modeling of the channels shown in FIG. 12.

The following analysis is made based on FIG. 13 in which the channels illustrated in FIG. 12 are symmetrically divided into the upper and lower parts and such lower part is modeled.

The communication channel capacity is determined by the relative phase shift variable, so that range attenuation due to the spacing R between transmission and reception and common phase shift are disregarded in the calculation. The path difference with the diagonal path having the angle of $\Delta\theta_1$ against the spacing R with the spacing R defined as a reference is expressed with the following formula 144.

$$R \cdot (1 - \cos(\Delta\theta_1)) \approx R \cdot \left(\frac{(\Delta\theta_1)^2}{2}\right) =$$ {Formula 144}

$$R \cdot \left(\frac{1}{2}\left(\frac{d_T - d_R}{2R}\right)^2\right) = \frac{(d_T - d_R)^2}{8R}$$

$$\because \frac{\frac{d_T}{2} - \frac{d_R}{2}}{R} = \frac{d_T - d_R}{2R} = \tan(\Delta\theta_1) \approx (\Delta\theta_1)$$

Likewise, the path difference with the diagonal path having the angle of $\Delta\theta_2$ against the spacing R is expressed with the following formula 145.

$$R \cdot (1 - \cos(\Delta\theta_1)) \approx R \cdot \left(\frac{(\Delta\theta_2)^2}{2}\right) =$$ {Formula 145}

$$R \cdot \left(\frac{1}{2}\left(\frac{d_T + d_R}{2R}\right)^2\right) = \frac{(d_T + d_R)^2}{8R}$$

-continued $$\therefore \frac{\frac{d_T}{2} + \frac{d_R}{2}}{R} = \frac{d_T + d_R}{2R} = \tan(\Delta\theta_2) \approx (\Delta\theta_2)$$

The phase rotation α of two waves at the reception point due to the path difference is expressed with the following formula 146.

$$\alpha = 2\pi\left(\frac{(d_T + d_R)^2 - (d_T - d_R)^2}{8R}\right) / \gamma = \quad \{\text{Formula 146}\}$$

$$\frac{\pi}{\gamma} \cdot \frac{4 \cdot d_T \cdot d_R}{4 \cdot R} = \frac{\pi}{\gamma} \cdot \frac{d_T \cdot d_R}{R}$$

In this relation, assuming that RF frequency is defined as 30 GHz; R is equal to 2000 m; $d_T$ is equal to 5 m; and $d_R$ is equal to 2 m, the following formula 147 is established.

$$\alpha = \frac{\pi}{\gamma} \cdot \frac{d_T \cdot d_R}{R} = \frac{\pi}{(3 \cdot 10^8)/(30 \cdot 10^9)} \cdot \frac{5 \times 2}{2000} = \frac{\pi}{2} \quad \{\text{Formula 147}\}$$

The channel matrix H standardized with the diagonal path with the angle $\Delta\theta_1$ is defined as the following formula 148 with the phase shift Φ due to the positional fluctuation of the $s_2$ transmitting antenna taken into account, so that the same conditions as the previous results are presented.

$$H = \begin{bmatrix} 1 & e^{-j\alpha} \cdot e^{j\Phi} \\ e^{-j\alpha} & 1 \cdot e^{j\Phi} \end{bmatrix} \quad \{\text{Formula 148}\}$$

Based on the following formula 149, the following formula 150 is established.

$$\Omega = H^H \cdot H \quad \{\text{Formula 149}\}$$

$$= \begin{bmatrix} 1 & e^{j\alpha} \\ e^{j\alpha} \cdot e^{-j\Phi} & e^{-j\Phi} \end{bmatrix} \cdot \begin{bmatrix} 1 & e^{-j\alpha} \cdot e^{j\Phi} \\ e^{-j\alpha} & e^{j\Phi} \end{bmatrix}$$

$$= \begin{bmatrix} 2 & e^{j\Phi}(e^{j\alpha} + e^{-j\alpha}) \\ e^{-j\Phi}(e^{j\alpha} + e^{-j\alpha}) & 2 \end{bmatrix}$$

$$= \begin{bmatrix} 2 & 2 \cdot \cos\alpha \cdot e^{j\Phi} \\ 2 \cdot \cos\alpha \cdot e^{-j\Phi} & 2 \end{bmatrix}$$

$$\begin{vmatrix} 2-\lambda & 2 \cdot \cos\alpha \cdot e^{j\Phi} \\ 2 \cdot \cos\alpha \cdot e^{-j\Phi} & 2-\lambda \end{vmatrix} = \lambda^2 + 4 - 4\lambda - 4\cos^2\alpha \quad \{\text{Formula 150}\}$$

$$= \lambda^2 - 4\lambda - 4\sin^2\alpha = 0$$

$$\therefore \lambda = 2 \pm \sqrt{4 - 4\sin^2\alpha} = 2 \pm 2\cos\alpha$$

Figure 14:
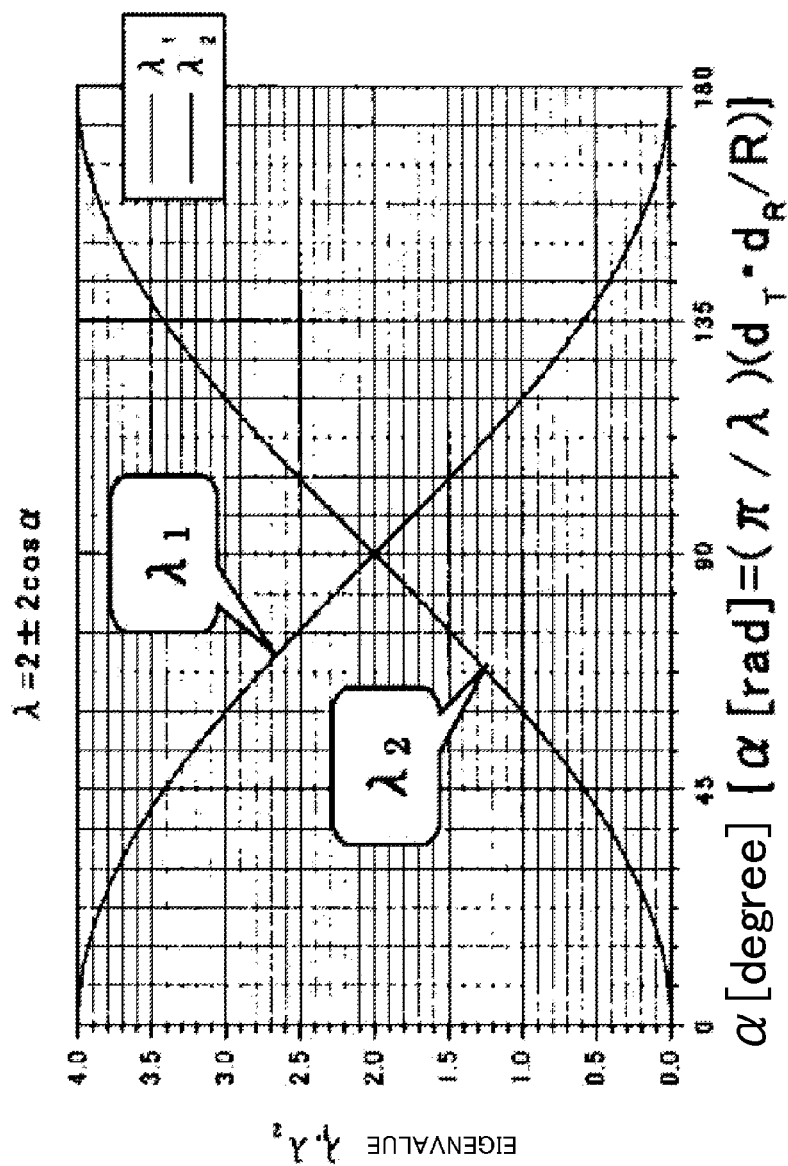
FIG. 14 shows a communication channel capacity when a different antenna-to-antenna spacing is adopted for transmission and reception according to FIG. 12.

It is FIG. 14 that renders the formula 150 into a graph.

From the foregoing results, supposing that the following formula 151 holds firm, the same results as the previous ones are brought. It results in that the proposed system can be used as it is.

$$\alpha = \frac{\pi}{\gamma} \cdot \frac{d_R^2}{R} \Rightarrow \alpha = \frac{\pi}{\gamma} \cdot \frac{d_T \cdot d_R}{R} \quad \{\text{Formula 151}\}$$

Further modified, the case where the rhombic displacement in the antenna dispositional direction arises between transmitting and receiving antennas is described.

Figure 15:
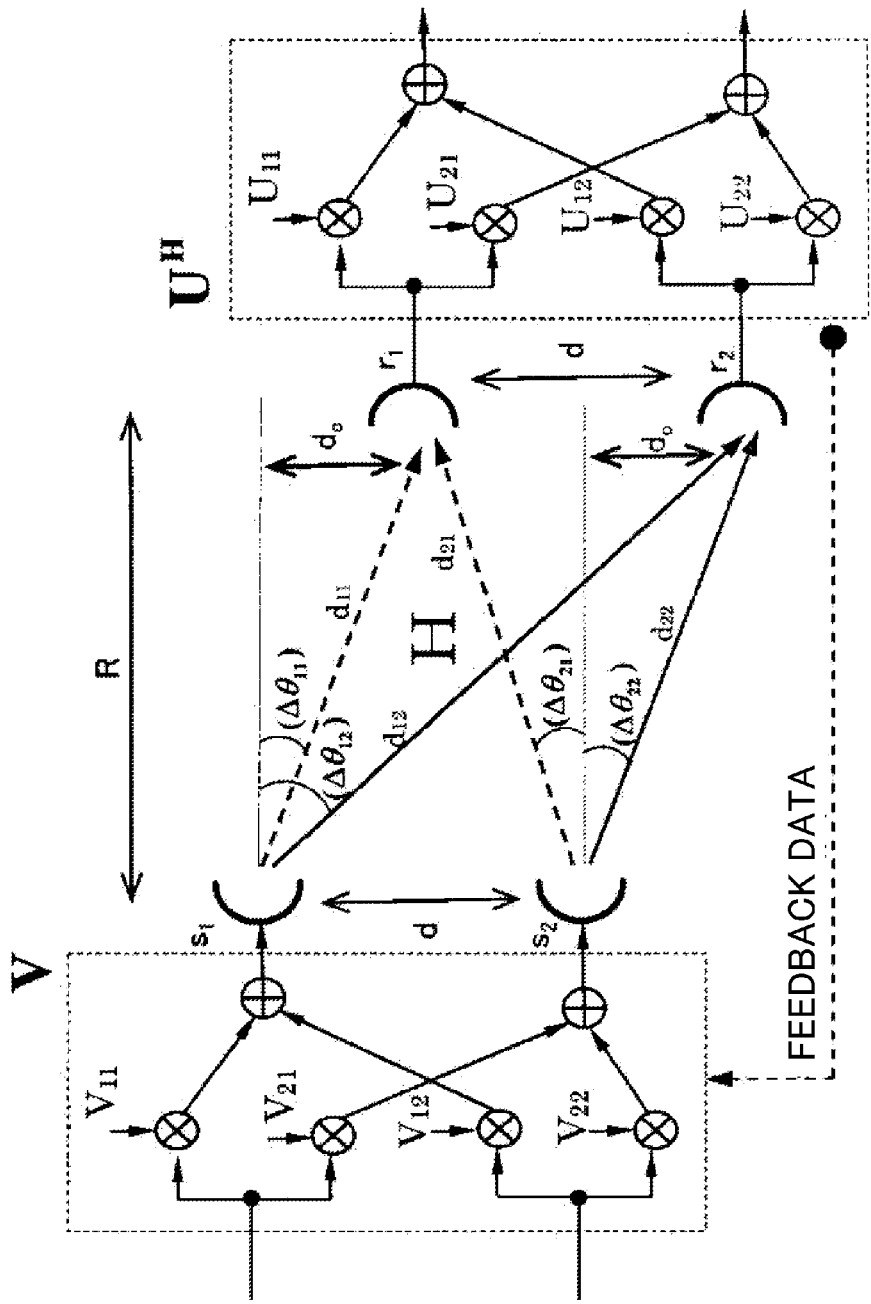
FIG. 15 shows an exemplified arrangement when the shapes of the transmitting and receiving antennas are rhombically displaced in the antenna implementing direction.

With reference to FIG. 15, the spacing R is defined as a reference in the same way as above. The path difference of the diagonal path against the spacing R, in the case of d11, is expressed with the following formula 152; in the case of d12, is expressed with the following formula 153; in the case of d21, is expressed with the following formula 154; and in the case of d22, is expressed with the following formula 155.

$$R \cdot (1 - \cos(\Delta\theta_{11})) \approx R \cdot \left(\frac{(\Delta\theta_{11})^2}{2}\right) = R \cdot \left(\frac{1}{2}\left(\frac{d_o}{R}\right)^2\right) = \frac{d_o^2}{2R} \quad \{\text{Formula 152}\}$$

$$\therefore \frac{d_o}{R} = \tan(\Delta\theta_{11}) \approx (\Delta\theta_{11})$$

$$R \cdot (1 - \cos(\Delta\theta_{12})) \approx R \cdot \left(\frac{(\Delta\theta_{12})^2}{2}\right) = \quad \{\text{Formula 153}\}$$

$$R \cdot \left(\frac{1}{2}\left(\frac{d + d_o}{R}\right)^2\right)$$

$$= \frac{(d + d_o)^2}{2R} = \frac{d^2 + d_o^2 + 2dd_o}{2R}$$

$$\therefore \frac{d + d_o}{R} = \tan(\Delta\theta_{12}) \approx (\Delta\theta_{12})$$

$$R \cdot (1 - \cos(\Delta\theta_{21})) \approx R \cdot \left(\frac{(\Delta\theta_{21})^2}{2}\right) = \quad \{\text{Formula 154}\}$$

$$R \cdot \left(\frac{1}{2}\left(\frac{d - d_o}{R}\right)^2\right)$$

$$= \frac{(d - d_o)^2}{2R} = \frac{d^2 + d_o^2 - 2dd_o}{2R}$$

$$\therefore \frac{d - d_o}{R} = \tan(\Delta\theta_{21}) \approx (\Delta\theta_{21})$$

$$R \cdot (1 - \cos(\Delta\theta_{22})) \approx R \cdot \left(\frac{(\Delta\theta_{22})^2}{2}\right) \quad \{\text{Formula 155}\}$$

$$= R \cdot \left(\frac{1}{2}\left(\frac{d_o}{R}\right)^2\right) = \frac{d_o^2}{2R}$$

$$\therefore \frac{d_o}{R} = \tan(\Delta\theta_{22}) \approx (\Delta\theta_{22})$$

Defining the phase rotation due to the path difference as the following formula 156, the channel matrix H standardized at the path d11 is expressed with the following formula 157.

$$\alpha = 2\pi\left(\frac{d^2}{2R}\right) / \gamma = \frac{\pi}{\gamma} \cdot \frac{d^2}{R}, \quad \{\text{Formula 156}\}$$

$$\xi = 2\pi\left(\frac{2 \cdot d \cdot d_o}{2R}\right) / \gamma = \frac{\pi}{\gamma} \cdot \frac{2 \cdot d \cdot d_o}{R}$$

$$H = \begin{bmatrix} 1 & e^{-j\alpha} \cdot e^{j\xi} \\ e^{-j\alpha} \cdot e^{-j\xi} & 1 \end{bmatrix} \quad \{\text{Formula 157}\}$$

Accordingly, the following formula 158 is established.

$$\Omega = H^H \cdot H = \begin{bmatrix} 1 & e^{j\alpha} \cdot e^{j\xi} \\ e^{j\alpha} \cdot e^{-j\xi} & 1 \end{bmatrix}. \quad \{\text{Formula 158}\}$$

-continued $$\begin{bmatrix} 1 & e^{-j\alpha} \cdot e^{j\xi} \\ e^{-j\alpha} \cdot e^{-j\xi} & 1 \end{bmatrix}$$

$$= \begin{bmatrix} 2 & e^{j\xi}(e^{j\alpha} + e^{-j\alpha}) \\ e^{-j\xi}(e^{j\alpha} + e^{-j\alpha}) & 2 \end{bmatrix}$$

$$= \begin{bmatrix} 2 & 2\cdot\cos\alpha \cdot e^{j\xi} \\ 2\cdot\cos\alpha \cdot e^{-j\xi} & 2 \end{bmatrix}$$

Based on the foregoing, the following formula 159 is established, in which it is known that there is no affect on an eigenvalue which is the thickness of each path even when the rhombic displacement might arise.

$$\begin{vmatrix} 2-\gamma & 2\cdot\cos\alpha \cdot e^{j\xi} \\ 2\cdot\cos\alpha \cdot e^{-j\xi} & 2-\gamma \end{vmatrix} = \gamma^2 + 4 - 4\gamma - 4\cos^2\alpha \quad \{\text{Formula 159}\}$$

$$= \gamma^2 - 4\gamma - 4\sin^2\alpha = 0$$

$$\therefore \gamma = 2 \pm \sqrt{4 - 4\sin^2\alpha} = 2 \pm 2\cos\alpha$$

The singular value decomposition of the above channel matrix H is expressed with the following formula 160.
(Singular Value Decomposition $H = U \cdot \Lambda^{1/2} \cdot V^H$)

$$H = U \cdot \Lambda^{1/2} \cdot V^H \quad \{\text{Formula 160}\}$$

$$= \begin{bmatrix} \dfrac{-e^{-j\frac{\alpha}{2}}}{\sqrt{2}} & \dfrac{j \cdot e^{-j\frac{\alpha}{2}}}{\sqrt{2}} \\ \dfrac{-e^{-j\frac{\alpha}{2}} \cdot e^{-j\xi}}{\sqrt{2}} & \dfrac{-j \cdot e^{-j\frac{\alpha}{2}} \cdot e^{-j\xi}}{\sqrt{2}} \end{bmatrix} \cdot$$

$$\begin{bmatrix} (e^{j\frac{\alpha}{2}} + e^{-j\frac{\alpha}{2}}) & 0 \\ 0 & -j(e^{j\frac{\alpha}{2}} - e^{-j\frac{\alpha}{2}}) \end{bmatrix} \cdot \begin{bmatrix} \dfrac{-1}{\sqrt{2}} & \dfrac{-e^{j\xi}}{\sqrt{2}} \\ \dfrac{1}{\sqrt{2}} & \dfrac{-e^{j\xi}}{\sqrt{2}} \end{bmatrix}$$

$$= \begin{bmatrix} \dfrac{-(1+e^{-j\alpha})}{\sqrt{2}} & \dfrac{(1-e^{-j\alpha})}{\sqrt{2}} \\ \dfrac{-(1+e^{-j\alpha}) \cdot e^{-j\xi}}{\sqrt{2}} & \dfrac{-(1+e^{-j\alpha}) \cdot e^{-j\xi}}{\sqrt{2}} \end{bmatrix} \cdot$$

$$\begin{bmatrix} \dfrac{-1}{\sqrt{2}} & \dfrac{-e^{j\xi}}{\sqrt{2}} \\ \dfrac{1}{\sqrt{2}} & \dfrac{-e^{j\xi}}{\sqrt{2}} \end{bmatrix}$$

$$= \begin{bmatrix} 1 & e^{-j\alpha} \cdot e^{j\xi} \\ e^{-j\alpha} \cdot e^{-j\xi} & 1 \end{bmatrix}$$

Further, the above U and V are defined as the following formula 161, in which it is confirmed that the above U and V are the unitary matrices and the singular value decomposition of H holds firm.

$$U^H \cdot U = \begin{bmatrix} \dfrac{-e^{j\frac{\alpha}{2}}}{\sqrt{2}} & \dfrac{-e^{j\frac{\alpha}{2}} \cdot e^{j\xi}}{\sqrt{2}} \\ \dfrac{-j \cdot e^{j\frac{\alpha}{2}}}{\sqrt{2}} & \dfrac{j \cdot e^{j\frac{\alpha}{2}} \cdot e^{j\xi}}{\sqrt{2}} \end{bmatrix} \cdot \quad \{\text{Formula 161}\}$$

$$\begin{bmatrix} \dfrac{-e^{-j\frac{\alpha}{2}}}{\sqrt{2}} & \dfrac{j \cdot e^{-j\frac{\alpha}{2}}}{\sqrt{2}} \\ \dfrac{-e^{-j\frac{\alpha}{2}} \cdot e^{-j\xi}}{\sqrt{2}} & \dfrac{-j \cdot e^{-j\frac{\alpha}{2}} \cdot e^{-j\xi}}{\sqrt{2}} \end{bmatrix}$$

$$= \begin{bmatrix} 1 & 0 \\ 0 & 1 \end{bmatrix}$$

$$V \cdot V^H = \begin{bmatrix} \dfrac{-1}{\sqrt{2}} & \dfrac{1}{\sqrt{2}} \\ \dfrac{-e^{-j\xi}}{\sqrt{2}} & \dfrac{-e^{-j\xi}}{\sqrt{2}} \end{bmatrix} \cdot \begin{bmatrix} \dfrac{-1}{\sqrt{2}} & \dfrac{-e^{j\xi}}{\sqrt{2}} \\ \dfrac{1}{\sqrt{2}} & \dfrac{-e^{j\xi}}{\sqrt{2}} \end{bmatrix}$$

$$= \begin{bmatrix} 1 & 0 \\ 0 & 1 \end{bmatrix}$$

In other words, there is no affect on an eigenvalue which is the thickness of each path before being displaced even when such rhombic displacement might arise and the singular value decomposition of the above channel matrix H can be realized with the unitary matrices U and V as well. To note, it is needless to say that even when there might be the phase shift Φ due to the positional fluctuation of the transmitting antenna, the same arrangement as mentioned above is feasible.

Then, when such rhombic displacement arises, any affect given to the arrangement of the proposed matrix operation only on the receiving end is described.
(In the Case of the Matrix Operation being Carried Out Only on the Receiving End and the Shape Between the Transmitting and Receiving Antennas being Rhombic)

With the arrangement of the matrix operation only on the receiving end according to the present invention, the case where the rhombic displacement in the antenna implementing direction arises between the transmitting and receiving antennas is described. The rhombic communication channel matrix H obtained according to the abovementioned discussion is used as it is.

Figure 16:
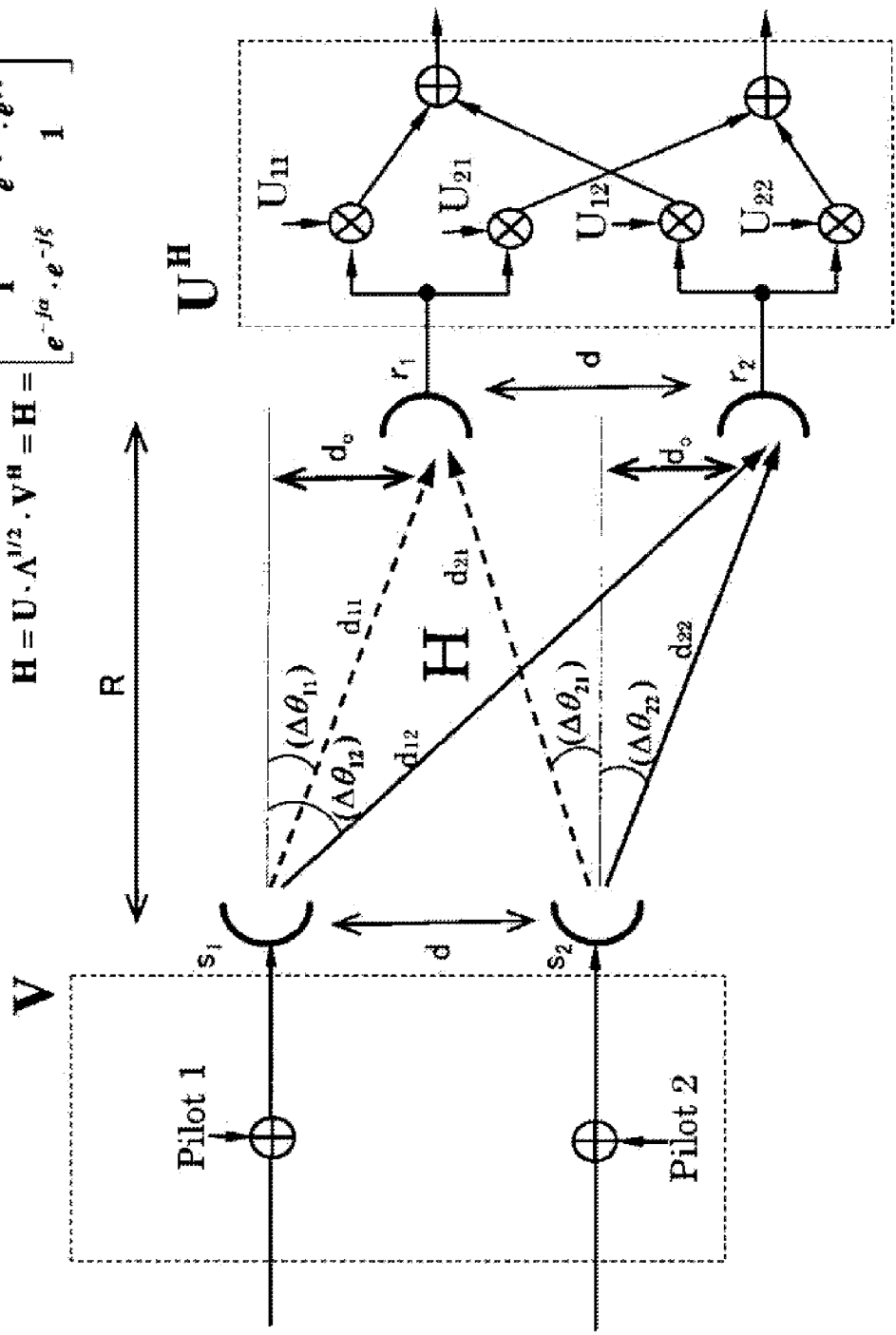
FIG. 16 shows an exemplified arrangement of the unitary matrix operation only on the receiving side with the transmitting and receiving antennas shapes rhombically displaced in the antenna implementing direction.

With reference to FIG. 16, considering the case where the position between antennas corresponds to $e^{j\alpha} = j$, by way of one example, the following formula 162 is established.
(Singular Value Orthogonal Matrix $\Lambda^{1/2}$)

$$\Lambda^{1/2} = \begin{bmatrix} \sqrt{\lambda_1} & 0 \\ 0 & \sqrt{\lambda_2} \end{bmatrix} = \begin{bmatrix} \sqrt{2 + 2\cos\alpha} & 0 \\ 0 & \sqrt{2 - 2\cos\alpha} \end{bmatrix} = \quad \{\text{Formula 162}\}$$

$$\begin{bmatrix} \sqrt{2} & 0 \\ 0 & \sqrt{2} \end{bmatrix}$$

(Communication Channel Matrix H)
The communication channel matrix is expressed with the following formula 163.

$$H = \begin{bmatrix} 1 & -j \cdot e^{j\xi} \\ -j \cdot e^{-j\xi} & 1 \end{bmatrix} = U \cdot \Lambda^{1/2} \cdot V^H \quad \{\text{Formula 163}\}$$

$$= U \cdot \begin{bmatrix} \sqrt{2} & 0 \\ 0 & \sqrt{2} \end{bmatrix} \cdot \begin{bmatrix} 1 & 0 \\ 0 & 1 \end{bmatrix}$$

where; $\alpha = \dfrac{\pi}{2}, \xi = \dfrac{2\pi \cdot d \cdot d_o}{\gamma R}$ $$\therefore U = \begin{bmatrix} U_{11} & U_{12} \\ U_{21} & U_{22} \end{bmatrix}$$

$$= \begin{bmatrix} 1 & -j \cdot e^{j\xi} \\ -j \cdot e^{-j\xi} & 1 \end{bmatrix} \cdot \begin{bmatrix} 1/\sqrt{2} & 0 \\ 0 & 1/\sqrt{2} \end{bmatrix}$$

$$= \begin{bmatrix} 1/\sqrt{2} & -j \cdot e^{j\xi}/\sqrt{2} \\ -j \cdot e^{-j\xi}/\sqrt{2} & 1/\sqrt{2} \end{bmatrix}$$

$$\therefore U^H = \begin{bmatrix} 1/\sqrt{2} & j \cdot e^{j\xi}/\sqrt{2} \\ j \cdot e^{-j\xi}/\sqrt{2} & 1/\sqrt{2} \end{bmatrix}$$

where; $\alpha = \dfrac{\pi}{\gamma} \cdot \dfrac{d^2}{R} = \dfrac{\pi}{2}, \xi = \dfrac{2\pi \cdot d \cdot d_o}{\gamma R}$ Here, the following formula 164 is established, in which it is known that there is no affect on the proposed unitary matrix operation only on the receiving end even when such rhombic displacement might arise. To note, even when there might be the phase shift Φ or φ due to the arrangement of local oscillators or the antenna dispositional fluctuation, the same arrangement as described above is feasible.

$$U^H \cdot U = \begin{bmatrix} 1/\sqrt{2} & j \cdot e^{j\xi}/\sqrt{2} \\ j \cdot e^{-j\xi}/\sqrt{2} & 1/\sqrt{2} \end{bmatrix} \cdot \qquad \text{\{Formula 164\}}$$

$$\begin{bmatrix} 1/\sqrt{2} & -j \cdot e^{j\xi}/\sqrt{2} \\ -j \cdot e^{-j\xi}/\sqrt{2} & 1/\sqrt{2} \end{bmatrix}$$

$$= \begin{bmatrix} 1 & 0 \\ 0 & 1 \end{bmatrix}$$

The case of the further generalized shape between the transmitting and receiving antennas is described. This is an application example in which the latitude with which the implementing locations of wireless LANs and as such arranged in the line-of-sight communication system is high.

(In the Case of the Further Generalized Shape Between the Transmitting and Receiving Antennas)

Figure 17:
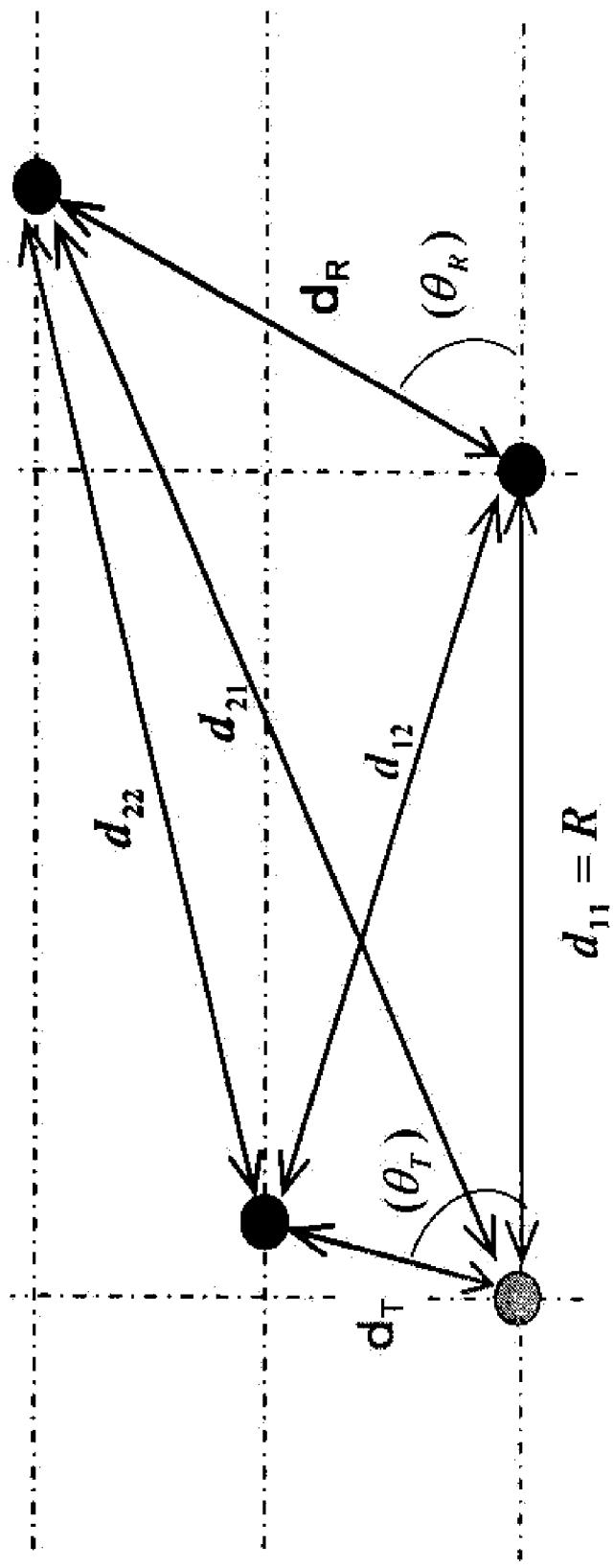
FIG. 17 shows the case where the antennas are implemented according to an arbitrary geometric shape.

With reference to FIG. 17, the following formula 165 is established.

$$d_{11} = R \qquad \text{\{Formula 165\}}$$

$$d_{12} = \{(R - d_T\cos(\theta_T))^2 + (d_T\sin(\theta_T))^2\}^{1/2} \approx$$

$$(R - d_T\cos(\theta_T))\left(1 + \dfrac{(d_T\sin(\theta_T))^2}{2(R - d_T\cos(\theta_T))^2}\right) \approx$$

$$R - d_T\cos(\theta_T) + \dfrac{(d_T\sin(\theta_T))^2}{2(R - d_T\cos(\theta_T))} \approx$$

$$R - d_T\cos(\theta_T) + \dfrac{(d_T\sin(\theta_T))^2}{2R}$$

$$d_{21} = \{(R - d_R\cos(\theta_R))^2 + (d_R\sin(\theta_R))^2\}^{1/2} \approx$$

$$(R + d_R\cos(\theta_R))\left(1 + \dfrac{(d_R\sin(\theta_R))^2}{2(R + d_R\cos(\theta_R))^2}\right) \approx$$

$$R + d_R\cos(\theta_R) + \dfrac{(d_R\sin(\theta_R))^2}{2(R + d_R\cos(\theta_R))} \approx$$

$$R + d_R\cos(\theta_R) + \dfrac{(d_R\sin(\theta_R))^2}{2R}$$

$$d_{22} = \{(R - d_T\cos(\theta_T) + d_R\cos(\theta_R))^2 +$$

$$(d_R\sin(\theta_R) - d_T\sin(\theta_T))^2\}^{1/2} \approx$$

$$(R - d_T\cos(\theta_T) + d_R\cos(\theta_R))$$

$$\left(1 + \dfrac{(d_R\sin(\theta_R) - d_T\sin(\theta_T))^2}{2(R - d_T\cos(\theta_T) + d_R\cos(\theta_R))^2}\right) \approx$$

$$R - d_T\cos(\theta_T) + d_R\cos(\theta_R) +$$

$$\dfrac{(d_R\sin(\theta_R) - d_T\sin(\theta_T))^2}{2(R - d_T\cos(\theta_T) + d_R\cos(\theta_R))} \approx$$

$$R - d_T\cos(\theta_T) + d_R\cos(\theta_R) + \dfrac{(d_R\sin(\theta_R) - d_T\sin(\theta_T))^2}{2R}$$

The communication channel matrix H with attention paid only to the phase difference of each receiving antenna is defined as the following formula 166 based on FIG. 17.

$$H = \begin{bmatrix} 1 & e^{j-\frac{2\pi}{\gamma}(d_{12}-d_{11})} \\ e^{j-\frac{2\pi}{\gamma}(d_{21}-d_{22})} & 1 \end{bmatrix} \qquad \text{\{Formula 166\}}$$

Based on the foregoing formula, the following formula 167 is established.

$$Q = H^H \cdot H \qquad \text{\{Formula 167\}}$$

$$= \begin{bmatrix} 1 & e^{j\frac{2\pi}{\gamma}(d_{21}-d_{22})} \\ e^{j\frac{2\pi}{\gamma}(d_{12}-d_{11})} & 1 \end{bmatrix} \cdot$$

$$\begin{bmatrix} 1 & e^{j-\frac{2\pi}{\gamma}(d_{12}-d_{11})} \\ e^{j-\frac{2\pi}{\gamma}(d_{21}-d_{22})} & 1 \end{bmatrix}$$

$$= \begin{bmatrix} 2 & e^{j-\frac{2\pi}{\gamma}(d_{12}-d_{11})} + e^{j\frac{2\pi}{\gamma}(d_{21}-d_{22})} \\ e^{j\frac{2\pi}{\gamma}(d_{12}-d_{11})} + e^{j-\frac{2\pi}{\gamma}(d_{21}-d_{22})} & 2 \end{bmatrix} \Rightarrow \begin{bmatrix} 2 & 0 \\ 0 & 2 \end{bmatrix}$$

Accordingly, in order that an eigenvalue is rendered into a geometric multiplicity (double eigenvalue or multiple eigenvalue), it is just that the first member expressed with the following formula 168 and the second member expressed with the following formula 169 becomes inverse phases. In other words, the following formula 170 is established or the following formula 171 is established on account that the difference between the first and second members is π.

$$\dfrac{2\pi}{\gamma}(d_{12} - d_{11}) \qquad \text{\{Formula 168\}}$$

$$-\dfrac{2\pi}{\gamma}(d_{21} - d_{22}) \qquad \text{\{Formula 169\}}$$

$$\dfrac{2\pi}{\gamma}(d_{12} - d_{11}) = \dfrac{2\pi}{\gamma}(d_{21} - d_{22}) \bmod 2\pi \qquad \text{\{Formula 170\}}$$

$$\dfrac{2\pi}{\gamma}(d_{12} - d_{11}) + \dfrac{2\pi}{\gamma}(d_{21} - d_{22}) = \pi \bmod 2\pi \qquad \text{\{Formula 171\}}$$

Based on the foregoing, the following formula 172 is established.

$$\therefore \frac{2\pi}{\gamma}|d_{12} - d_{11} + d_{21} - d_{22}| = \pi(2n+1) \; n \in Z^+ \quad \text{\{Formula 172\}}$$

$$\therefore |d_{12} - d_{11} + d_{21} - d_{22}| = \frac{\gamma}{2}(2n+1) \; n \in Z^+$$

The above d11 to d22 being assigned to the foregoing relation, the following formula 173 is established, so that the following formula 174 is established.

$$|d_{12} - d_{11} + d_{21} - d_{22}| = \left| -d_T \cos(\theta_T) + \frac{(d_T \sin(\theta_T))^2}{2R} + \frac{(d_R \sin(\theta_R))^2}{2R} + d_T \cos(\theta_T) - \frac{(d_R \sin(\theta_R) - d_T \sin(\theta_T))^2}{2R} \right| \quad \text{\{Formula 173\}}$$

$$= \left| \frac{(d_T \sin(\theta_T))^2}{2R} + \frac{(d_R \sin(\theta_R))^2}{2R} + \frac{(d_R \sin(\theta_R) - d_T \sin(\theta_T))^2}{2R} \right|$$

$$= \left| \frac{-2 \cdot d_T \cdot d_R \cdot \sin(\theta_T) \cdot \sin(\theta_R)}{2R} \right| = \frac{d_T \cdot d_R \cdot \sin(\theta_T) \cdot \sin(\theta_R)}{R}$$

$$\frac{d_T \cdot d_R \cdot \sin(\theta_T) \cdot \sin(\theta_R)}{R} = \frac{\gamma}{2}(2n+1) \; n \in Z^+ \quad \text{\{Formula 174\}}$$

Accordingly, the condition under which the eigenvalue is rendered into a geometric multiplicity (double eigenvalue or multiple eigenvalue) is defined as the following formula 175.

$$\therefore d_T \cdot d_R = \frac{R}{\sin(\theta_T) \cdot \sin(\theta_R)} \cdot \gamma \cdot \left(n + \frac{1}{2}\right) \; n \in Z^+ \quad \text{\{Formula 175\}}$$

Just with the antenna arrangement satisfying the above condition, various arrangements are feasible with the paths of the same thickness. To note, attention shall be drawn to the fact that there is slight difference in definition on the spacing R adopted herein and that adopted above.

To note, in the above explanations, they are based on using the pilot signal as the means to detect the fluctuation of antennas or that of channels caused by the external factors or the phase fluctuation caused by independent local oscillators being adopted for each antenna, but such directional fluctuation and phase fluctuation can be detected through other processing in which such pilot signal is not used. For example, data carrying information is used. Although the details are not shown in the drawings, by way of some examples, there is a method to estimate the phase fluctuation with determination results after equalization or that to estimate the same by re-encoding the signal after being subjected to an error correction. Hereafter, such methods are explained especially in the case of the arrangement with two antennas to avoid cumbersomeness.

Explanation is given based on the aforesaid communication channel matrix expressed with the following formula 176.

$$H = \begin{bmatrix} 1 & -j \cdot e^{j\Phi} \\ -j \cdot e^{j\phi} & 1 \cdot e^{j(\Phi+\phi)} \end{bmatrix} \quad \text{\{Formula 176\}}$$

Defining the transmitted signal vector and the received signal vector as the following formula 177, the following formula 178 is established.

$$S = \begin{bmatrix} s_1 \\ s_2 \end{bmatrix}, Y = \begin{bmatrix} y_1 \\ y_2 \end{bmatrix} \quad \text{\{Formula 177\}}$$

$$Y = \begin{bmatrix} y_1 \\ y_2 \end{bmatrix} = H \cdot S = \begin{bmatrix} 1 & -j \cdot e^{j\Phi} \\ -j \cdot e^{j\phi} & 1 \cdot e^{j(\Phi+\phi)} \end{bmatrix} \cdot \begin{bmatrix} s_1 \\ s_2 \end{bmatrix} \quad \text{\{Formula 178\}}$$

Here, assuming that $s_1$ and $s_2$ represented in the above formula are correctly gained through the determination result after equalization or the signal reproduction after the error correction, based on the relational expression of the following formula 179, the following formula 180 is established, which allows the phase shift $\Phi$ to be detected.

$$y_1 = s_1 - j \cdot e^{j\Phi} \cdot s_2 \quad \text{\{Formula 179\}}$$

$$e^{j\Phi} = \frac{s_1 - y_1}{j \cdot s_2} \quad \text{\{Formula 180\}}$$

Then, such detected phase shift $\Phi$ is used in the calculation, but before that based on the relational expression of the formula 178, the following formula 181 is established, so that the following formula 182 is established, which allows such phase shift $\phi$ to be detected.

$$y_2 = -j \cdot e^{j\phi} \cdot s_1 + e^{j(\Phi+\phi)} \cdot s_2 \quad \text{\{Formula 181\}}$$

$$e^{j\phi} = \frac{y_2}{e^{j\Phi} \cdot s_2 - j \cdot s_1} \quad \text{\{Formula 182\}}$$

Accordingly, using data carrying information permits the fluctuation of antennas or channels caused by the external factors or the phase fluctuation caused by the independent local oscillators being adopted for each antenna to be detected without using the pilot signal. To note, the present operation shows that after the initial start-up, but once the start-up is completed, the detection of the phase fluctuation as described above constantly continues, since data is constantly on the line.

(Shortening Antenna-to-Antenna Spacing of LOS-MIMO Communication System)

The above descriptions are centered on the case where the communication system is arranged with general antennas without any contrivance on such antennas themselves. However, upon the actual antennas being implemented, an idealistic antennas implementation is not always feasible as there are cases where they are implemented on the building top or the lamp posts. In such cases, the antenna-to-antenna spacing d results in being shortened from the idealistic spacing d=5 m as illustrated in FIG. 11, so that their characteristics deteriorate. In other cases, it requires that special supporting members are separately procured or in some cases, there is no implementing them, so that the workability deteriorates.

Thus, the method by which the streamlining in size of the antennas of LOS-MIMO communication system is realized with metamaterial is explained.

To note, the line-of-sight MIMO communication system is referred to as LOS-MIMO (Line Of Sight MIMO). The line-of-sight environment is also referred to as LOS environment. On the contrary, the Non-Line-Of-Sight environment is also referred to as NLOS environment.

Figure 18:
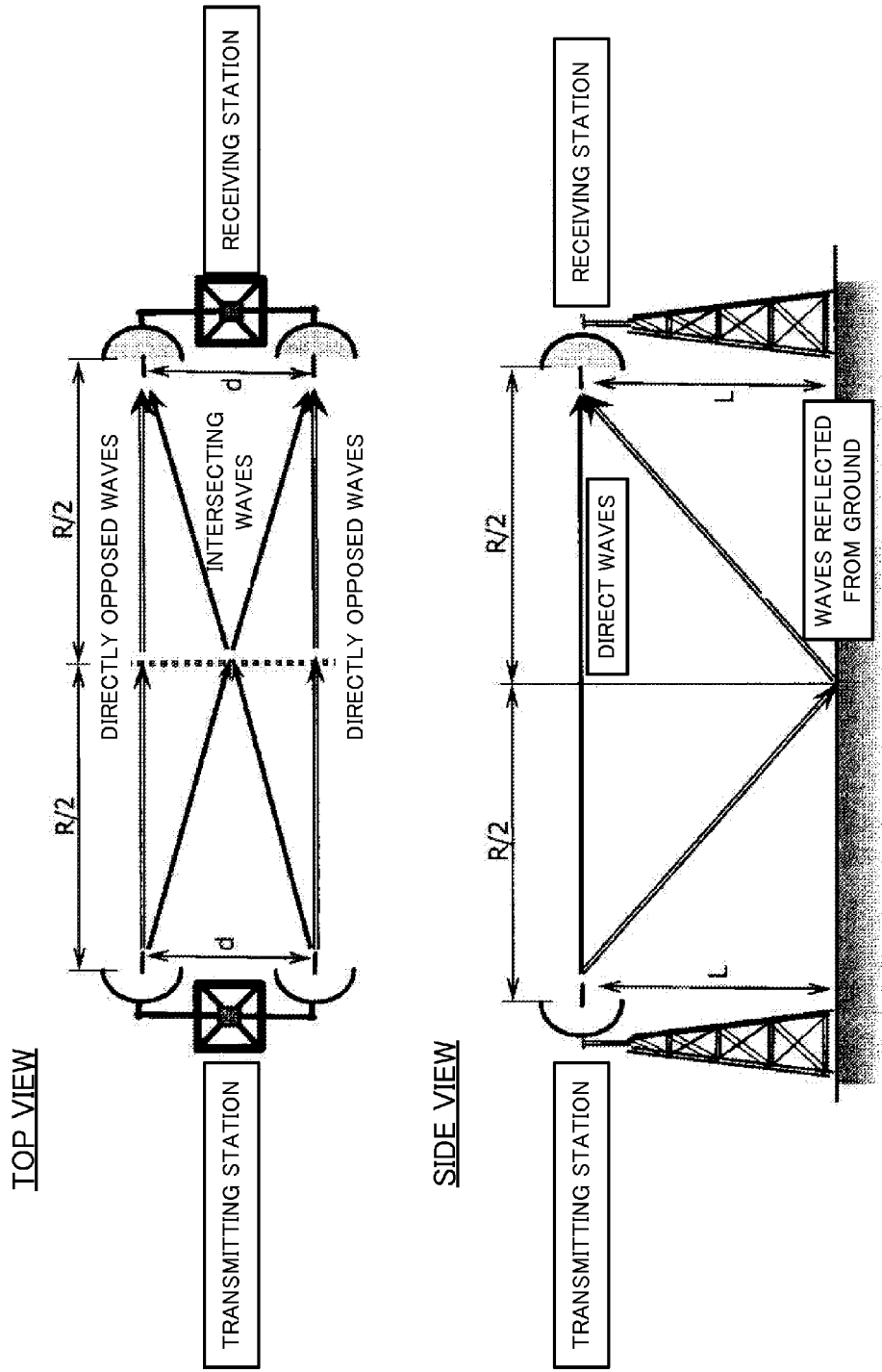
FIG. 18 shows the arrangement of the transmitting antenna and the receiving antenna of the LOS-MIMO communication system.

Mounting metamaterial in the form of radome in front of the transmitting and receiving antennas as shown in FIG. 18 is considered. With generally known metamaterial, it is often arranged such that the electromagnetic characteristics thereof isotropically act, but it is daringly arranged herein with anisotropic nature. This anisotropic nature helps the antennas of LOS-MIMO to be streamlined in size. The anisotropic metamaterial in use herein is a metamaterial dielectric and the structure in which polarizations P are periodically arrayed. Through the dipole moment of the polarizations P, the permittivity of the equivalent dielectric changes according to the incident angle of the microwaves.

As for the dispositional method of the constituents of metamaterial dielectric, it is preferred that such method as not requiring the precision of an angle indicative of anisotropic nature and as such be adopted with the facility with which the production proceeds. The higher the permittivity by the polarizations P according to the incident angle of the microwaves is, the more the wavelength of the microwaves is shortened, which acts to make the antenna-to-antenna spacing of LOS-MIMO shorter.

To note, with reference to FIG. 18, the microwave between opposed antennas between the transmitting and receiving antennas of LOS-MIMO is referred to as a directly opposed wave while that between the crossing antennas is referred to as an intersecting wave.

Further, mounting the metamaterial dielectric in the form of radome in front of the aperture-type antenna of LOS-MIMO as shown in FIG. 18 is considered herein, in relation to which the radome is a cover to protect the antenna and mounted in front of the antenna. Further, under such LOS-MIMO environment, the antenna-to-antenna spacing is shortened without the directionality of the antennas being changed.

It is the metamaterial dielectric that is used for downsizing the antennas of LOS-MIMO, which downsizing is carried out with the permittivity by such polarizations P in use, so that the method of measuring the effective permittivity is described before the concrete explanation thereof is given.

(Measuring the Effective Permittivity of Metamaterial Dielectric: The Extracting Method of the Effective Permittivity Under the Conception of Homogenization)

The metamaterial dielectric is constituted with far smaller elements than the wavelength of the electromagnetic waves periodically combined and disposed. Regarding how the resulting effective permittivity ∈ turns out to be, the extracting method thereof along with the conception of homogenization is important.

Figure 19:
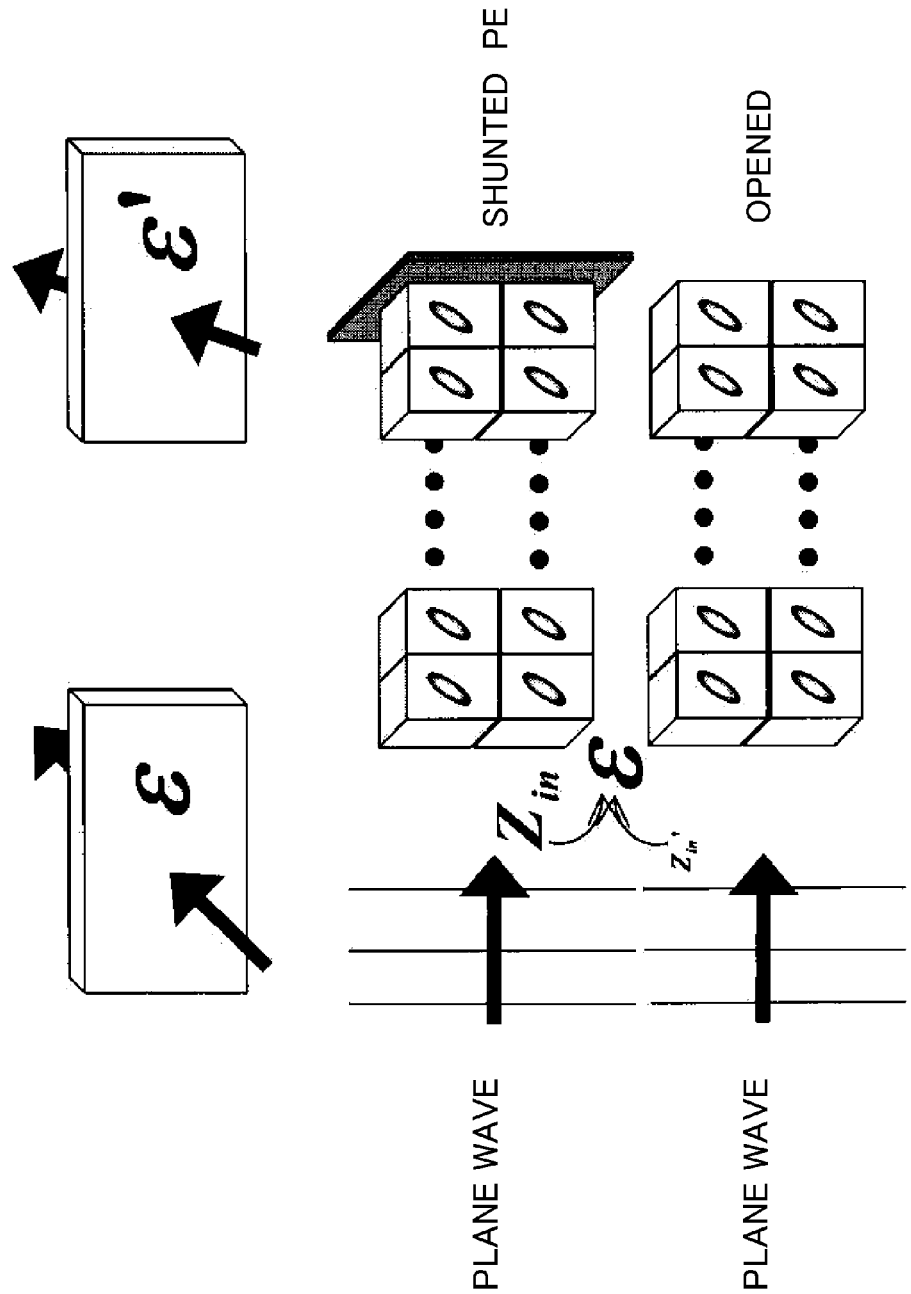
FIG. 19 is an explanatory view showing the measurement of permittivity of the metamaterial dielectric.

When it is desired that the effective permittivity be designed with facility, it requires the electromagnetic analysis on the arbitrary unitary elements and their dispositions, but it is of great significance just if there is any facilitated method. Thus, the method illustrated in FIG. 19 is considered.

It is assumed that the unitary elements are aligned infinitely with the intervention of the periodical boundary surface on both sides. The value at the time of excitation with a plane wave incident from the left end surface is determined such that the impedance viewed from the left end surface when the right end of the medium is opened or shunted becomes equal to the homogenous medium.

Now, the input impedance viewed from the left end surface to the right side is defined as $Z_M$ in the case of the metamaterial dielectric and is defined as $Z_T$ in the case of a continuous medium and a homogenous medium. The case where the right end of the respective media is shunted is defined as $Z_{MS}$ and $Z_{TS}$ while the case where the same is opened is defined as $Z_{MO}$ and $Z_{TO}$.

In order that the input impedance of the metamaterial dielectric is equivalent to that of the continuous medium, the relational expression of the following formula 183 is required. Based on the fundamental theory of microwave technologies, the relational expression of the following formula 184 is established.

$$\begin{cases} Z_{MS} = Z_{TS} \\ Z_{MO} = Z_{TO} \end{cases} \quad \{\text{Formula 183}\}$$

$$\begin{cases} Z_{TS} = jZ_c \tan(\beta \cdot s) \\ Z_{TO} = -jZ_c \cot(\beta \cdot s) \end{cases} \quad \{\text{Formula 184}\}$$

Both of the expressions of the formula 184 being divided by the relational expressions of the formula 183, the following formula 185 is established.

$$\frac{Z_{MS}}{Z_{MO}} = -\tan^2(\beta \cdot s) = -\tan^2(\omega\sqrt{\varepsilon\mu} \cdot s) \quad \{\text{Formula 185}\}$$

Both of the expressions of the formula 184 being multiplied by the relational expressions of the formula 183, the following formula 186 is established. Therefore, the following formula 187 is established.

$$Z_{MS} \cdot Z_{MO} = Z_c^2 = \frac{\mu}{\varepsilon} \quad \{\text{Formula 186}\}$$

$$\therefore \varepsilon = \frac{\sqrt{\varepsilon}}{\omega\sqrt{\mu} \cdot s} \tan^{-1}\sqrt{-\frac{Z_{MS}}{Z_{MO}}} \quad \{\text{Formula 187}\}$$

$$= \frac{1}{\omega\sqrt{\frac{\mu}{\varepsilon}} \cdot s} \tan^{-1}\sqrt{-\frac{Z_{MS}}{Z_{MO}}}$$

$$= \frac{1}{\omega \cdot s \cdot \sqrt{Z_{MS} \cdot Z_{MO}}} \tan^{-1}\sqrt{-\frac{Z_{MS}}{Z_{MO}}}$$

Accordingly, based on the obtained input impedances $Z_{MS}$ and $Z_{TS}$, the effective permittivity ∈ can be determined.

Then, on behalf of determining the effective permittivity of the metamaterial dielectric by measurement, it is analytically determined.

(Metamaterial Dielectrics (Artificial Dielectrics)

The regular dielectrics are composed of molecular particles of a microscopic size. On the other hand, the artificially prepared metamaterial dielectrics are composed of separate metallic particles of a macroscopic size. The size of such metallic particles is smaller than the frequency in use.

For instance, their size parallel to the electric field is smaller than quarter wavelength. The shape of such metallic particles includes a ball, a plate, a piece and a rod, by way of some examples.

(Preliminary Discussion)

To begin with, the shape of such metallic particles is considered as a ball. A non-charged conductive ball is placed within the electric field E. Positive and negative charges are induced by the electric field. They are represented as shown in FIG. 19 with the point charges of +Q and −Q which are distant away from each other by the distance δ1. The vector distance δ1 is directed from −Q to +Q. Such disposition is known as the electric dipole of the dipole moment Qδ1.

Figure 20:
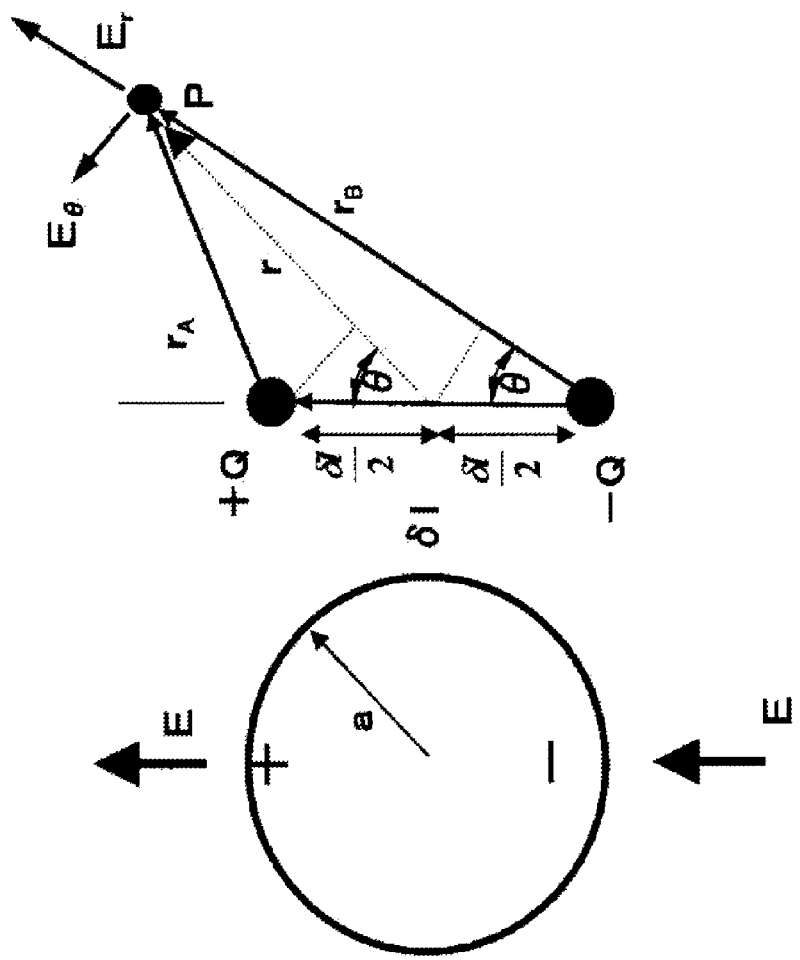
FIG. 20 is an explanatory view showing the metamaterial dielectric element.

The dipole moment M is the vector defined with the following formula 188. The direction of the vector is directed from −Q to +Q. The electric field by dint of this dipole is discussed. The potential $V_p$ at the point P distant away from the charge +Q by the vector $r_A$ and distant away from the charge −Q by the vector $r_B$ as shown in FIG. 20 is defined as the following formula 189. Here, in the case where the vector r from the center portion of the dipole to the point P is larger than the vector distance δ1, the following formula 190 is established. Accordingly, the following formula 191 is established.

$$M = Q \cdot \delta l \quad \text{\{Formula 188\}}$$

$$V_P = \frac{Q}{4\pi\varepsilon_0}\left(\frac{1}{|r_A|} - \frac{1}{|r_B|}\right) \quad \text{\{Formula 189\}}$$

$$\left(\frac{1}{|r_A|} - \frac{1}{|r_B|}\right) = \left(\frac{1}{|r| - \frac{|\delta l|}{2}\cos\theta} - \frac{1}{|r| + \frac{|\delta l|}{2}\cos\theta}\right) \quad \text{\{Formula 190\}}$$

$$= \left(\frac{1}{|r|}\left(1 + \frac{|\delta l|}{2|r|}\cos\theta\right) - \frac{1}{|r|}\left(1 - \frac{|\delta l|}{2|r|}\cos\theta\right)\right)$$

$$= \frac{|\delta l|}{|r|^2}\cos\theta$$

$$V_P = \frac{Q}{4\pi\varepsilon_0}\left(\frac{1}{|r_A|} - \frac{1}{|r_B|}\right) = \frac{Q \cdot |\delta l| \cdot \cos\theta}{4\pi\varepsilon_0 |r|^2} \quad \text{\{Formula 191\}}$$

$$= \frac{|M| \cdot \cos\theta}{4\pi\varepsilon_0 |r|^2} = \frac{M \cdot r}{4\pi\varepsilon_0 |r|^3} \Rightarrow \frac{P\delta v \cdot r}{4\pi\varepsilon_0 |r|^3}$$

The polarizations (polarizations) P of the metamaterial dielectrics are defined as the sum within the microvolume δV of the dipole moment M.

Both of the $\varepsilon_0$-E and the polarizations P are such quantity as becoming an electric charge when being subjected to surface integral. This is known from the following analysis.

Figure 21:
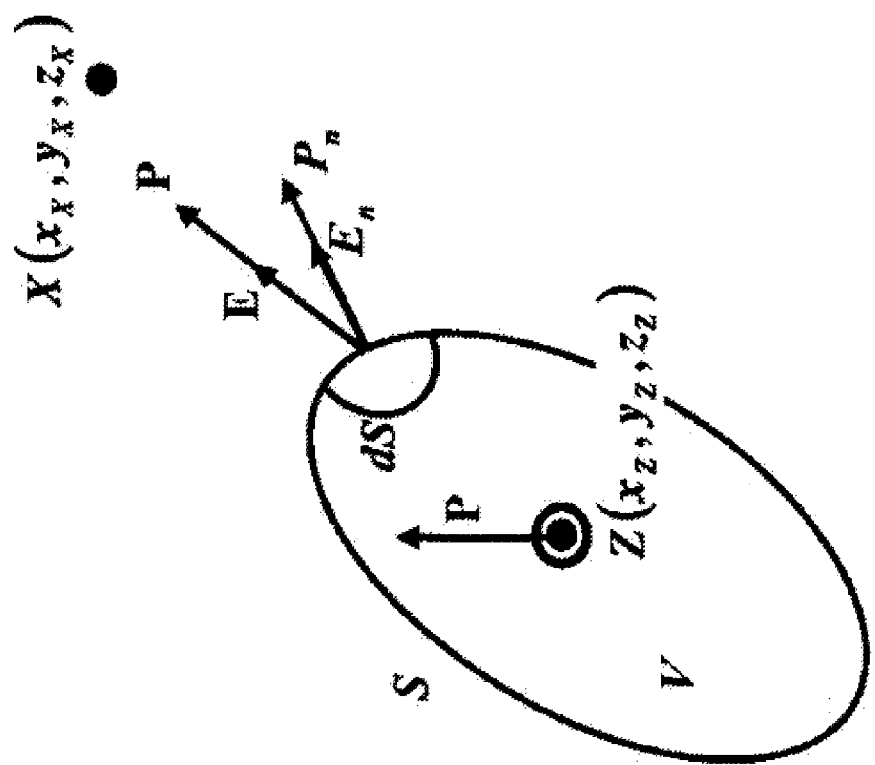
FIG. 21 shows an analytical model (Model 1).

Now, in order to determine an electric charge coming to the surface by the metamaterial dielectric having an arbitrary shape being polarized, it is assumed that the dipoles are three-dimensionally distributed in the volume. Considering the microvolume δv surrounding an arbitrary point Z ($x_Z$, $y_Z$, $z_Z$) as dipoles, based on the ground that the moment of such dipoles are expressed with P·δv, the potential at the point X is established with the following formula 192 based on the analytical model as shown in FIG. 21 and with reference to the above formulae.

$$V_X = \frac{1}{4\pi\varepsilon_0}\int_v \frac{P \cdot r}{|r|^3}dv = \frac{-1}{4\pi\varepsilon_0}\int_v P \cdot grad_X\left(\frac{1}{|r|}\right)dv \quad \text{\{Formula 192\}}$$

This is supported by the following formulae 193 and 194.

$$grad_X\left(\frac{1}{|r|}\right) = \nabla\left(\frac{1}{|r|}\right) = \frac{-1 \cdot e_r}{|r|^2} = \frac{-r}{|r|^3} \quad \text{\{Formula 193\}}$$

$$E = -grad_X\left(\frac{1}{|r|}\right) = -\nabla\left(\frac{1}{|r|}\right) = \frac{r}{|r|^3} \quad \text{\{Formula 194\}}$$

However, upon performing the volume integral, it requires that the integrand be the function of the point Z. At present, the integrand is the function of the point X with the point Z fixed. Thus, the direction of the vector r is inversed (see FIG. 21). In other words, the following formula 195 is substituted with the following formula 196. The gradient of the potential according to the left-hand coordinate axis as shown in FIG. 20 is defined as $grad_x$ while that according to the right-hand coordinate axis shown therein is defined as $grad_z$. Here, $grad_x$ and $grad_z$ are expressed with the following formulae 197 and 198.

$$|r| = \sqrt{(x_Z - x_X)^2 + (y_Z - y_X)^2 + (z_Z - z_X)^2} \quad \text{\{Formula 195\}}$$

$$|r| = \sqrt{(x_X - x_Z)^2 + (y_X - y_Z)^2 + (z_X - z_Z)^2} \quad \text{\{Formula 196\}}$$

$$grad_X = \left(\frac{\partial}{\partial x_X}, \frac{\partial}{\partial y_X}, \frac{\partial}{\partial z_X},\right) \quad \text{\{Formula 197\}}$$

$$grad_Z = \left(\frac{\partial}{\partial x_Z}, \frac{\partial}{\partial y_Z}, \frac{\partial}{\partial z_Z},\right) \quad \text{\{Formula 198\}}$$

Figure 22:
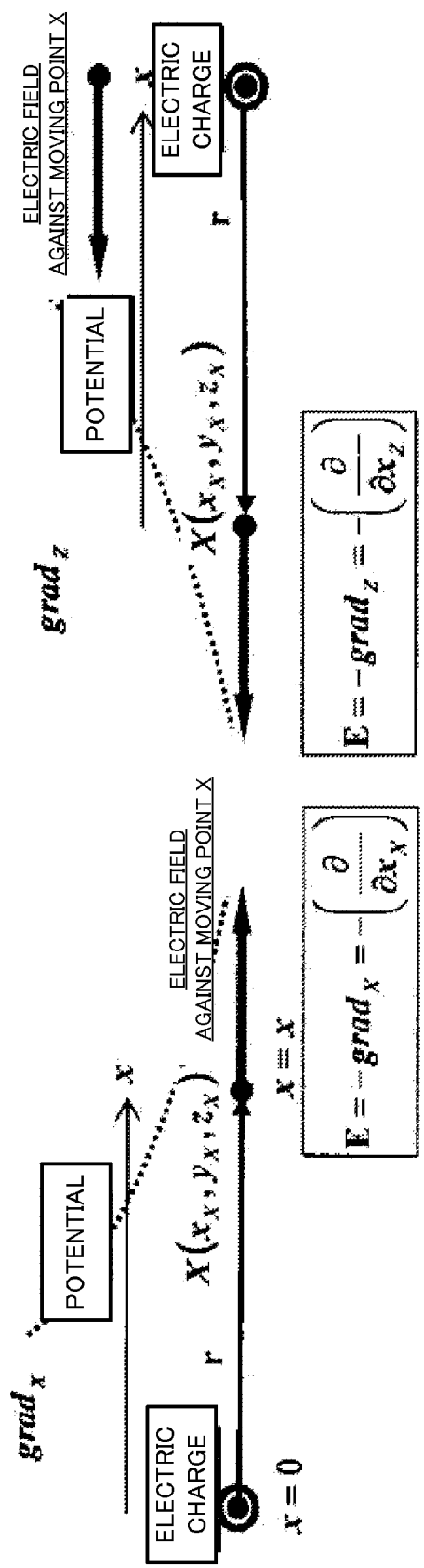
FIG. 22 shows an analytical model (Model 2).

With reference to FIG. 21, the direction of the vector r is inversed, so that when the vector r is viewed through the one dimension of the x axis as an intuitional example, it becomes like shown in FIG. 22, with the result that the electric field E is defined as the following formula 199 against the moving point x illustrated in the right-hand side thereof.

$$E = -grad_Z = grad_X = \left(i_x \frac{\partial}{\partial x_X}\right) \quad \text{\{Formula 199\}}$$

Accordingly, the Formula 192 results in the following formula 200 with the point Z of the integrand defined as the moving point. Here, the following Formula 201 is established, so that the above formula is expressed with the following formula 202.

$$V_X = \frac{1}{4\pi\varepsilon_0}\int_v \frac{P \cdot r}{|r|^3}dv = \frac{1}{4\pi\varepsilon_0}\int_v P \cdot grad_Z\left(\frac{1}{|r|}\right)dv \quad \text{\{Formula 200\}}$$

$$\nabla \cdot \left(\frac{P}{|r|}\right) = \frac{\partial(P_x/|r|)}{\partial x} + \frac{\partial(P_y/|r|)}{\partial y} + \frac{\partial(P_z/|r|)}{\partial z} \quad \text{\{Formula 201\}}$$

$$= \frac{1}{|r|}\frac{\partial(P_x)}{\partial x} + P_x\frac{\partial(1/|r|)}{\partial x} + \frac{1}{|r|}\frac{\partial(P_y)}{\partial y} + $$

$$P_y\frac{\partial(1/|r|)}{\partial y} + \frac{1}{|r|}\frac{\partial(P_z)}{\partial z} + P_z\frac{\partial(1/|r|)}{\partial z}$$

$$= \frac{1}{|r|} \cdot (\nabla \cdot P) + P \cdot \nabla(1/|r|)$$

$$= \frac{1}{|r|} \cdot (\nabla \cdot P) + P \cdot grad\left(\frac{1}{|r|}\right)$$

-continued $$V_X = \frac{1}{4\pi\varepsilon_0} \int_V P \cdot \text{grad}_Z\left(\frac{1}{|r|}\right) dv \quad \{\text{Formula 202}\}$$

$$= \frac{1}{4\pi\varepsilon_0} \int_V \left(\nabla \cdot \left(\frac{P}{|r|}\right) - \frac{1}{|r|}(\nabla \cdot P)\right) dv$$

$$= \frac{1}{4\pi\varepsilon_0} \int_V \nabla \cdot \left(\frac{P}{|r|}\right) dv - \frac{1}{4\pi\varepsilon_0} \int_V \frac{1}{|r|}(\nabla \cdot P) dv$$

Here, the direction of the surface dS against the vector J on the closed surface S is expressed with the following formula 203 with the external direction of the area V surrounded by the closed surface S defined as being positive, so that the first member of the formula 202 is expressed with the following formula 204. S denotes the closed surface surrounding the area V. Pn denotes what turns out to be a surface electric charge density and a component of the polarizations (polarizations) perpendicular to the surface dS. In other words, it means that an electric charge of the electric charge density Pn occurs on the boundary surface S of the volume V.

$$\int_S J \cdot dS = \int_V \left(\frac{\partial J_x}{\partial x} + \frac{\partial J_y}{\partial y} + \frac{\partial J_z}{\partial z}\right) \Delta x \Delta y \Delta z = \int_V \nabla \cdot J dV \quad \{\text{Formula 203}\}$$

$$\frac{1}{4\pi\varepsilon_0} \int_V \nabla \cdot \left(\frac{P}{|r|}\right) dv = \frac{1}{4\pi\varepsilon_0} \int_S \frac{P \cdot dS}{|r|} = \frac{1}{4\pi\varepsilon_0} \int \frac{P_n}{|r|} dS \quad \{\text{Formula 204}\}$$

Figure 23:
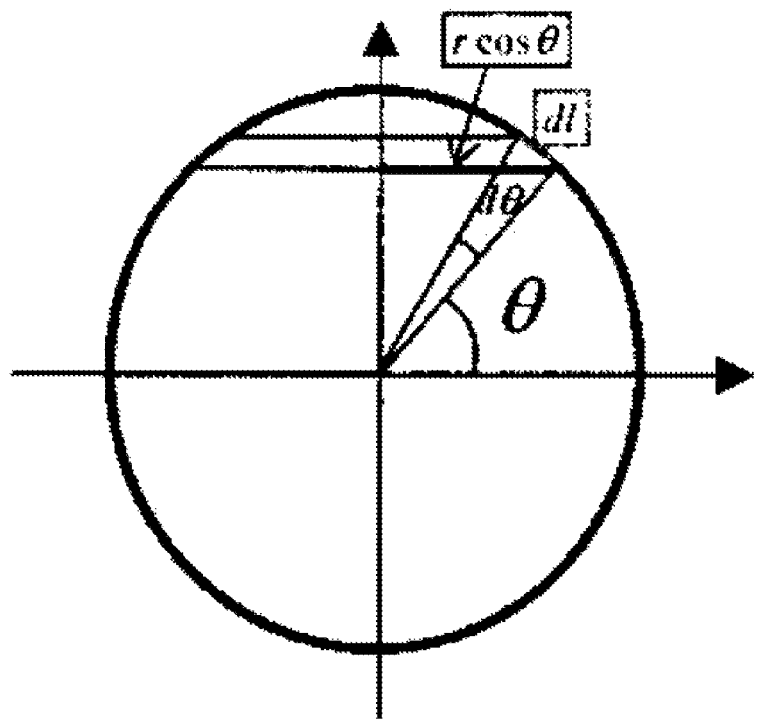
FIG. 23 shows an analytical model (Model 3).

Here, the electric field is expressed with the following formula 205 with reference to FIG. 23, and its surface integral is expressed with the following formula 206, so that the following formula 207 is established.

$$E = \frac{q}{4\pi\varepsilon \cdot r^2} \quad \{\text{Formula 205}\}$$

$$\begin{cases} ds = 2\pi \cdot r \cdot \cos\theta \cdot dl \\ dl = r \cdot d\theta \end{cases} \quad \{\text{Formula 206}\}$$

$$\int_S E \cdot dS = 2 \cdot \int_0^{\frac{\pi}{2}} \frac{q}{4\pi\varepsilon \cdot r^2} 2\pi \cdot r \cdot \cos\theta \cdot r \cdot d\theta \quad \{\text{Formula 207}\}$$

$$= \int_0^{\frac{\pi}{2}} \frac{q}{\varepsilon} \cdot \cos\theta \cdot d\theta = \frac{q}{\varepsilon} \cdot [\sin\theta]_0^{\frac{\pi}{2}} = \frac{q}{\varepsilon}$$

Applying the above formula to the microscopic surface integral and volume integral of the above formula 203, the following formula 208 is established. Further, the potential is expressed with the following formula 209.

$$E \cdot dS = \left(\frac{\partial E_x}{\partial x} + \frac{\partial E_y}{\partial y} + \frac{\partial E_z}{\partial z}\right) \cdot \Delta x \Delta y \Delta z \quad \{\text{Formula 208}\}$$

$$= \nabla \cdot E dV = \frac{q(\text{electric charge in } dV)}{\varepsilon}$$

$$-\int_\infty^r E \cdot dr = -\int_\infty^r \frac{q}{4\pi\varepsilon \cdot r^2} dr = -\frac{q}{4\pi\varepsilon}\left[\frac{-1}{r}\right]_\infty^r = \frac{q}{4\pi\varepsilon \cdot r} \quad \{\text{Formula 209}\}$$

Accordingly, the second member of the formula 202 expressed with the following formula 210 means that an electric charge of the volume density $-\nabla \cdot P$ arises within the volume V.

$$-\frac{1}{4\pi\varepsilon_0} \int_V \frac{1}{|r|}(\nabla \cdot P) dv \quad \{\text{Formula 210}\}$$

Expressing the potential $V_x$ at the point X as the electric charge of the electric charge density Pn on the boundary surface S and that of the volume density $-\nabla \cdot P$ within the volume V, the following formula 211 is established. Then, the radio waves entered into the volume V are discussed. Equivalently speaking, the electric field of the volume density $-\nabla \cdot P$ being equal to $-\text{div}(P)$ drifts within the volume V. Further, assuming that the real electric field p exists, equivalently speaking, the electric field E within the volume V should satisfy the relational expression of the following formula 212. In order to discuss such equivalent electric field inclusive, an electric flux density D corresponding to the electric field is considered. It is appropriate in this case that the spatial action of the electric flux density D is intuitionally viewed as a displacement current.

$$V_X = \frac{1}{4\pi\varepsilon_0} \int_V P \cdot \text{grad}_Z\left(\frac{1}{|r|}\right) dv \quad \{\text{Formula 211}\}$$

$$= \frac{1}{4\pi\varepsilon_0} \int_S \frac{P_n}{|r|} dS + \frac{1}{4\pi\varepsilon_0} \int_V \frac{1}{|r|}(-\nabla \cdot P) dv$$

$$\text{div}(E) = \frac{\rho - \text{div}(P)}{\varepsilon_0} \quad \{\text{Formula 212}\}$$

The displacement current is expressed with the following formula 213.

$$\frac{\partial D}{\partial t} = \varepsilon \frac{\partial E}{\partial t} \quad \{\text{Formula 213}\}$$

Figure 24:
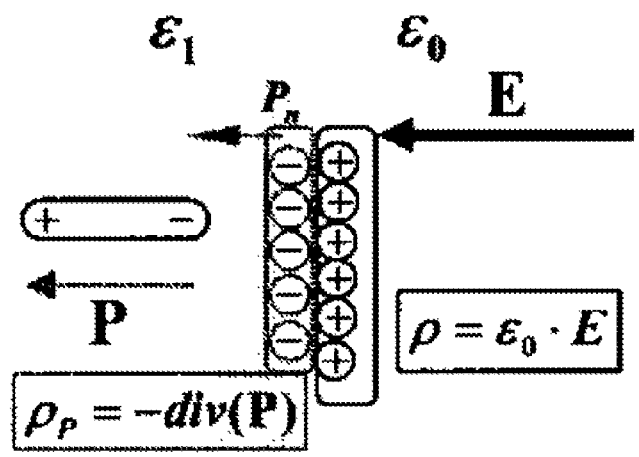
FIG. 24 shows an analytical model (Model 4).

What is signified by the formulae 212 and 213 is, as shown in FIG. 24, lies in the fact that the divP has a value at places where the polarizations P change. At such places, the electric field E is balanced out by the electric field $\rho = \varepsilon_0 \cdot E = \varepsilon_0 \cdot \text{div}(E)$ induced by the electric field E, but because there is a polarization electric field $\rho_p = -\text{div}(P)$, it results in there being the electric field of $\varepsilon_0 \cdot \text{div}(E) - \text{div}(P)$ in total, so that the quantity of the electric charge reduces so as to make the balance with the electric filed E ruined. Thus, the additional electric field to be set off with $\rho_p = -\text{div}(P)$ flows in the form of the increment of the displacement current. This means no more than that z of the following formula 214 increases, and the value of such z is set off with the $\rho_p = -\text{div}(P)$, so that the following formula 215 is established. Then, the value $\in$ is expressed with the following formula 216, in which the directions of the vectors P and E are the same and have the sole difference in constant multiplication, so that the second member is subjected to such constant multiplication, with the result that the formula 216 is substituted with the following formula 217. Based on the foregoing, M is equal to P$\delta v$ on the premise that M is equal to Q·$\delta 1$, so that the polarizations P are expressed with the following formula 218 assuming that the number of electric dipoles per m$^3$ is defined as N.

$$\frac{\partial D}{\partial t} = \varepsilon \frac{\partial E}{\partial t} \quad \{\text{Formula 214}\}$$

-continued $$\varepsilon \cdot div(E) = \varepsilon_0 \cdot div(E) + div(P) \quad \{\text{Formula 215}\}$$

$$\varepsilon = \varepsilon_0 + \frac{div(P)}{div(E)} \quad \{\text{Formula 216}\}$$

$$\varepsilon = \varepsilon_0 + \frac{P}{E} \quad \{\text{Formula 217}\}$$

$$P = N \cdot Q \cdot \delta l \quad \{\text{Formula 218}\}$$

Accordingly, the effective permittivity is definitively established with the following formula 219.

$$\varepsilon = \varepsilon_0 + N \cdot \frac{Q \cdot \delta l}{N} \quad \{\text{Formula 219}\}$$

Figure 25:
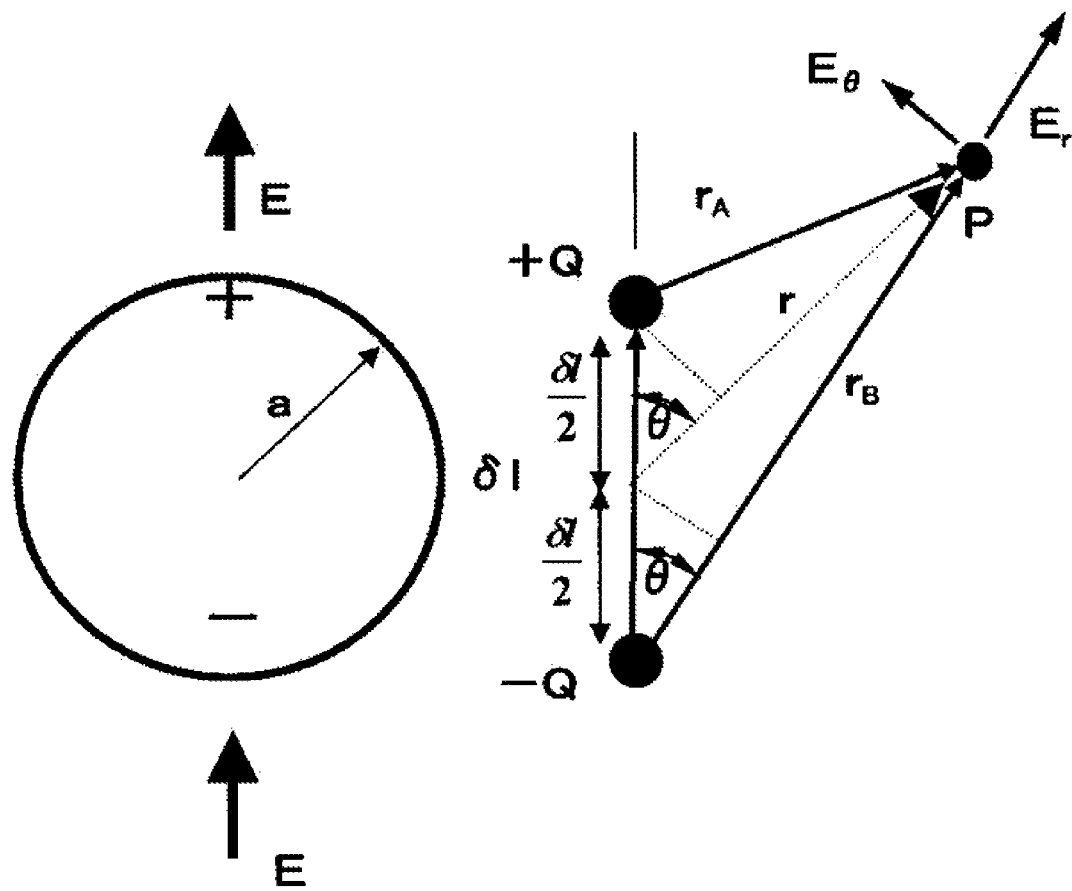
FIG. 25 shows an analytical model (Model 5).

The potential at the exterior of the ball placed in the uniform electric field E as described above and shown in FIG. 25 is expressed with the sum of the potential by the originally existing electric field E and the potential by the electric dipole P. Now, observing the potential of the point P illustrated in FIG. 25, the potential by the originally existing electric field E is defined as the potential difference from the origin r=0 with the vector r regarded as the axis, so that the following formula 220 is established.

$$V = \int_0^r E \cdot \cos\theta\, dr = -E \cdot r \cdot \cos\theta \quad \{\text{Formula 220}\}$$

The potential $V_0$ at the exterior of the ball placed in the uniform electric field is the sum of the potential by the electric dipole P and the potential of such originally existing electric field E. The potential by the electric dipole P is expressed with the following formula 221 based on the above formula 191.

$$V_P = \frac{Q}{4\pi\varepsilon_0}\left(\frac{1}{|r_A|} - \frac{1}{|r_B|}\right) = \frac{Q \cdot |\delta l| \cdot \cos\theta}{4\pi\varepsilon_0 |r|^2}$$
$$= \frac{|M| \cdot \cos\theta}{4\pi\varepsilon_0 |r|^2} = \frac{M \cdot r}{4\pi\varepsilon_0 |r|^3} \Rightarrow \frac{P\delta v \cdot r}{4\pi\varepsilon_0 |r|^3} = \frac{Q \cdot \delta l \cdot \cos\theta}{4\pi\varepsilon_0 r^2} \quad \{\text{Formula 221}\}$$

Accordingly, the following formula 222 is established.

$$V_o = -E \cdot r \cdot \cos\theta + \frac{Q \cdot \delta l \cdot \cos\theta}{4\pi\varepsilon_0 r^2} \quad \{\text{Formula 222}\}$$

The potential by the above electric field E starts from the origin r=0 with the vector r regarded as the axis. Further, as for the potential by the electric dipole P, the place of the potential zero appears in the middle of the positive electric charge and the minus electric charge, from which place the path parallel to the electric field being raised, it can be extended up to the infinite position with the potential zero kept intact (the path where the polarization vector P and the vector r intersect perpendicularly with each other also intersects perpendicularly with the electric field E). The ball is a conductive member, so that any point of the ball has an equal potential. The potential at the infinite point extended with the potential kept intact is also equal thereto. Defining the potential at such infinite point as zero, the potential $V_0$ on the surface of the ball becomes equal to 0 [v]. Accordingly, the following formula 223 is established.

$$0 = -E \cdot a \cdot \cos\theta + \frac{Q \cdot \delta l \cdot \cos\theta}{4\pi\varepsilon_0 a^2} \quad \{\text{Formula 223}\}$$

Thus, the following formula 224 is established. Substituting the formula 224 for the formula 219, the following formula 225 is established.

$$\frac{Q \cdot \delta l}{E} = 4\pi\varepsilon_0 a^3 \quad \{\text{Formula 224}\}$$

$$\varepsilon = \varepsilon_0 + N \cdot \frac{Q \cdot \delta l}{E} = \varepsilon_0(1 + 4 \cdot \pi \cdot N \cdot a^3) \quad \{\text{Formula 225}\}$$

Based on the foregoing discussions, an example of shortening the antenna-to-antenna spacing of LOS-MIMO with the anisotropic metamaterial dielectrics is explained in details below.

(Anisotropic Metamaterial Dielectrics (Artificial Dielectrics))

Figure 26:
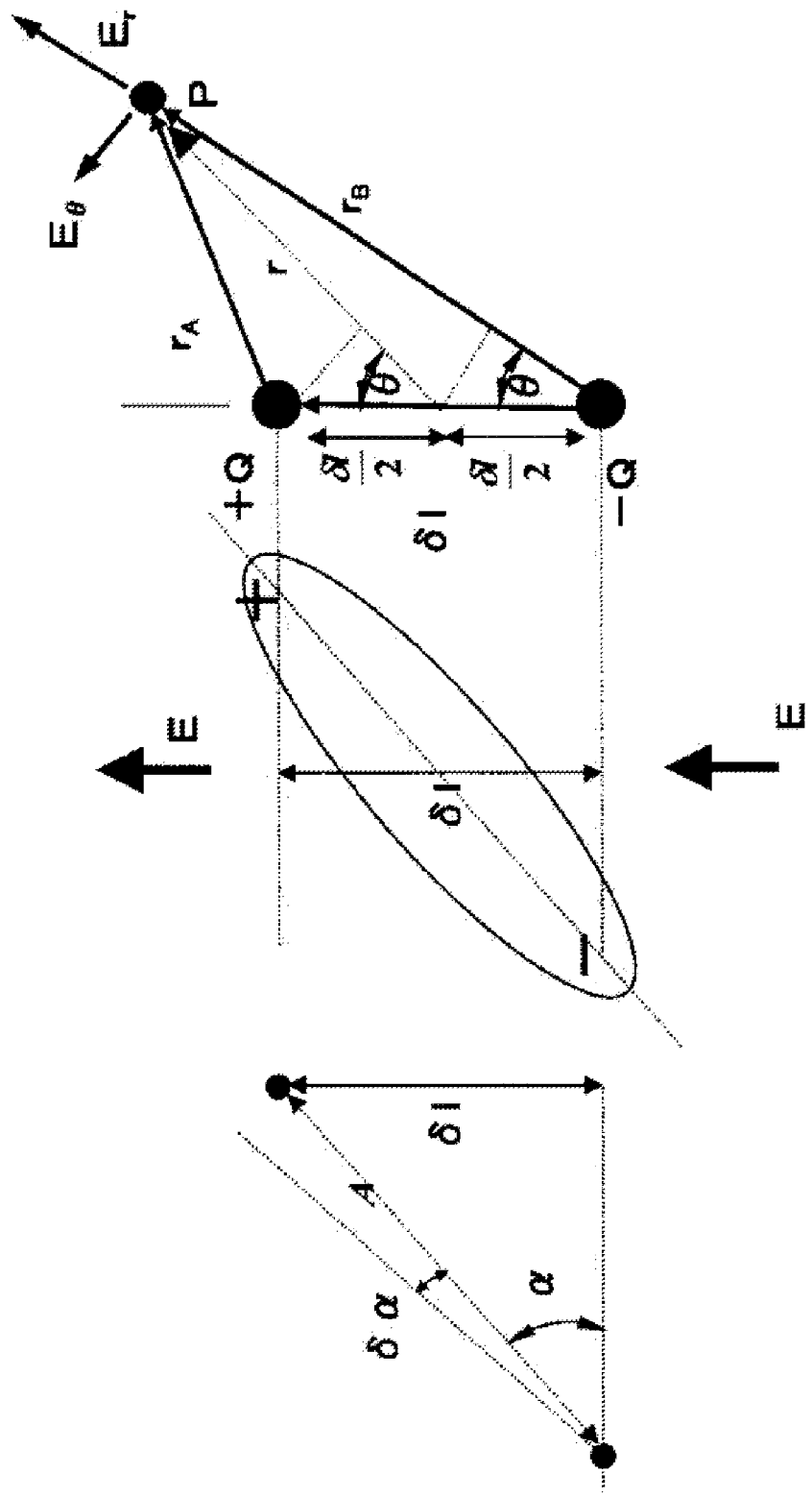
FIG. 26 is an explanatory view showing the anisotropic metamaterial dielectric element.

The change of the value $\in$ of the permittivity of the metamaterial dielectrics according to an inclination α of a rectangular parallelepiped or an oval placed like shown in the right-hand side of FIG. 26 is observed.

When the inclination α changes by δα, δ1 increments as shown in the following formula 226.

$$A \cdot \sin\alpha \Rightarrow \alpha A \cdot \sin(\alpha + \delta\alpha) \quad \{\text{Formula 226}\}$$

Assuming that the permittivity of the metamaterial dielectrics by polarizations is predominant, the proportion of the permittivity δ∈ which changes by δα is expressed with the following formula 227.

$$\frac{\delta\varepsilon}{\varepsilon} = \frac{A \cdot \frac{\partial \sin\alpha}{\partial \alpha} \cdot \delta\alpha}{A \cdot \sin\alpha} = \frac{\cos\alpha}{\sin\alpha} \cdot \delta\alpha = \cot\alpha \cdot \delta\alpha \quad \{\text{Formula 227}\}$$

It is assumed that the thickness of the medium of the metamaterial dielectrics is defined as s. The wavelength λ within the medium is defined as the following formula 228. Accordingly, the higher the permittivity is, the further the wavelength is shortened.

$$\lambda = \frac{2\pi}{k} = \frac{2\pi}{\omega\sqrt{\varepsilon\mu}} \quad \{\text{Formula 228}\}$$

(Example in which the Antenna-to-Antenna Spacing of LOS-MIMO is Shortened with Anisotropic Metamaterial Dielectrics in Use)

Based on the foregoing results, how far the antenna-to-antenna spacing is shortened is shown. In order to facilitate understanding on the part of readers, explanation is given with reference to the antennas disposition illustrated in FIG. 27, but the present invention is not necessarily limited to such antennas disposition.

Figure 27:
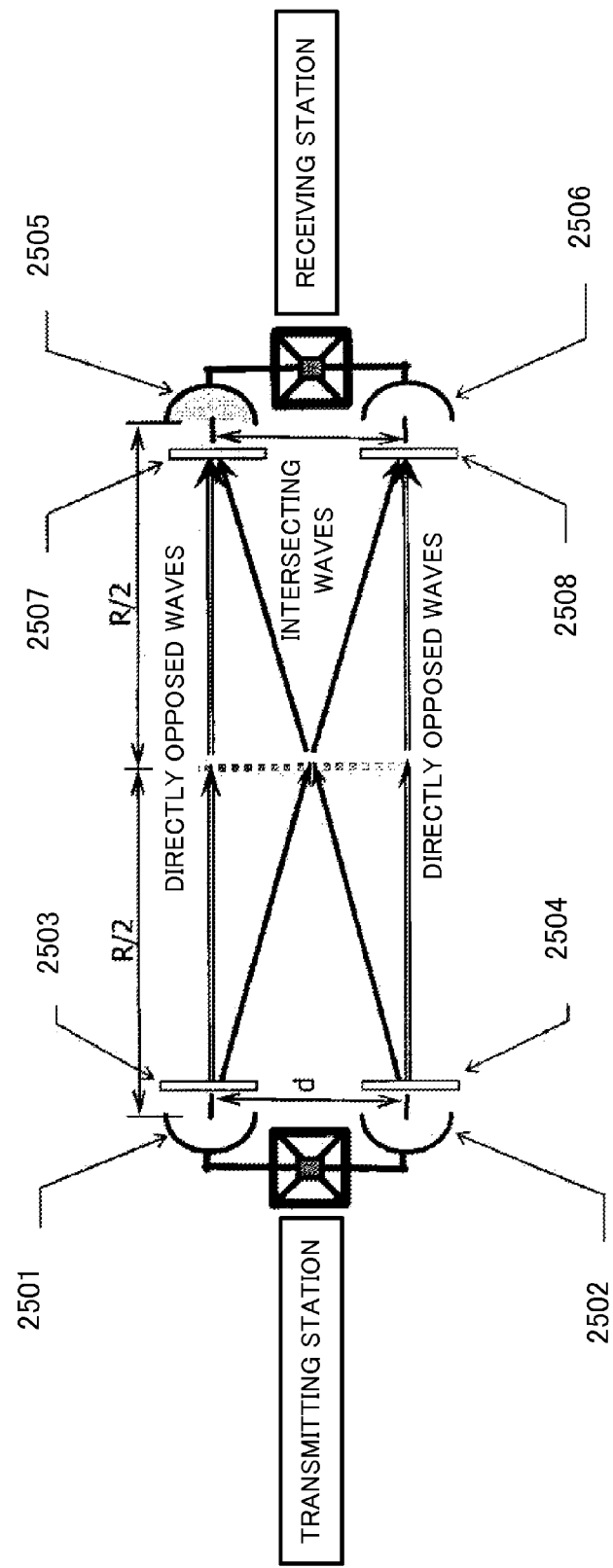
FIG. 27 shows materials attached to the front surfaces of antennas.

Explanation is given with reference to the example of the antennas disposition shown in FIG. 27. In FIG. 27, the materials 2503 and 2504 are mounted in the form of radome in front of the transmitting antennas 2501 and 2502. These materials 2503 and 2504 are anisotropic metamaterial dielectrics, in which the anisotropic metamaterial dielectric elements are diagonally disposed such that the permittivity ∈ of the dielectrics becomes larger in the intersecting waves direction while it becomes smaller in the direct waves direction. The angle α illustrated in FIG. 26 denotes such diagonal disposition of the elements, in which δ∈ differs according to the angular difference δα between the intersecting waves and the direct waves based on the formula 227. Further, according to how to dispose the diagonal angle α causes the permittivity to become larger against the intersecting waves and the same to become smaller against the direct waves, which is easy to understand with reference to the foregoing discussions.

Moreover, the materials 2507 and 2508 are mounted in the form of radome in front of the receiving antennas 2505 and 2506. These materials 2503 and 2504 are anisotropic metamaterial dielectrics, in which the anisotropic metamaterial dielectric elements are diagonally disposed such that the permittivity ∈ of the dielectrics becomes larger in the intersecting waves direction while it becomes smaller in the direct waves direction, which is easy to understand with reference to FIG. 26 in relation with the formula 227 in the same way as above. Here, the higher the permittivity is, the further the wavelength is shortened in relation with the formula 228, so that the phase rotation of the carrier wave for the intersecting waves becomes larger than that for the directly opposed waves even within the same distance of propagation. In other words, with the same phase rotation taken into account, the distance of the intersecting waves turns out to be shorter. As the result of it, as being easy to understand with reference to FIG. 27, the materials 2503 and 2504 or those 2507 and 2508 act to shorten the antenna-to-antenna spacing d.

Further, even when such materials might be mounted on one of the antennas, the phase rotation of the carrier wave for the intersecting waves of such antenna becomes larger, so that some effect is brought in this case as well, though the effect with which the antenna-to-antenna spacing is shortened is diminished. In the present example, for the sake of facilitating the explanation, metamaterials are mounted on both of the transmitting and receiving antennas, but even when they might be mounted only on the transmitting side or the receiving side, the wavelength against the intersecting waves is shortened, so that the effect with which the antenna-to-antenna spacing d is shortened is brought in spite of difference in the extent to which the same is shortened.

The phenomenon in which the above-mentioned anisotropic metamaterial acts to shorten the antenna-to-antenna spacing is concretely and quantitatively explained as follows.

Now, assuming that a propagation constant for the directly opposed waves is defined as β and a propagation constant for the intersecting waves is defined as β', the phase difference between the directly opposed waves and the intersecting waves caused by passing through the anisotropic metamaterial dielectrics having S in thickness is defined based on the formula 227 as the following formula 229. Here, the square root of the ratio of the permittivity ∈' of the intersecting waves to that ∈ of the directly opposed waves is defined as the following formula 230. It should be noted that the following formula 230 is based on the formula 227. Further, ∈' corresponds to the intersecting waves. The spatial propagation constant $\beta_0$ is expressed with the following formula 231.

$$S \cdot (\beta' - \beta) = S\omega\sqrt{\mu_0}\left(\sqrt{\varepsilon'} - \sqrt{\varepsilon}\right) \quad \text{\{Formula 229\}}$$
$$= S \cdot \beta(a - 1) = S \cdot \beta_0 \cdot \sqrt{\varepsilon_s} \cdot (a - 1)[\text{rad}]$$

-continued
$$a = \sqrt{\frac{\varepsilon'}{\varepsilon}} = \sqrt{\frac{\varepsilon + \delta\varepsilon}{\varepsilon}} = \sqrt{1 + \frac{\delta\varepsilon}{\varepsilon}} = \sqrt{1 + \cot\alpha \cdot \delta\alpha} \quad \text{\{Formula 230\}}$$

$$\beta_0 = \omega\sqrt{\varepsilon_0\mu_0} \quad [\text{rad/m}], \varepsilon_s = \frac{\varepsilon}{\varepsilon_0}, \mu = \mu_0 \quad \text{\{Formula 231\}}$$

Thus, with reference to the formula 227, the condition 1 of the following formula 232 is used. This condition facilitates the production without requiring the precision of angles showing anisotropy and as such. Further, such condition itself does not require strictness.
(Condition 1)

$$\alpha = \frac{\pi}{4} \quad \text{\{Formula 232\}}$$

Under the above condition expressed with the formula 232, cot α becomes equal to 1, so that the following formula 233 is established.

$$a = \sqrt{1 + \delta\alpha} \approx 1 + \frac{\delta\alpha}{2} \quad \text{\{Formula 233\}}$$

Accordingly, the phase difference is defined with the following formula 234.

$$S \cdot \beta_0 \cdot \sqrt{\varepsilon_s} \cdot \frac{\delta\alpha}{2} \quad [\text{rad}] \quad \text{\{Formula 234\}}$$

Further, the path difference according to the spacing R between the transmitting and receiving sides and the antenna-to-antenna spacing d is defined with the following formula 235.

$$\sqrt{R^2 + d^2} - R \approx R\left(1 + \frac{d^2}{2R^2}\right) - R = \frac{d^2}{2R} \quad \text{\{Formula 235\}}$$

Accordingly, the relational expression of the antenna-to-antenna spacing d of the MIMO communication system, with the optimum antennas disposition of LOS-MIMO shown in the beginning taken into account, is represented with the following formula 236 through the effect with which such spacing is shortened by the anisotropic metamaterial. Here, the following formula 236 is approximated with the following formula 237. Further, '×2' represented in the formula 236 is due to the fact that both of the transmitting and receiving antennas are taken into account. Then, the following formula 238 represented in the formula 236 is intended for converting rad into a distance. Further, the following formula 239 is used.

$$\frac{d^2}{2R} = \frac{\lambda_0}{4} - S \cdot \beta_0 \cdot \sqrt{\varepsilon_s} \cdot \frac{\delta\alpha}{2} \times 2 \cdot \frac{\lambda_0}{2\pi} = \frac{\lambda_0}{4} - S \cdot \sqrt{\varepsilon_s} \cdot \frac{d}{R} \quad \text{\{Formula 236\}}$$

$$\delta\alpha = \frac{d}{R} \quad [\text{rad}] \quad \text{\{Formula 237\}}$$

$$\frac{\lambda_0}{2\pi} \quad \text{\{Formula 238\}}$$

-continued $$\beta_0 = \omega\sqrt{\varepsilon\mu} = \frac{2\pi f}{c} = \frac{2\pi}{\lambda_0} \quad \{\text{Formula 239}\}$$

With reference to the relational expression of the formula 236, the effect with which the antennas of LOS-MIMO are streamlined in size with the anisotropic metamaterial in use is verified by solving the equation of the following formula 240.

$$d^2 + 2 \cdot S \cdot \sqrt{\varepsilon_s} \cdot d - \frac{R\lambda_0}{2} = 0 \quad \{\text{Formula 240}\}$$

Solving the above equation, the following formula 241 is established. It should be noted that the positive value among the resulting solutions shall be determined.

$$\therefore d = \frac{\sqrt{4 \cdot S^2 \cdot \varepsilon_s + 2 \cdot R \cdot \lambda_0} - 2 \cdot S \cdot \sqrt{\varepsilon_s}}{2} \quad \{\text{Formula 241}\}$$
$$= \sqrt{S^2 \cdot \varepsilon_s + \frac{R \cdot \lambda_0}{2}} - S \cdot \sqrt{\varepsilon_s}$$

Based on the foregoing results, the effect with which the antenna-to-antenna spacing of LOS-MIMO is shortened by the anisotropic metamaterial is shown below with the following two cases (1) and (2) exemplified herein.
(1) 60 GHz, R=100 m (Short-Range)
(2) 80 GHz (E-Band), R=1000 m FIG. 28 shows the case (1), in which it is operated under the carrier wave frequency 60 GHz and which graph shows the effect with which the antenna-to-antenna spacing d of LOS-MIMO placed in the range R=100 m between the transmitting and receiving sides is shortened according to the anisotropic metamaterial dielectrics.

Figure 28:
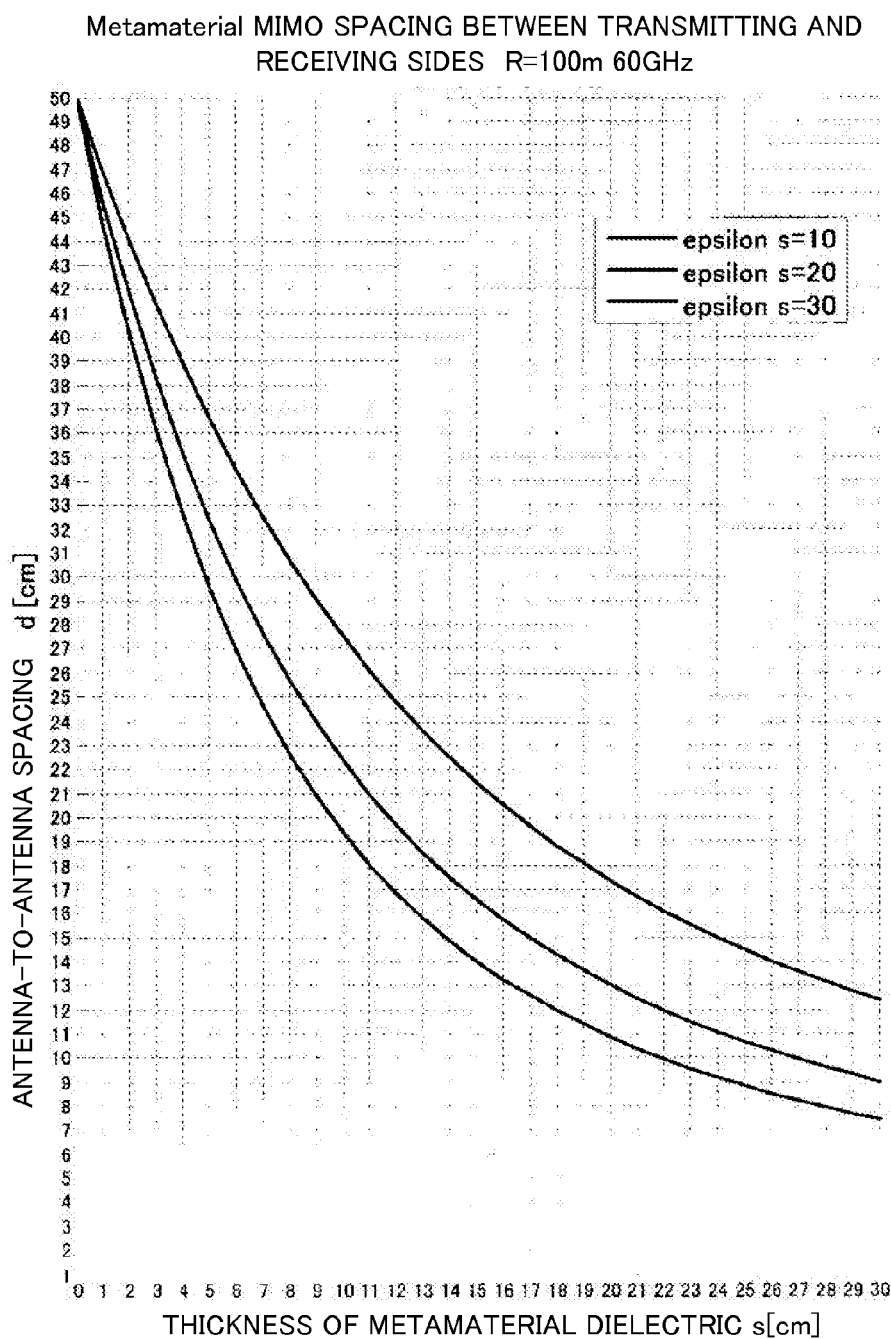
FIG. 28 shows the effect (Effect 1) brought by shortening the antenna-to-antenna spacing of the LOS-MIMO communication system by means of metamaterial.

In FIG. 28, a relative permittivity represented in the formula 231 or expressed with the following formula 242 is used as a parameter. The transverse axis of the graph indicates the thickness S of the anisotropic metamaterial dielectrics while the vertical axis indicates the antenna-to-antenna spacing d. The spacing d corresponding to the optimum spacing between antennas according to the regular LOS-MIMO in which nothing is mounted in front of the antennas corresponds to the case where S is equal to 0. In the present example, such case corresponds to the case where the spacing d is equal to 50 cm. In turn, according as the thickness S increases with the anisotropic metamaterial dielectrics mounted in front of the antennas, it is seen from FIG. 28 that the optimum spacing d between antennas is shortened at a high pace.

$$\varepsilon_s = \frac{\varepsilon}{\varepsilon_0} \quad \{\text{Formula 242}\}$$

In other words, as described above, the anisotropic metamaterial dielectrics mounted in the form of radome in front of the antennas allow the phase rotation of the carrier wave for the intersecting waves and that for the directly opposed waves to change, thereby, the optimum spacing d between the antennas of the MIMO communication system being shortened.

Figure 29:
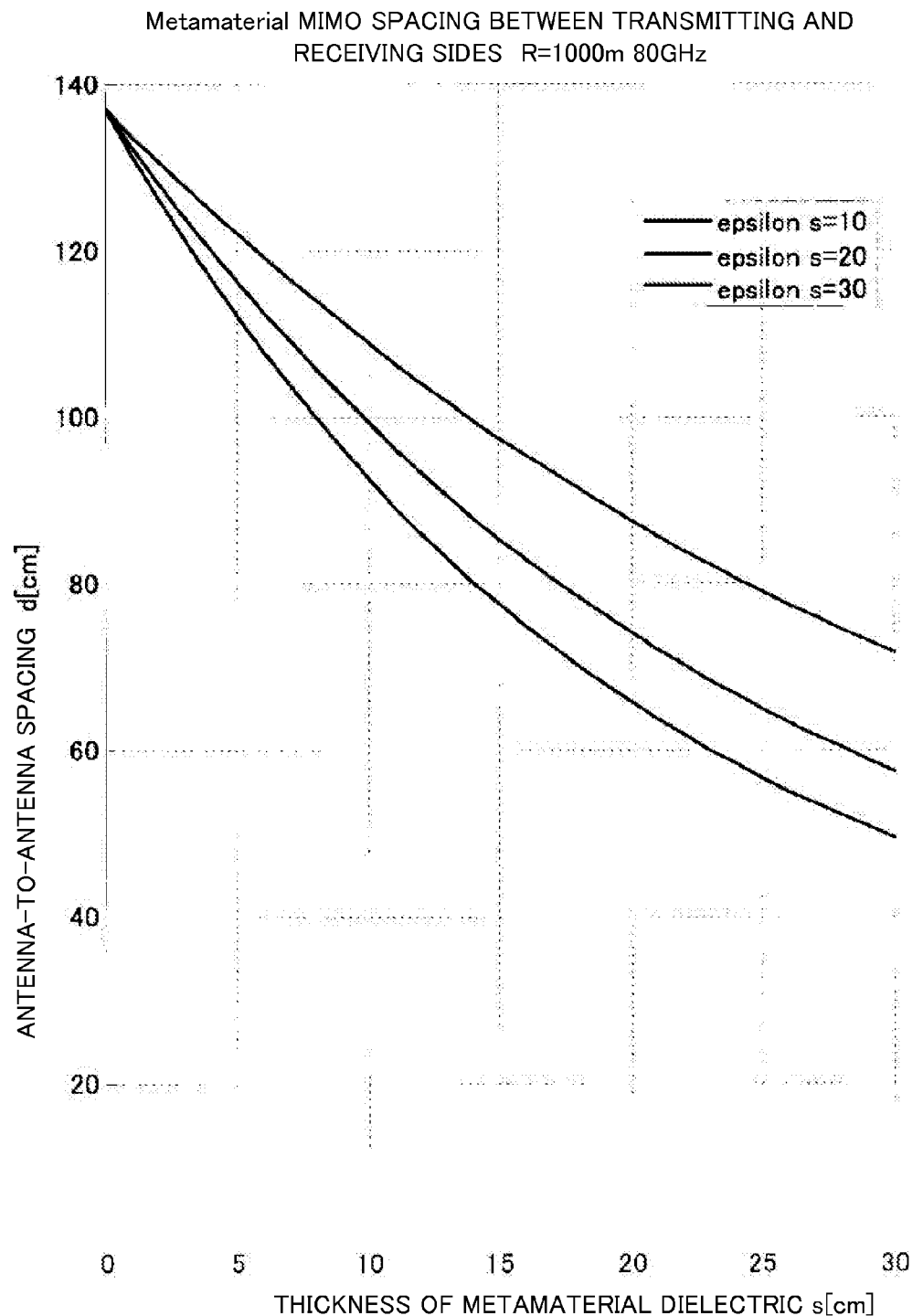
FIG. 29 shows the effect (Effect 2) brought by shortening the antenna-to-antenna spacing of the LOS-MIMO communication system by means of metamaterial.

The following example relates to the above case (2), which is shown in FIG. 29 along with the effect with which the antenna-to-antenna spacing is shortened, in which it is operated under the carrier wave frequency 80 GHz and which graph shows the effect with which the antenna-to-antenna spacing d of LOS-MIMO placed in the range R=1 km between the transmitting and receiving sides is shortened according to the anisotropic metamaterial dielectrics.

In FIG. 29 as well, the relative permittivity represented in the formula 231 and expressed with the following formula 243 is used as a parameter. The transverse axis of the graph indicates the thickness S of the anisotropic metamaterial dielectrics while the vertical axis indicates the spacing d between antennas. The spacing d corresponding to the optimum antenna-to-antenna spacing of the regular LOS-MIMO in which nothing is mounted in front of the antennas corresponds to the case where S is equal to 0. In the present example, such case corresponds to the case where the spacing d is equal to 140 cm. In turn, according as the thickness S increases with the anisotropic metamaterial dielectrics mounted in front of the antennas, it is seen from FIG. 29 that the optimum spacing d between antennas is shortened at a high pace.

$$\varepsilon_s = \frac{\varepsilon}{\varepsilon_0} \quad \{\text{Formula 243}\}$$

In other words, as described above, the anisotropic metamaterial dielectrics mounted in the form of radome in front of the antennas allow the phase rotation of the carrier wave for the intersecting waves and that for the directly opposed waves to change, thereby, the optimum spacing between the antennas of the MIMO communication system being shortened.

To note, it is needless to say that the abovementioned method is also applicable with the same effect to any one of the aforesaid exemplified arrangements or to the exemplified arrangement (1) in which the matrix operation is carried out only on the transmitting side with an eigenvalue rendered into a geometric multiplicity (double eigenvalue or multiple eigenvalue); to the exemplified arrangement (2); the exemplified arrangement (3) in which the matrix operation is carried out only on the receiving side with an eigenvalue rendered into geometric multiplicity (double eigenvalue or multiple eigenvalue) while L.Os. independent arrangement is adopted for the transmitting side; the exemplified arrangement (4) in which L.Os. independent arrangement is adopted for both of the transmitting and receiving sides; and the exemplified arrangement (5).

In other words, changing the phase rotation of the carrier wave for the intersecting waves and that for the directly opposed waves by the anisotropic metamaterial dielectrics mounted in the form of radome in front of the antennas permits the optimum spacing between the antennas of the MIMO communication system shown in the aforesaid exemplified arrangements to be shortened.

(Shortening the Antenna-to-Antenna Spacing of LOS-MIMO (Model 2))

According to the aforesaid methods, such spacing is shortened with metamaterial in use. Herein, such shortened spacing is realized with the materials placed in front of the antennas replaced with other arrangement. The present example is characterized in including a collective body of parallel metallic plates arranged such that they control a path length. Hereafter, the present example is explained in details with reference to the accompanying drawings.

Figure 30:
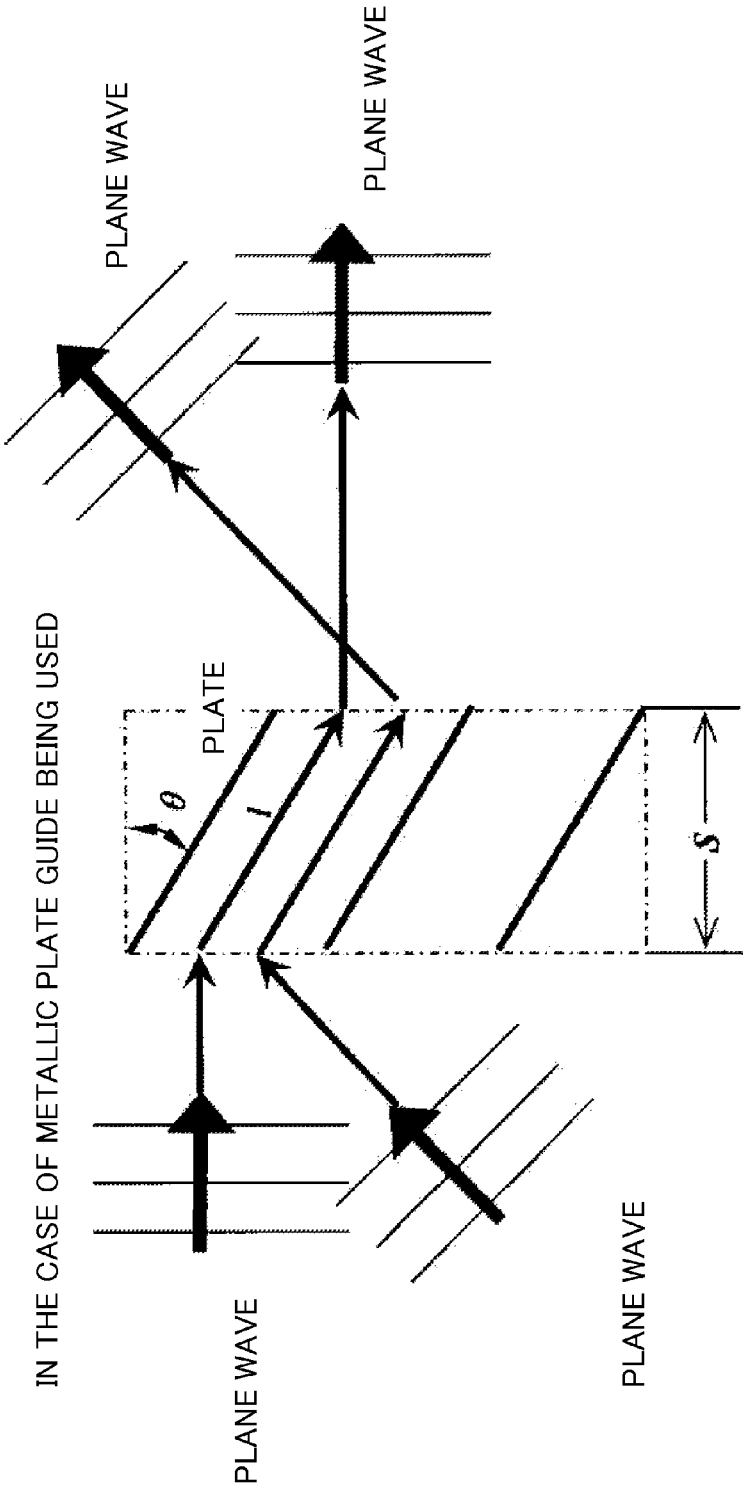
FIG. 30 is an explanatory view showing the shortening of the antenna-to-antenna spacing of the LOS-MIMO communication system by means of a metallic plate guide.

FIG. 30 shows the present example. The portion placed in the middle of the drawing and having s in thickness is a material including a metallic plate guide. The plane waves in the horizontal direction with regard to the drawing sheet correspond to the directly opposed waves while the plane waves from the left-hand lower side to the diagonally upper direction correspond to the intersecting waves.

The mounting of such material onto the antennas is the same as that of the aforesaid metamaterial or is carried out in the same manner as shown in FIG. 27. Accordingly, the direction of the metallic plate guide is arranged such that it is diagonally disposed with respect to the opposed antennas.

With the intervention of such metallic plate guide having an angle θ, the phase rotation arising by the carrier wave passing through the material having S in thickness and under the control of the path length is expressed with the following formula 244.

$$\beta \frac{S}{\cos\theta} \qquad \{\text{Formula 244}\}$$

Accordingly, upon the angle θ changing by 69, the phase change is expressed with the following formula 245. Here, upon the angle θ being defined as π/4 in the same way as the formula (Condition 1) employing the aforesaid anisotropic metamaterial dielectric, the phase difference between the directly opposed waves and the intersecting waves arising by the carrier wave passing through the metallic plate guide is expressed with the following formula 246. This formula 246 just corresponds to the formula 234 expressing the phase difference between the directly opposed waves and the intersecting waves employing the anisotropic metamaterial and expressed with the following formula 247, so that it allows the antenna-to-antenna spacing of LOS-MIMO to be shortened with the same principle as applied to the formula 234.

$$\delta\left(\beta \frac{S}{\cos\theta}\right) = \beta \cdot S \cdot (-\cos^{-2}\theta) \cdot (-\sin\theta) = \frac{\sin\theta}{\cos^2\theta} \cdot \beta \cdot S \cdot \delta\theta \qquad \{\text{Formula 245}\}$$

$$\frac{\sin\theta}{\cos^2\theta} \cdot \beta \cdot S \cdot \delta\theta = S \cdot \beta_0 \cdot \sqrt{\varepsilon_s} \cdot \frac{\frac{1}{\sqrt{2}}}{\left(\frac{1}{\sqrt{2}}\right)^2} \cdot \delta\theta \qquad \{\text{Formula 246}\}$$

$$= S \cdot \beta_0 \cdot \sqrt{\varepsilon_s} \cdot \sqrt{2} \cdot \delta\theta \text{ [rad]}$$

$$S \cdot \beta_0 \cdot \sqrt{\varepsilon_s} \cdot \frac{\delta\alpha}{2} \text{ [rad]} \qquad \{\text{Formula 247}\}$$

In other words, the collective body of parallel metallic plates arranged such that the path length is placed under control as shown in FIG. 30 permits the phase rotation of the carrier wave for the intersecting waves and that for the directly opposed waves to change so as to make it possible to shorten the optimum spacing between antennas of the MIMO communication system shown in the aforesaid exemplified arrangements. To note, the aforesaid anisotoropic metamaterial dielectrics and the material including the metallic plate guide is what make it possible to shorten the optimum spacing between the antennas, so that they are also referred to as the optimum antennas spacing shortening means in this specification.

(Shortening the Antenna-to-Antenna Spacing of MIMO with the Phase Rotation Electrically Controlled)

In recent years, with home electric appliances in which non-compressed transmission of HDTV (High Definition Television) videos is carried out in real time indoor, a short range high speed digital wireless transmission has been in demand, so that a so-called short range MIMO, in which the MIMO communication system is used for such high speed transmission, is being tabled for discussion. However, problematically, it often happens that such short range MIMO forms line-of-sight propagation channels due to the fact that such wireless transmission is carried out indoor, so that the characteristics of such transmission deteriorate to the extreme just with the conventional MIMO communication system. Thus, it results in that the aforesaid MIMO communication system with the propagation environment including a deterministic communication channel is employed, but it is predicted that the antenna-to-antenna spacing occupying a wider space indoor causes another problem.

Further, due to the fact that such wireless transmission is carried out indoor, according as such appliances are transferred to other places, it requires that the geometric positions such as the antenna-to-antenna spacing to construct the line-of-sight MIMO channels be altered. For the users of such appliances who have no expertise knowledge, altering the positions of antennas is bothersome, so that it causes the problem with the convenience to use.

Figure 31:
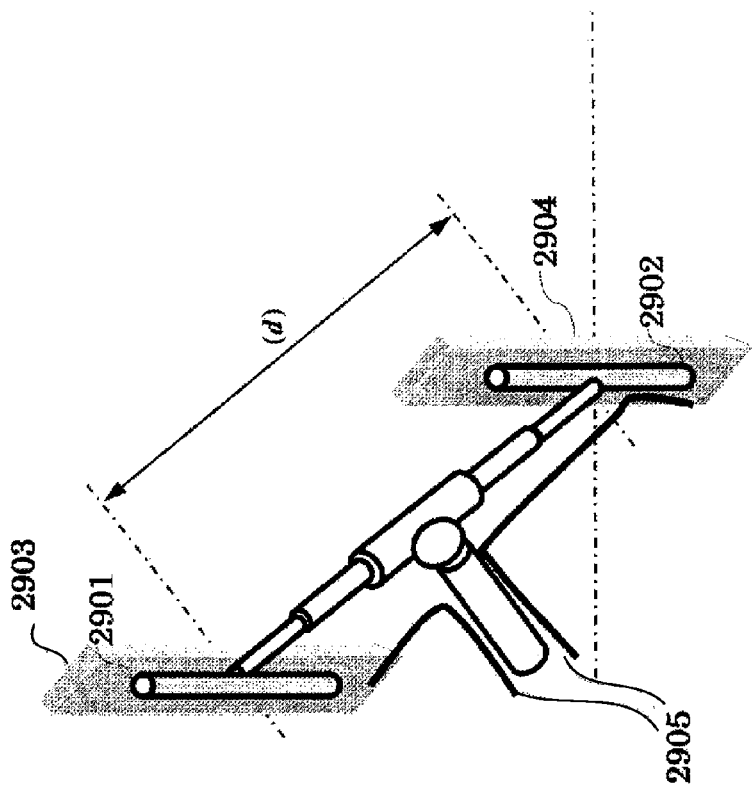
FIG. 31 is an explanatory view showing the Short Range MIMO communication system indoor.

Short range MIMO illustrated in FIG. 31, to cope with such problems, is characterized in operating in a failsafe manner even in the line-of-sight environment indoor. This Short range MIMO can adopt the same matrix operation processing for forming the orthogonal channels in the line-of-sight environment as described in details in the former part of the detailed description of the invention, so that the explanation of such matrix operation processing is omitted herein to avoid redundancy.

Here, the arrangement by which the antenna-to-antenna spacing d is shortened is explained. With reference to FIG. 31, the materials 2903 and 2904 are mounted in front of the antenna elements 2901 and 2902. These materials 2903 and 2904 may be anisotropic metamaterial dielectrics or the metallic plate guide as already described above. An electric signal 2905 is connected to such materials 2903 and 2904, in which it is arranged such that the angle α of the anisotropic metamaterial dielectric element and the angle θ of the metallic plate guide can be modified by MEMS (Micro Electro Mechanical Systems) connected to such electric signal 2905. As known from the formulae 244 and 230, according as the angles α and θ change, the phase rotation of the directly opposed waves and that of the intersecting waves as well as the phase difference between them change. Accordingly, the antenna-to-antenna spacing for LOS-MIMO is automatically controlled by the electric signal 2905, so that even the physically same antenna-to-antenna spacing d can be calibrated to the optimum antenna-to-antenna spacing of LOS-MIMO. This mechanism allows the calibration of an adaptively optimum antenna-to-antenna spacing to be feasible based on the pilot signal received by each antenna. The control in which such calibration of an optimum antenna-to-antenna spacing is exerted may be performed by a computer (not shown in the drawings) on the transmitter side or the receiver side.

(Shortening the Antenna-to-Antenna Spacing of MIMO Communication System with the Phase Rotation Controlled by Liquid Crystals)

The liquid crystal mentioned herein is intended for changing the directions of the liquid crystal molecules with such molecules intervened between two sheets of plates and a voltage applied to them. Such liquid crystal molecules and the anisotropic metamaterial elements are associatively moved. This permits the angle α of the anisotropic metamaterial elements to be changed by the electric signal under the influence of the voltage applied to the liquid crystal molecules. As known from the formula 230, according as the angle α changes, the phase rotation of the directly opposed waves and that of the intersecting waves as well as the phase difference between them change. Accordingly, the antenna-to-antenna spacing for LOS-MIMO is automatically controlled by the electric signal, so that even the physically same antenna-to-antenna spacing can be calibrated to the optimum antenna-to-antenna spacing of LOS-MIMO.

Regarding the Short range MIMO that is predicted to be used for home electric appliances indoor, the above arrangement allows the MIMO communication system whose convenience to use has improved on the placement and replacement of the antennas occupying a large space to be provided. To note, the aforesaid MEMS and liquid crystals are arranged such that they can modify the inclination angles α and θ, so that they are also referred to as the inclination angle modification means in the specification hereof.

(Application of the Arrangement in which the Antenna-to-Antenna Spacing of the MIMO Communication System to a Mobile Communication System)

With the mobile communication system, it is used in a so-called rich scattering environment in which reflections and scatterings are repeated as described above, but according as the small cell has been streamlined in size in recent years, the proportion of radio waves arriving through line-of-sight propagation is on the increase. Under such environment, the characteristics of such mobile communication system deteriorate to the extreme with the conventional method which is targeted on non-line-of-sight (hereinafter, abbreviated as 'NLOS') MIMO communication system.

In other words, even in the mobile communication system under NLOS, the corrective measures to the propagation environment including the deterministic communication channel need to be taken, for which the large constraint to construct the MIMO communication system on the requirement that the antenna-to-antenna spacing be widened is still unsolved.

The radio waves propagation environment of the mobile communication system can be regarded as the synthesis of NLOS and LOS. Even when LOS-MIMO which is optimized in the aforesaid LOS propagation environment might be adopted in NLOS environment, the characteristic deterioration of the former does not occur. On the contrary, when the MIMO communication system used in NLOS environment is used in LOS environment, the characteristics of the former deteriorate to the extreme.

Accordingly, characteristically speaking, constructing the MIMO communication system on the premise of LOS-MIMO is preferred. However, for that purpose, the antenna-to-antenna spacing needs to be widened, which constrain such system from being constructed.

Figure 32:
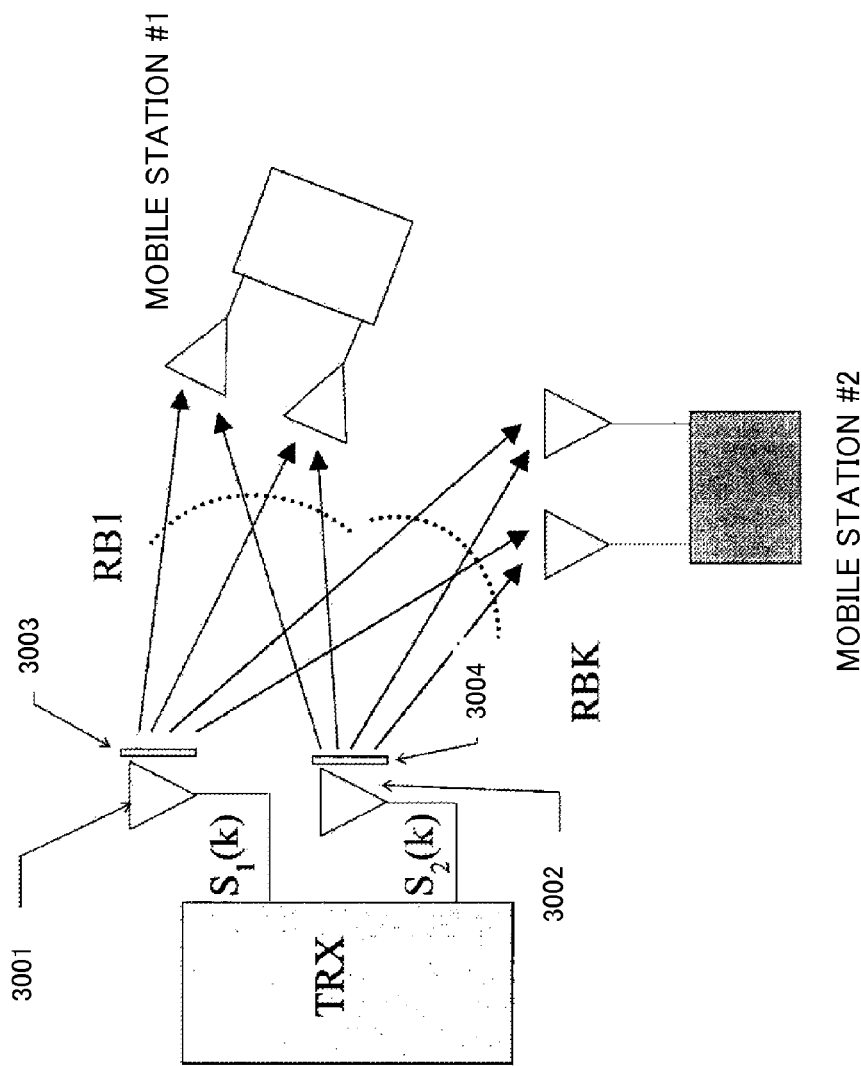
FIG. 32 shows an application example of shortening the antenna-to-antenna spacing of the MIMO communication system to a mobile communication system.

Thus, as shown in FIG. 32, the materials 3003 and 3004 which change the phase rotation of the carrier wave for the intersecting waves and that of the carrier wave for the directly opposed waves are mounted in front of the antennas 3001 and 3002, which permits the antenna-to-antenna spacing to be shortened according to the principle as already described above so that the constraint to construct the system is abated.

Here, the mobile communication system includes plural terminals. Accordingly, the problem lies in how to set the angle α of e.g., the anisotropic metamaterial dielectric elements within the materials 3003 and 3004. In this case, by way of one example, it can be arranged such that during the period allotted to a certain terminal by time sharing the angle α is set in accordance with the location of such certain terminal while during the period allotted to the other terminal the angle α is set to another value. When the time sharing processing is not available, the angle α that is most appropriate on the average to the location where the terminals such as hotspots subjected to the MIMO communication system gather is set. This allows the characteristic deterioration owing to LOS propagation environment to be mitigated.

{Operational Effects}

As described above, according to one embodiment of the present invention, in the MIMO communication system under propagation environment including a deterministic communication channel, it is characterized in a communication channel matrix operation processing means being provided on a transmitting side or a receiving side or both of the transmitting and receiving sides; orthogonal channels being formed by the communication channel matrix operation means; and in front of a transmitting antenna or a receiving antenna forming a communication channel matrix or both of the transmitting and receiving antennas forming communication channel matrices, materials that change a phase rotation of a carrier wave for intersecting waves and a phase rotation of a carrier wave for directly opposed waves are provided so as to act to shorten an optimum antenna-to-antenna spacing are provided, so that the antennas placement problem that constrains the MIMO communication system from being constructed can be solved.

Further, according to one embodiment of the present invention, in the MIMO communication system under propagation environment including a deterministic communication channel, it is characterized in to render an eigenvalue of a communication channel matrix into a geometric multiplicity (double eigenvalue or multiple eigenvalue), a geometric parameter according to an antenna-to-antenna spacing of the communication channel being set; orthogonal channels being formed by performing a matrix operation on a transmitting side or a receiving side according to a unitary matrix arranged based on a singular vector obtained based on the eigenvalue or a singular vector obtained by a linear sum of the eigenvalues; and in front of a transmitting antenna or a receiving antenna forming a communication channel matrix or both of the transmitting and receiving antennas forming communication channel matrices, materials to change a phase rotation of a carrier wave for intersecting waves and a phase rotation of a carrier wave for directly opposed waves are provided so as to act to shorten an optimum antenna-to-antenna spacing, so that the antennas placement problem that constrains the MIMO communication system from being constructed can be solved.

Further, according to one embodiment of the present invention, in the MIMO communication system under propagation environment including a deterministic communication channel, it is characterized in a communication channel matrix operation processing unit being provided on a transmitting side or a receiving side or both of the transmitting and receiving sides; an orthogonal channels formation matrix being renewed at the communication channel matrix operation processing unit by a positional fluctuation of a transmitting antenna or a receiving antenna or the positional fluctuations of both of the transmitting and receiving antennas or a fluctuation of the channels; and in front of the transmitting antenna or the receiving antenna forming the communication channel matrix or both of the transmitting and receiving antennas forming the communication channel matrices, materials to change a phase rotation of a carrier wave for intersecting waves and a phase rotation of a carrier wave for directly opposed waves are provided so as to act to shorten an optimum antenna-to-antenna spacing, so that upon the positional fluctuation of the transmitting antenna or the receiving antenna or the fluctuation of the channels being corrected at the communication channel matrix operation processing unit, the MIMO communication system is realized with the positional fluctuation of the transmitting antenna or the receiving antenna or the fluctuation of the channels absorbed through the antennas arrangement by which the antennas placement problem is solved.

Further, according to one embodiment of the present invention, in the MIMO communication system under propagation environment including a deterministic communication channel, it is characterized in to render an eigenvalue of a communication channel matrix into a geometric multiplicity (double eigenvalue or multiple eigenvalue), a geometric parameter of the communication channel being set; virtual orthogonal channels being formed by performing only on either a transmitting side or a receiving side a unitary matrix operation arranged based on an eigenvector obtained based on an eigenvalue or an eigenvector obtained by a linear sum of eigenvalues; and in front of the transmitting antenna or the receiving antenna forming the communication channel matrix or both of the transmitting and receiving antennas forming the communication channel matrices, materials to change a phase rotation of a carrier wave for intersecting waves and a phase rotation of a carrier wave for directly opposed waves are provided so as to act to shorten an optimum antenna-to-antenna spacing, so that through the arrangement in which the antennas placement problem is solved and the feedback data by means of reverse links is dispensed with, the flexible system design in which the matrix operation is carried out only on the receiving side or on the transmitting side is achieved.

Further, according to one embodiment of the present invention, in the MIMO communication system under propagation environment including a deterministic communication channel, in which the MIMO communication system is a fixed microwaves communication system with plural antennas in use, it is characterized in independent local oscillators being adopted for each antenna on a transmitting side or a receiving side or both of the transmitting and receiving sides; and in front of the transmitting antenna or the receiving antenna forming the communication channel matrix or both of the transmitting and receiving antennas forming the communication channel matrices, materials to change a phase rotation of a carrier wave for intersecting waves and a phase rotation of a carrier wave for directly opposed waves are provided so as to act to shorten an optimum antenna-to-antenna spacing, so that the antennas placement problem is solved as well as the problem with the carrier synchronization between antennas which constrains the MIMO system for fixed microwaves communication from being constructed is solved with the antenna-to-antenna spacing shortened.

Moreover, according to one embodiment of the present invention, in the MIMO communication system under propagation environment including a deterministic communication channel, it is characterized in the aforesaid materials being anisotropic metamaterial dielectrics; and metamaterial dielectric elements being arranged such that they are diagonally disposed with respect to the direction of the opposed antennas, so that a structure to be used for shortening an antenna-to-antenna spacing is efficiently realized in a small scale.

Moreover, according to one embodiment of the present invention, in the MIMO communication system under propagation environment including a deterministic communication channel, it is characterized in the aforesaid materials being a collective body of parallel metallic plates arranged such that they control a path length; and a metallic plate guide is directionally arranged such that it is diagonally disposed with respect to the direction of the opposed antennas, so that the structure to be used for shortening an antenna-to-antenna spacing is simply realized.

Moreover, according to one embodiment of the present invention, in the MIMO communication system under propagation environment including a deterministic communication channel, the aforesaid materials are characterized in being capable of electrically controlling a phase rotation variable so as to make an optimum antenna-to-antenna spacing automatically controlled, so that it permits any fluctuation of the locations where the antennas are placed to be dynamically responded.

Moreover, according to one embodiment of the present invention, in the MIMO communication system under propagation environment including a deterministic communication channel, the aforesaid materials are characterized in being capable of electrically controlling a phase rotation variable, in which the antenna-to-antenna spacing is automatically controlled by changing the direction of the dielectric elements by liquid crystals, so that the automatic control of the antenna-to-antenna spacing is efficiently realized in a small scale.

Moreover, according to one embodiment of the present invention, in the MIMO communication system under propagation environment including a deterministic communication channel, in which LOS environment and NLOS environment are intermixed, it is characterized in that in front of the transmitting antenna or the receiving antenna forming the communication channel matrix or both of the transmitting and receiving antennas forming the communication channel matrices, materials to change a phase rotation of a carrier wave for intersecting waves and a phase rotation of a carrier wave for directly opposed waves are provided so as to act to shorten an optimum antenna-to-antenna spacing, so that the antennas placement problem which constrains the MIMO communication system including a LOS radio waves propagation environment in respect of the mobile communication system from being constructed is solved.

Moreover, according to one embodiment of the present invention, a space division multiplexing system, in which a communication channel capacity is increased through the application of the MIMO communication system to the deterministic line-of-sight communication channel like the fixed microwaves communication system, and a space division multiplexing type fixed microwaves communication apparatus adopting such system are provided as well as the MIMO communication system, in which the constraint to construct the MIMO communication system such as securing the places where the antennas are actually implemented is solved, is provided.

Moreover, according to one embodiment of the present invention, a space division multiplexing system, which dispenses with the feedback data differently from the conventional SVD system requiring the feedback data for the purpose of constructing the unitary matrix from the receiving end to the transmitting end, but shows the performance equivalent to such SVD system and a space division multiplexing fixed microwaves communication apparatus adopting such system are provided as well as the MIMO communication system, in which the constraint to construct the MIMO communication system such as ensuring the places where the antennas are actually implemented is solved, is provided.

Moreover, according to one embodiment of the present invention, even for the mobile communication system in a so-called rich scattering environment in which reflections and scatterings are repeated and even in the case where according as the small cell has been streamlined in size in recent years, the proportion of radio waves arriving through line-of-sight communication is on the increase, thereby, the characteristics of such mobile communication system deteriorating with the conventional method which is targeted on NLOS MIMO communication system, the MIMO communication system in which such prior problems are solved with the constraint on the antennas placement overcome is provided.

Moreover, according to one embodiment of the present invention, with the short range MIMO communication system which is predicted to be adopted for the home electric appliances and as such indoor, the MIMO communication system whose convenience to use has improved on the placement and replacement of the antennas occupying a large space is provided.

To note, the aforesaid communication systems, transmitters, receivers, and antennas are realized by hardware, software or their combination. Further, the aforesaid communication methods are realized by hardware, software or their combination. Here, what is referred herein to as 'realized by software' means that such systems and methods are realized by a computer reading and executing a program.

The program is stored in various types of non-transitory computer readable media so as to be supplied to the computer. Such non-transitory computer readable media encompass various types of tangible storage media and specifically include magnetic recording media (e.g. flexible disks, magnetic tapes, hard disk drive); optical magnetic recording media (e.g. optical magnetic disks); CD-ROM (Read Only Memory); CD-R; CD-R/W; and semiconductor memories (e.g., mask ROM, PROM (Programmable ROM), EPROM (Erasable PROM), flash ROM, RAM (Random Access Memory)), by way of some examples. In turn, the program may be stored in various types of transitory computer readable media so as to be supplied to the computer. Such transitory computer readable media include electric signals, optical signals and electromagnetic waves, by way of some examples and can supply the program to the computer through such wired communication channels as electric wires and optical fibers or through wireless communication channels.

The present application is based on Japanese Patent Application No. 2013-114036 (filed on May 30, 2013) and claims the priority of Paris Convention based on Japanese Patent Application No. 2013-114036. The disclosure of Japanese Patent Application No. 2013-114036 is incorporated herein with reference thereto.

The representative embodiments of the present invention have been described above, but it shall be appreciated that it may be modified into various manners with some changes, substitutions and alternatives within or without departing from the spirit and scope of the accompanying patent claims. Further, it is the inventor's intention that even when some claims might be amended during the application proceeding, the equivalent scope of the claimed subject matters shall be maintained.

A part or the entirety of the aforesaid embodiments may be annotated as follows, but the present invention is not limited to the following.

(Annotation 1)

A MIMO communication system which includes a transmitter and a receiver and forms line-of-sight orthogonal channels between a transmitter-side transmitting antenna and a receiver-side receiving antenna under propagation environment including a deterministic communication channel, in which an optimum antenna-to-antenna spacing shortening unit is provided between the transmitting antenna and the receiving antenna to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

(Annotation 2)

The MIMO communication system annotated in Annotation 1, in which the optimum antenna-to-antenna spacing shortening unit includes anisotropic metamaterial dielectrics and dielectric elements of the anisotropic metamaterial dielectrics are arranged such that they are inclined with respect to a direction of the opposed antennas.

(Annotation 3)

The MIMO communication system annotated in Annotation 2, in which the optimum antenna-to-antenna spacing shortening unit is provided with an inclination angle modification unit to modify an angle of the inclination of the dielectric elements by liquid crystals such that the present antenna-to-antenna spacing is rendered into the optimum antenna-to-antenna spacing.

(Annotation 4)

The MIMO communication system annotated in Annotation 1, in which the optimum antenna-to-antenna spacing shortening unit is a metallic plate guide including a collective body of parallel metallic plates and a guiding direction of the metallic plate guide is arranged such that it is inclined with respect to the direction of the opposed antennas.

(Annotation 5)

The MIMO communication system annotated in Annotation 4, in which the optimum antenna-to-antenna spacing shortening unit is provided with an inclination angle modification unit to modify an angle of the inclination of the metallic plate guide by MEMS (Micro Electro Mechanical System) such that the present antenna-to-antenna spacing is rendered into the optimum antenna-to-antenna spacing.

(Annotation 6)

The MIMO communication system annotated in any one of Annotations 1 to 5, in which the optimum antenna-to-antenna spacing shortening unit is provided in front of one of the transmitting antenna, the receiving antenna and both of the transmitting and receiving antennas.

(Annotation 7)

The MIMO communication system annotated in any one of Annotations 1 to 6, in which a matrix operation processing unit to execute a matrix operation processing based on a matrix for forming orthogonal channels that is a matrix representing the matrix operation processing for forming the orthogonal channels is provided on one of a transmitting side, a receiving side and both of the transmitting and receiving sides and the orthogonal channels are formed at the matrix operation processing unit.

(Annotation 8)

The MIMO communication system annotated in any one of Annotations 1 to 7, in which to render an eigenvalue of communication channel matrix into a geometric multiplicity (double eigenvalue or multiple eigenvalue), a geometric parameter according to the antenna-to-antenna spacing of the communication channel is set and the orthogonal channels are formed by performing the matrix operation on one of the transmitting side and the receiving side by a unitary matrix arranged based on one of a singular vector obtained based on the eigenvalue and a singular vector obtained by a linear sum of the vectors.

(Annotation 9)

The MIMO communication system annotated in any one of Annotations 1 to 8, in which the matrix for forming the orthogonal channels are renewed at the matrix operation processing unit by one of a positional fluctuation of the transmitting antenna, a positional fluctuation of the receiving antenna, positional fluctuations of the transmitting and receiving antennas and a fluctuation of the channels.

(Annotation 10)

The MIMO communication system annotated in any one of Annotations 1 to 9, in which to render an eigenvalue of the communication channel matrix into a geometric multiplicity (double eigenvalue or multiple eigenvalue), a geometric parameter of the communication channel is set and virtual orthogonal channels are formed by performing a unitary matrix operation arranged based on an eigenvector obtained based on one of the eigenvalue and an eigenvector obtained by a linear sum of the vectors only on one of the transmitting and receiving sides.

(Annotation 11)

The MIMO communication system annotated in any one of Annotations 1 to 10, in which the MIMO communication system is a fixed microwaves communication system with plural antennas in use and independent local oscillators are adopted for each antenna on one of the transmitting side, the receiving side and the transmitting and receiving sides.

(Annotation 12)

A transmitter in a MIMO communication system forming line-of-sight orthogonal channels between a transmitter-side transmitting antenna and a receiver-side receiving antenna under propagation environment including a deterministic communications channel, in which an optimum antenna-to-antenna spacing shortening unit is provided in front of the transmitting antenna to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

(Annotation 13)

The transmitter according to Annotation 12 characterized in that the optimum antenna-to-antenna spacing shortening unit includes anisotropic metamaterial dielectrics and dielectric elements of the anisotropic metamaterial dielectrics are arranged such that they are inclined with respect to a direction of the opposed antennas.

(Annotation 14)

The transmitter according to Annotation 13 characterized in that the optimum antenna-to-antenna spacing shortening unit is provided with an inclination angle modification unit to modify an angle of the inclination of the dielectric elements by liquid crystals such that the present antenna-to-antenna spacing is rendered into the optimum antenna-to-antenna spacing.

(Annotation 15)

The transmitter according to Annotation 12 characterized in that the optimum antenna-to-antenna spacing shortening unit is a metallic plate guide including a collective body of parallel metallic plates and a guiding direction of the metallic plate guide is arranged such that it is inclined with respect to the direction of the opposed antennas.

(Annotation 16)

The transmitter according to Annotation 15 characterized in that the optimum antenna-to-antenna spacing shortening unit is provided with an inclination angle modification unit to modify an angle of the inclination of the metallic plate guide by MEMS (Micro Electro Mechanical System) such that the present antenna-to-antenna spacing is rendered into the optimum antenna-to-antenna spacing.

(Annotation 17)

A receiver in a MIMO communication system forming line-of-sight orthogonal channels between a transmitter-side transmitting antenna and a receiver-side receiving antenna under propagation environment including a deterministic communications channel, in which an optimum antenna-to-antenna spacing shortening unit is provided in front of the transmitting antenna to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

(Annotation 18)

The receiver according to Annotation 17 characterized in that the optimum antenna-to-antenna spacing shortening unit includes anisotropic metamaterial dielectrics and dielectric elements of the anisotropic metamaterial dielectrics are arranged such that they are inclined with respect to a direction of the opposed antennas.

(Annotation 19)

The receiver according to Annotation 18 characterized in that the optimum antenna-to-antenna spacing shortening unit is provided with an inclination angle modification unit to modify an angle of the inclination of the dielectric elements by liquid crystals such that the present antenna-to-antenna spacing is rendered into the optimum antenna-to-antenna spacing.

(Annotation 20)

The receiver according to Annotation 17 characterized in that the optimum antenna-to-antenna spacing shortening unit is a metallic plate guide including a collective body of parallel metallic plates and a guiding direction of the metallic plate guide is arranged such that it is inclined with respect to the direction of the opposed antennas.

(Annotation 21)

The receiver according to Annotation 20 characterized in that the optimum antenna-to-antenna spacing shortening unit is provided with an inclination angle modification unit to modify an angle of the inclination of the metallic plate guide by MEMS (Micro Electro Mechanical System) such that the present antenna-to-antenna spacing is rendered into the optimum antenna-to-antenna spacing.

(Annotation 22)

An antenna on one of a transmitting side and a receiving side in a MIMO communication system forming line-of-sight orthogonal channels between a transmitter-side transmitting antenna and a receiver-side receiving antenna under propagation environment including a deterministic communications channel, in front of which antenna an optimum antenna-to-antenna spacing shortening unit is provided to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

(Annotation 23)

The antenna according to Annotation 22 characterized in that the optimum antenna-to-antenna spacing shortening unit includes anisotropic metamaterial dielectrics and dielectric elements of the anisotropic metamaterial dielectrics are arranged such that they are inclined with respect to a direction of the opposed antennas.

(Annotation 24)

The antenna according to Annotation 23 characterized in that the optimum antenna-to-antenna spacing shortening unit is provided with an inclination angle modification unit to modify an angle of the inclination of the dielectric elements by liquid crystals such that the present antenna-to-antenna spacing is rendered into the optimum antenna-to-antenna spacing.

(Annotation 25)

The antenna according to Annotation 22 characterized in that the optimum antenna-to-antenna spacing shortening unit is a metallic plate guide including a collective body of parallel metallic plates and a guiding direction of the metallic plate guide is arranged such that it is inclined with respect to the direction of the opposed antennas.

(Annotation 26)

The antenna according to Annotation 25 characterized in that the optimum antenna-to-antenna spacing shortening unit is provided with an inclination angle modification unit to modify an angle of the inclination of the metallic plate guide by MEMS (Micro Electro Mechanical System) such that the present antenna-to-antenna spacing is rendered into the optimum antenna-to-antenna spacing.

(Annotation 27)

A MIMO communication method in a MIMO communication system forming line-of-sight orthogonal channels between a transmitter-side transmitting antenna and a receiver-side receiving antenna under propagation environment including a deterministic communication channel including an optimum antenna-to-antenna spacing shortening step of shortening an optimum antenna-to-antenna spacing by changing between the transmitting antenna and the receiving antennas a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

(Annotation 28)

The MIMO communication method according to Annotation 27 characterized in that at the optimum antenna-to-antenna spacing shortening step materials including anisotropic metamaterial dielectrics are arranged such that dielectric elements of the anisotropic metamaterial dielectrics are inclined with respect to a direction of the opposed antennas.

(Annotation 29)

The MIMO communication method according to Annotation 28 characterized in that the optimum antenna-to-antenna spacing shortening step includes an inclination angle modification step of modifying an angle of the inclination of the dielectric elements by liquid crystals such that the present antenna-to-antenna spacing is rendered into the optimum antenna-to-antenna spacing.

(Annotation 30)

The MIMO communication method according to Annotation 28 or 29 characterized in that at the optimum antenna-to-antenna shortening step the materials are provided on one of the transmitting antenna, the receiving antennas and both of the transmitting and receiving antennas.

(Annotation 31)

The MIMO communication method according to Annotation 27 characterized in that at the optimum antenna-to-antenna shortening step a metallic plate guide including a collective body of parallel metallic plates are arranged such that a guiding direction of the metallic plate guide is inclined with respect to the direction of the opposed antennas.

(Annotation 32)

The MIMO communication method according to Annotation 31 characterized in that the optimum antenna-to-antenna shortening step includes an inclination angle modification step of modifying an angle of the inclination of the metallic plate guide by MEMS (Micro Electro Mechanical System) such that the present antenna-to-antenna spacing is rendered into the optimum antenna-to-antenna spacing.

(Annotation 33)

The MIMO communication method according to Annotation 31 or 32 characterized in that at the optimum antenna-to-antenna shortening step the metallic plate guide is provided in front of one of the transmitting antenna, the receiving antenna and both of the transmitting and receiving antennas.

(Annotation 34)

The MIMO communication method according to any one of Annotations 27 to 33 including a matrix operation processing step of executing a matrix operation processing based on a matrix for forming orthogonal channels that is a matrix representing the matrix operation processing for forming the orthogonal channels on one of a transmitting side, a receiving side and both of the transmitting and receiving sides, in which the orthogonal channels are formed at the matrix operation processing unit.

(Annotation 35)

The MIMO communication method according to any one of Annotations 27 to 34 characterized in that to render an eigenvalue of a communication channel matrix into a geometric multiplicity (double eigenvalue or multiple eigenvalue), a geometric parameter according to the antenna-to-antenna spacing of the communication channel is set and the orthogonal channels are formed by performing the matrix operation on one of the transmitting side and the receiving side by a unitary matrix arranged based on one of a singular vector obtained based on the eigenvalue and a singular vector obtained by a linear sum of the vectors.

(Annotation 36)

The MIMO communication method according to any one of Annotations 27 to 35 characterized in that at the matrix operation processing step the matrix for forming the orthogonal channels are renewed by one of a positional fluctuation of the transmitting antenna, a positional fluctuation of the receiving antenna, positional fluctuations of the transmitting and receiving antennas and a fluctuation of the channels.

(Annotation 37)

The MIMO communication method according to any one of Annotations 27 to 36 characterized in that to render an eigenvalue of a communication channel matrix into a geometoric multiplicity (double eigenvalue or multiple eigenvalue), a geometric parameter of the communication channel is set and virtual orthogonal channels are formed by performing a unitary matrix operation arranged based on one of an eigenvector obtained based on the eigenvalue and an eigenvector obtained by a linear sum of the vectors only on one of the transmitting and receiving sides.

(Annotation 38)

The MIMO communication method according to any one of Annotations 27 to 37 characterized in that the MIMO communication system is a fixed microwaves communication system with plural antennas in use and independent local oscillators are adopted for each antenna on one of the transmitting side, the receiving side and the transmitting and receiving sides.

(Annotation 39)

A program to optimize an antenna-to-antenna spacing in one of a transmitter and a receiver of a MIMO communication system in which line-of-sight orthogonal channels are formed between a transmitter-side transmitting antenna and a receiver-side receiving antenna under propagation environment including a deterministic communication channel; an optimum antenna-to-antenna spacing shortening unit is provided between the transmitting antenna and the receiving antenna to shorten an optimum antenna-to-antenna spacing by changing a phase rotation of a carrier wave used for directly opposed waves between opposed antennas, and a phase rotation of a carrier wave used for intersecting waves between oblique antennas in such a manner that an amount by which one of the phase rotations changes is different from that by which the other phase rotation changes; and the optimum antenna-to-antenna shortening unit is made from anisotropic metamaterial dielectrics and dielectric elements of the anisotropic metamaterial dielectrics are disposed such that their inclination angle with regard to a direction of the opposed antennas is freely changeable, in which the program makes a computer to function as a control unit to change the inclination angle such that the present antenna-to-antenna spacing is rendered into an optimum antenna-to-antenna spacing.

(Annotation 40)

A program to optimize an antenna-to-antenna spacing in one of a transmitter and a receiver of a MIMO communication system in which line-of-sight orthogonal channels are formed between a transmitter-side transmitting antenna and a receiver-side receiving antenna under propagation environment including a deterministic communication channel; an optimum antenna-to-antenna spacing shortening unit is provided between a transmitting antenna and a receiving antenna to shorten an optimum antenna-to-antenna spacing by changing a phase rotation of a carrier wave used for directly opposed waves between opposed antennas, and a phase rotation of a carrier wave used for intersecting waves between oblique antennas in such a manner that an amount by which one of the phase rotations changes is different from that by which the other phase rotation changes; and the optimum antenna-to-antenna shortening unit is a metallic plate guide including a collective body of parallel metallic plates and a guiding direction of the metallic plate guide is disposed such that its inclination angle with regard to a direction of the opposed antennas is freely changeable, in which the program makes a computer to function as a control unit to change the inclination angle such that the present antenna-to-antenna spacing is rendered into an optimum antenna-to-antenna spacing.

INDUSTRIAL APPLICABILITY

The present invention is useful for the MIMO communication system, especially favorably applicable to the fixed microwaves communication system used under the line-of-sight propagation environment, the mobile communication system including line-of-sight propagation even in propagation environment entailing reflections and scatterings, the in-room MIMO communication system used in propagation environment including line-of-sight propagation in a room and the antennas of such systems.

What is claimed is:

1. A MIMO communication system which includes a transmitter and a receiver and forms line-of-sight orthogonal channels between a transmitter-side transmitting antenna and a receiver-side receiving antenna under propagation environment including a deterministic communication channel, in which an optimum antenna-to-antenna spacing shortening unit is provided between the transmitting antenna and the receiving antenna to shorten an optimum antenna-to-antenna spacing by changing a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

2. The MIMO communication system according to claim 1, wherein the optimum antenna-to-antenna spacing shortening unit comprises anisotropic metamaterial dielectrics and dielectric elements of the anisotropic metamaterial dielectrics are arranged such that they are inclined with respect to a direction of the opposed antennas.

3. The MIMO communication system according to claim 2, wherein the optimum antenna-to-antenna spacing shortening unit is provided with an inclination angle modification unit to modify an angle of the inclination of the dielectric elements by liquid crystals such that the present antenna-to-antenna spacing is rendered into an optimum antenna-to-antenna spacing.

4. The MIMO communication system according to claim 1, wherein the optimum antenna-to-antenna spacing shortening unit is a metallic plate guide comprising a collective body of parallel metallic plates and a guiding direction of the metallic plate guide is arranged such that it is inclined with respect to the direction of the opposed antennas.

5. The MIMO communication system according to claim 4, wherein the optimum antenna-to-antenna spacing shortening unit is provided with an inclination angle modification unit to modify an angle of the inclination of the metallic plate guide by MEMS (Micro Electro Mechanical System) such that the present antenna-to-antenna spacing is rendered into the optimum antenna-to-antenna spacing.

6. The MIMO communication system according to claim 1, wherein the optimum antenna-to-antenna spacing shortening unit is provided in front of one of the transmitting antenna, the receiving antenna and both of the transmitting and receiving antennas.

7. The MIMO communication system according to claim 1, wherein a matrix operation processing unit to execute a matrix operation processing based on a matrix for forming orthogonal channels that is a matrix representing the matrix operation processing for forming the orthogonal channels is provided on one of a transmitting side, a receiving side and both of the transmitting and receiving sides and the orthogonal channels are formed at the matrix operation processing unit.

8. The MIMO communication system according to claim 1, wherein to render an eigenvalue of a communication channel matrix into a geometric multiplicity (double eigenvalue or multiple eigenvalue), a geometric parameter according to the antenna-to-antenna spacing of the communication channel is set and the orthogonal channels are formed by performing the matrix operation on one of the transmitting side and the receiving side by a unitary matrix arranged based on one of a singular vector obtained based on the eigenvalue and a singular vector obtained by a linear sum of the vectors.

9. The MIMO communication system according to claim 1, wherein the matrix for forming the orthogonal channels are renewed at the matrix operation processing unit by one of a positional fluctuation of the transmitting antenna, a positional fluctuation of the receiving antenna, positional fluctuations of the transmitting and receiving antennas and a fluctuation of the channels.

10. The MIMO communication system according to claim 1, wherein to render the eigenvalue of the communication channel matrix into a geometric multiplicity (double eigenvalue or multiple eigenvalue), a geometric parameter of the communication channel is set and virtual orthogonal channels are formed by performing a unitary matrix operation arranged based on one of an eigenvector obtained based on the eigenvalue and an eigenvector obtained by a linear sum of the vectors only on one of the transmitting and receiving sides.

11. The MIMO communication system according to claim 1, wherein the MIMO communication system is a fixed microwaves communication system with a plurality of antennas in use and independent local oscillators are adopted for each antenna on one of the transmitting side, the receiving side and the transmitting and receiving sides.

12. A MIMO communication method in a MIMO communication system forming line-of-sight orthogonal channels between a transmitter-side transmitting antenna and a receiver-side receiving antenna under propagation environment including a deterministic communication channel, wherein the method comprises an optimum antenna-to-antenna spacing shortening step of shortening an optimum antenna-to-antenna spacing by changing between the transmitting antenna and the receiving antenna a phase rotation of a carrier wave used for directly opposed waves between opposed antennas and a phase rotation of a carrier wave used for intersecting waves between oblique antennas in such a manner that an amount by which one of the phase rotations changes is different from that by which the other phase rotation changes.

13. The MIMO communication method according to claim 12, wherein at the optimum antenna-to-antenna spacing shortening step materials comprising anisotropic metamaterial dielectrics are arranged such that dielectric elements of the anisotropic metamaterial dielectrics are inclined with respect to a direction of the opposed antennas.

14. The MIMO communication method according to claim 13, wherein the optimum antenna-to-antenna spacing shortening step includes an inclination angle modification step of modifying an angle of the inclination of the dielectric elements by liquid crystals such that the present antenna-to-antenna spacing is rendered into the optimum antenna-to-antenna spacing.

15. The MIMO communication method according to claim 13, wherein at the optimum antenna-to-antenna shortening step the materials are provided in front of one of the transmitting antenna, the receiving antennas and both of the transmitting and receiving antennas.

16. The MIMO communication method according to claim 12, wherein at the optimum antenna-to-antenna shortening step a metallic plate guide comprising a collective body of parallel metallic plates is arranged such that a guiding direction of the metallic plate guide is inclined with respect to the direction of the opposed antennas.

17. The MIMO communication method according to claim 16, wherein the optimum antenna-to-antenna shortening step includes an inclination angle modification step of modifying an angle of the inclination of the metallic plate guide by MEMS (Micro Electro Mechanical System) such that the present antenna-to-antenna spacing is rendered into the optimum antenna-to-antenna spacing.

18. The MIMO communication method according to claim 16, wherein at the optimum antenna-to-antenna shortening step the metallic plate guide is provided in front of one of the transmitting antenna, the receiving antenna and both of the transmitting and receiving antennas.

19. The MIMO communication method according to claim 12 comprising a matrix operation processing step of executing a matrix operation processing based on a matrix for forming orthogonal channels that is a matrix representing the matrix operation processing for forming the orthogonal channels on one of a transmitting side, a receiving side and both of the transmitting and receiving sides, wherein the orthogonal channels are formed at the matrix operation processing unit.

20. A non-transitory computer-readable medium on which a program is recorded, said program, when executed, causing a computer to optimize an antenna-to-antenna spacing in one of a transmitter and a receiver of a MIMO communication system in which line-of-sight orthogonal channels are formed between a transmitter-side transmitting antenna and a receiver-side receiving antenna under propagation environment including a deterministic communication channel; an optimum antenna-to-antenna spacing shortening unit is provided between a transmitting antenna and a receiving antenna to shorten an optimum antenna-to-antenna spacing by changing a phase rotation of a carrier wave used for directly opposed waves between opposed antennas, and a phase rotation of a carrier wave used for intersecting waves between oblique antennas in such a manner that an amount by which one of the phase rotations changes is different from that by the other phase rotation changes; and the optimum antenna-to-antenna shortening unit is made from anisotropic metamaterial dielectrics and dielectric elements of the anisotropic metamaterial dielectrics are disposed such that their inclination angle with regard to a direction of the opposed antennas is freely changeable, wherein the program makes a computer to function as a control unit to change the inclination angle such that the present antenna-to-antenna spacing is rendered into an optimum antenna-to-antenna spacing.

* * * * *